US012811843B2

(12) United States Patent
Alon et al.

(10) Patent No.: US 12,811,843 B2
(45) Date of Patent: Nov. 24, 2026

(54) NETWORK FABRIC LINK MAINTENANCE

(71) Applicant: Nvidia Corporation, Santa Clara, CA (US)

(72) Inventors: Elad Alon, Tel Aviv (IL); Eitan Zahavi, Zichron Yaacov (IL); Gaby Diengott, Kadima (IL); Shie Mannor, Haifa (IL); Vadim Gechman, Hulda (IL)

(73) Assignee: Nvidia Corporation, Santa Clara, CA (US)

(*) Notice: Subject to any disclaimer, the term of this patent is extended or adjusted under 35 U.S.C. 154(b) by 264 days.

(21) Appl. No.: 18/629,132

(22) Filed: Apr. 8, 2024

(65) Prior Publication Data

US 2024/0406058 A1 Dec. 5, 2024

Related U.S. Application Data

(60) Provisional application No. 63/505,503, filed on Jun. 1, 2023.

(51) Int. Cl.

| | |
|---|---|
| ***H04L 41/0659*** | (2022.01) |
| ***H04L 41/0677*** | (2022.01) |
| ***H04L 41/147*** | (2022.01) |
| ***H04L 41/16*** | (2022.01) |
| ***H04L 43/06*** | (2022.01) |

(Continued)

(52) U.S. Cl.

CPC ........ *H04L 41/0659* (2013.01); *H04L 41/147* (2013.01); *H04L 43/06* (2013.01); *H04L 43/0811* (2013.01)

(58) Field of Classification Search

None

See application file for complete search history.

(56) References Cited

U.S. PATENT DOCUMENTS 7,539,907 B1 * 5/2009 Johnsen ................ G06F 11/008 714/26

9,064,216 B2 6/2015 Reddy et al.

(Continued)

FOREIGN PATENT DOCUMENTS

CN 110460454 B 2/2022

OTHER PUBLICATIONS

Extended European Search Report issued in European Application No. 24179180.5, dated Feb. 24, 2025, 19 total pages.

(Continued)

*Primary Examiner* — Jenee Holland

(74) *Attorney, Agent, or Firm* — Hogan Lovells Cadwalader US LLP

(57) ABSTRACT

A network monitor may execute, or communicate with, one or more stored machine learning models that are trained to predict a failure probability for one or more ports and/or links within a network fabric. Systems and methods may monitor a set of ports to generate predictions for failure probabilities using a first trained model and low frequency telemetry data. For a subset of ports with failure probabilities exceeding a first threshold, high speed telemetry data may be used by a second trained model to generate predictions for failure probabilities for the subset of ports. Suspicious ports may then be isolated and undergo various remediation and/or monitoring actions prior to de-isolating the isolated ports.

18 Claims, 25 Drawing Sheets

(51) Int. Cl.
*H04L 43/08* (2022.01)
*H04L 43/0811* (2022.01)

(56) References Cited

U.S. PATENT DOCUMENTS

| | | | |
|---|---|---|---|
| 10,986,023 | B2 | 4/2021 | Bharadwaj |
| 11,438,211 | B1 | 9/2022 | Lyubomirsky et al. |
| 11,569,905 | B2 | 1/2023 | Dooling et al. |
| 2020/0259700 | A1* | 8/2020 | Bhalla .................. G06F 3/0482 |
| 2020/0351173 | A1 | 11/2020 | Vasseur et al. |
| 2021/0232472 | A1 | 7/2021 | Nagaraj et al. |
| 2021/0409849 | A1 | 12/2021 | Lazar et al. |
| 2022/0206774 | A1* | 6/2022 | Arora ........................ G06F 8/34 |
| 2022/0321422 | A1* | 10/2022 | Jupudi ..................... G06N 5/04 |
| 2023/0025718 | A1* | 1/2023 | Varnavas .............. G06F 11/302 |
| 2023/0403224 | A1* | 12/2023 | Roy .................... H04L 43/0817 |
| 2024/0039856 | A1* | 2/2024 | Kakko-Chiloff ...... H04L 41/147 |

OTHER PUBLICATIONS

Partial European Search Report issued in European Application No. 24179180.5, dated Oct. 18, 2024, 14 total pages.

* cited by examiner

NETWORK FABRIC LINK MAINTENANCE

CROSS-REFERENCE TO RELATED APPLICATIONS

This application claims priority to and the benefit of U.S. Provisional Patent Application No. 63/505,503, titled "NETWORK FABRIC LINK MAINTENANCE SYSTEMS AND METHODS," filed Jun. 1, 2023, which is incorporated by reference herein in its entirety for all purposes.

BACKGROUND

Large data centers may connect various physical components using different wired and/or wireless communication protocols. For certain structures, fault tolerance may be low and/or substantially zero because a failure between different network links may cause crashes, leading to down time and lost productivity and computational resources. In some cases, faults may occur at physical ports, such as ports of network switches and the like. Typically, data is collected at ports and used to determine whether the port has failed, and in the event of a failure, the port is isolated to perform one or more remediation operations. As data centers grow in size, it is not feasible to check and monitor each port in real time and near-real time. Additionally, even if data can be collected, the sheer number of ports may make real or near-real time monitoring impractical.

BRIEF DESCRIPTION OF THE DRAWINGS

Various embodiments in accordance with the present disclosure will be described with reference to the drawings, in which.

DETAILED DESCRIPTION

Figure 1:
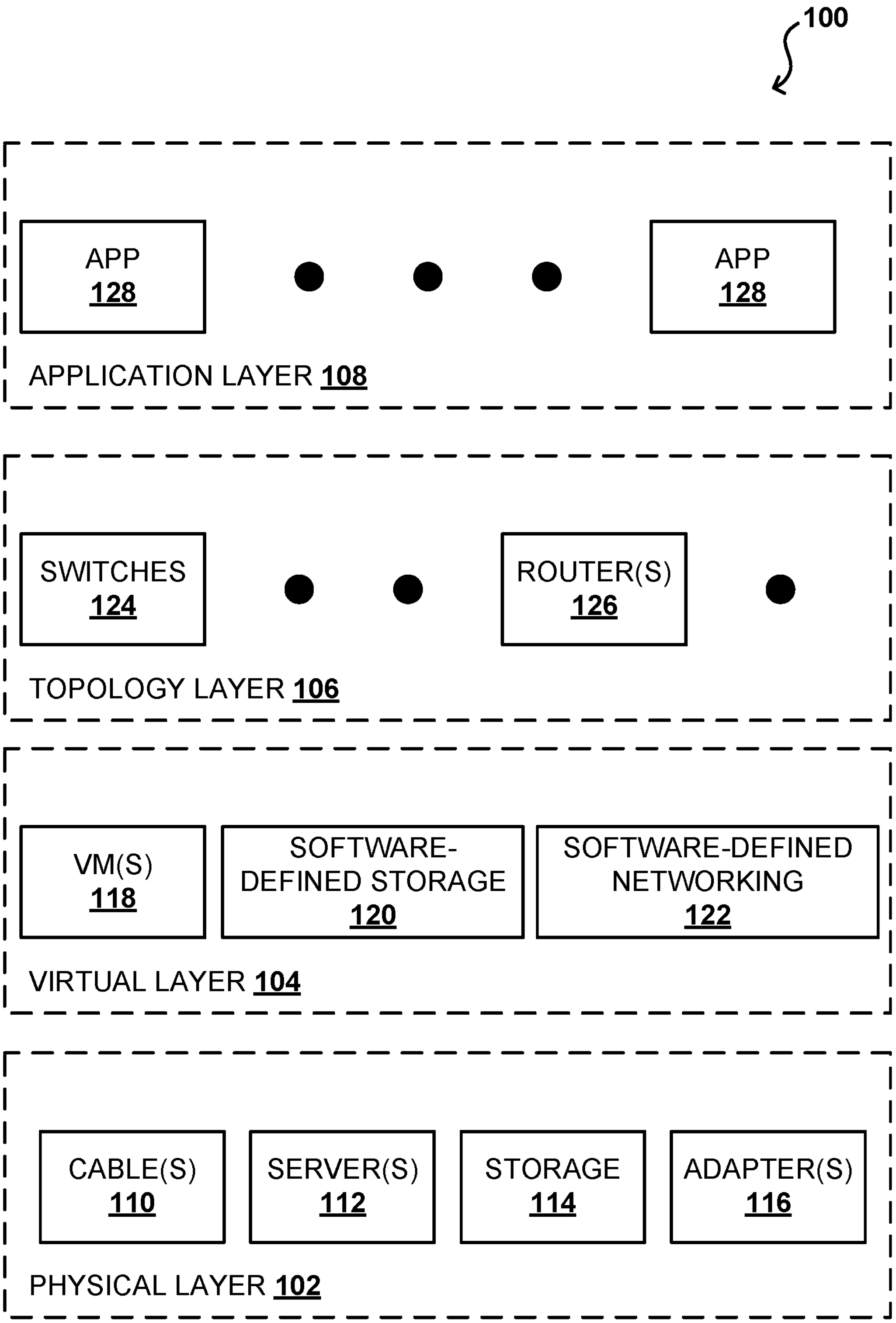
FIG. 1 illustrates a schematic diagram of a data center, in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

The systems and methods described herein may be used by, without limitation, non-autonomous vehicles, semi-autonomous vehicles (e.g., in one or more advanced driver assistance systems (ADAS)), piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, trains, underwater craft, remotely operated vehicles such as drones, and/or other vehicle types. Further, the systems and methods described herein may be used for a variety of purposes, by way of example and without limitation, for machine control, machine locomotion, machine driving, synthetic data generation, model training or updating, perception, augmented reality, virtual reality, mixed reality, robotics, security and surveillance, simulation and digital twinning, autonomous or semi-autonomous machine applications, deep learning, environment simulation, object or actor simulation and/or digital twinning, data center processing, conversational artificial intelligence (AI), generative AI with large language models (LLMs), light transport simulation (e.g., ray-tracing, path tracing, etc.), collaborative content creation for 3D assets, cloud computing and/or any other suitable applications.

Disclosed embodiments may be comprised in a variety of different systems such as automotive systems (e.g., a control system for an autonomous or semi-autonomous machine, a perception system for an autonomous or semi-autonomous machine), systems implemented using a robot, aerial systems, medical systems, boating systems, smart area monitoring systems, systems for performing deep learning operations, systems for performing simulation operations, systems for performing digital twin operations, systems implemented using an edge device, systems incorporating one or more virtual machines (VMs), systems for performing synthetic data generation operations, systems implemented at least partially in a data center, systems for performing conversational AI operations, systems for performing generative AI operations using LLMs, systems for performing light transport simulation, systems for performing collaborative content creation for 3D assets, systems implemented at least partially using cloud computing resources, and/or other types of systems.

Approaches in accordance with various embodiments can be used to monitor ports associated with data centers, such as clusters within data centers, to predictively model port failure probabilities, perform data sampling for predicted ports, isolate identified ports, perform one or more remediation operations, and de-isolate ports after remediation. In at least one embodiment, one or more machine learning models may be deployed to predict port failures based on one or more pieces of information collected through one or more telemetry systems associated with a data center. For example, telemetry systems may monitor the ports at one or more of a physical layer or a link layer. Initial telemetry may be collected at a first resolution (e.g., a first frequency) and used, along with one or more trained models, to predict a probability of port failure. For a subset of ports having a probability of failure that exceeds a threshold, the identified ports may be isolated. In at least one embodiment, the identified ports are isolated after additional telemetry is collected at a second resolution (e.g., a second frequency), which may be faster than the first resolution, where the additional telemetry provides further indications to validate the prediction of port failure. Remedial actions may then be conducted on isolated ports and the ports may be monitored for a period of time and then de-isolated to resume operations. Accordingly, systems and methods may be used to identify subsets of ports within a large network fabric for enhanced monitoring and then execute one or more workflows to isolate ports that have a probability of failure that exceeds a threshold, correct isolated ports, and de-isolate once isolated ports after a determination is made that the corrective measures are likely successful and/or have reduced a probability of failure before a threshold. In this manner, network downtime may be reduced by proactively monitoring and correcting port errors based on predictions from one or more machine learning models.

Various systems and methods are directed toward a network monitor that may be integrated with and/or be part of a unified fabric manager. The network monitor may execute, or communicate with, one or more stored machine learning models that are trained to predict a failure probability for one or more ports and/or links within a network fabric. In at least one embodiment, different models may be developed and deployed for different clusters or portions of the network fabric. For example, different clusters may execute with different operational conditions, may have different configurations, and/or may have different parameters. Accordingly, systems and methods may tune or otherwise deploy models configured to evaluate and monitor certain fabric and cluster configurations. Because network fabrics may include hundreds or thousands of physical ports, monitoring each port with high speed telemetry may not be feasible due to data acquisition, data processing, and/or costs associated with such monitoring. Systems and methods of the present disclosure address these drawbacks, among others, by providing enhanced monitoring and sampling for a subset of ports. For example, a first number of ports may be evaluated and failure probabilities for those ports may be predicted, for example using one or more models and/or low speed telemetry (e.g., low frequency telemetry). Based on the predictions, a subset of the first number of ports may be selected for enhanced monitoring, such as a subset of ports with predicted failure probabilities that exceed a threshold. Thereafter, high speed telemetry (e.g., high frequency telemetry) may be used to monitor the subset of ports, thereby reducing the cost and processing load when compared to systems evaluating all or substantially all ports. The high speed telemetry information may then be used for enhanced monitoring and subsequent isolation of ports where failure predictions are higher than a second threshold, which may be determined by one or more models using the high speed telemetry information. Remediation actions and then further monitoring may be executed prior to de-isolation of the suspicious ports.

Systems and methods of the present disclosure address and overcome problems with traditional monitoring systems that may isolate ports without prediction, thereby increasing costs by potentially wasting resources of the system, or by attempting to predict failure without sufficient sampling, training, and isolation/de-isolation mechanisms. As a result, these systems are costly and have a higher likelihood of failure. Embodiments of the present disclosure overcome these problems, and others, by developing and deploying one or more trained machine learning systems that may use different types of data (e.g., low speed telemetry and/or high speed telemetry) to develop failure probability predictions and execute one or more automated workflows for addressing suspicious ports. Such systems may be deployed in a variety of network configurations, such as InfiniBand clusters as one non-limiting example, where fault tolerance may be low (e.g., close-to-zero). Various embodiments collect physical layer and link layer telemetries from a number of ports in a cluster (e.g., all ports, a threshold number of ports, etc.) in low time resolution (e.g., approximately every 5 minutes, approximately every 10 minutes, etc.). Furthermore, embodiments may use one or more machine learning models to identify ports that are likely to fail and/or have a smaller bandwidth, among other potential criteria, and those ports may be isolated. A subset of ports may be selected for higher frequency sampling (e.g., approximately every 10 seconds, approximately every 5 seconds, etc.). This high frequency sampling may be used with another machine learning model (or the same model with different parameters or execution instructions) to predict failures and smaller bandwidth using the high frequency sampling data and certain ports may then be isolated based on the predictions. Remediation actions may then be followed, such as resetting a port, among other options. Instead of de-isolating the ports after remediation, the port may be monitored for a period of time (e.g., 30 minutes, more than 10 minutes, etc.), and if a normal operation status is identified, which may also be based on one or more prediction models, the port is de-isolated. In at least one embodiment, de-isolation is based on the prediction, and not actual traffic, because the link associated with the port is not active, but the physical layer still is. As a result, the physical layer may provide semi-random traffic to the port, even when the link is not active. Various embodiments also enable reporting and data collection to retrain and refine the various models, for example after periods of time, firmware updates, and/or the like.

Systems and methods of the present disclosure may further be extended to various applications other than link connections and/or datacenter operations where predictive failure and remediation may improve operations. As one example, systems and methods may be used to monitor one or more processing units within a cluster to predict failure or low performance. Turning to an example regarding a graphics processing unit (GPU), embodiments may acquire information associated one or more damage tests, such as writing information to a memory location, and then determining whether the written information was successfully written and/or stored to assess memory health. If not, then one or more remediation techniques may be deployed while also isolating the target memory location from further operations during remediation. After remediation, the memory location may be monitored for a period of time to determine whether or not the remediation action was successful, and if so, then the memory location may be released for further use. In this manner, systems and methods may be applied to a variety of different components where damage testing may be deployed.

FIG. 1 illustrates a schematic diagram of a system 100 representing a simplified data center architecture. Such a system is provided by way of example only and is not intended to limit the scope of the present disclosure. Moreover, various features have been removed for clarity and conciseness. Additionally, systems and methods may be used with a variety of different architectures. In this example, a physical layer 102 (e.g., an access layer in a three-tier network) may correspond to the systems associated with the data center, including features such as, but not limited to, data center rooms, racks, servers, processors (e.g., compute units), switches, cables, and/or the like. That is, the physical layer 102 may refer to physical connections between a network and the servers/other equipment. For example, the physical layer 102 may includes cables 110 that are used to connect servers 112 and/or storage medium 114 to one or more network connections, such as using one or more adapters 116. Additionally, in at least one embodiment, the physical layer 102 may refer to different servers positioned within racks that are connected to one or more other servers using different wired or wireless communication protocols. A virtual layer 104 may refer to a virtualized environment, such as one or more virtual machines 118 executing on the underlying hardware. The virtual layer 104 may also include software-defined processes, such as software-defined storage 120 and/or software-defined networking 122. A topology layer 106 may refer to the various connections between physical components, such as different connections between switches 124, routers 126, and the like. The application layer 108 may refer to different operations that execute using the underlying resources, such as software programs or applications 128 and the like that are loaded onto the different virtual machines.

Systems and methods of the present disclosure may be directed toward different configurations, such as data centers, where groups of servers may be represented as different clusters, among other options. The physical components within the data center may be communicatively coupled together using one or more network switches, which may be associated with different ports. In operation, the ports receive packets of data for use by the connected components, such as the servers. "Dropping" a packet or otherwise not receiving information along a port may cause an executing job to fail or be delayed. Such undesirable connections may increase costs for the system to identify, repair, and then restart different jobs. However, with large networks, it may be unfeasible to accurately and/or continuously monitor each port within the data center and/or for a particular cluster. Embodiments of the present disclosure may deploy one or more trained machine learning models to use telemetry information (e.g., data acquired from one or more of the physical layer and/or a link layer) to predict a probability of failure for various ports. If a port has a probability of failure that exceeds a threshold, that port may be isolated and/or monitored over a period of time to determine whether to isolate and repair the port. In this manner, embodiments of the present disclosure may predictively monitor failure probabilities and then only expend additional resources for particular ports, rather than attempting to monitor each port in a data center and/or cluster.

Systems and methods may be described as one or more portions of an automation flow for maintaining network links. In various embodiments, one or more portions may be automated (e.g., controlled by code executing on a processor), but various embodiments may also include human interaction, such as human interaction associated with remediation activities or human interaction to direct monitoring toward a particular region, among other options. The automation work flow may be associated with a variety of tasks, including but not limited to: detecting when a link and/or port is predicted to fail and then isolating that link and/or port to avoid impairment of network traffic; tracking maintenance procedures to recover an isolated link and/or port; and de-isolating links and/or ports after maintenance if it is determined that maintenance was successful.

Various embodiments may deploy one or more trained machine learning systems, which may use previous failure data, statistical modeling, and/or the like to determine how different telemetry data may correlate to link and/or port failures. For example, the model may evaluate a set of network counters and provide a prediction, for example during a "prediction period." The prediction period may provide a probability of failure over a period of time. At the end of the prediction period, another prediction may be generated, for example based on newly acquired telemetry information, and that new prediction may also be for another prediction period. Such monitoring and predicting can continue, with the prediction period being a tunable value that may change based on properties of the data center and/or cluster. Furthermore, tracking of maintenance procedure steps for remediation and repair may be configured to react to asynchronous application programming interface (API) calls to communicate with period tasks via state variables. Information obtained from the maintenance steps may be provided back to the models for further training and refinement.

Various embodiments may also deploy a tiered or measured approach to returning a link and/or port back into service after a period of isolation. The measured approach may take a multi-path evaluation to evaluate updated predictive information over different periods of time, such as a first period of time (e.g., approximately 2 minutes, approximately 5 minutes, approximately 10 minutes, etc.) and then over a second period of time (e.g., approximately 20 minutes, approximately 30 minutes, etc.). During isolation, semi-random traffic may still be provided to the isolated ports, and as a result, a prediction may be generated to determine whether the maintenance and/or remediation efforts were successful. Thereafter, the link and/or port may be de-isolated and brought back into service. Embodiments may be configured to evaluate links and/or ports with respect to their nominal operating conditions (NOC). For example, predicting behavior outside of NOC may not provide actionable data. Accordingly, if operations outside of the NOC are what caused isolation, de-isolating such links may be avoided.

Systems and methods may also track a health of the various predictive models to compare the probabilities to actual failures to determine false positives and/or false negatives. A threshold number of false positives or false negatives may be used to measure a health of the system and models may be retrained or otherwise modified if the thresholds are exceeded. In this manner, models may be continuously trained and refined to improve accuracy. Embodiments discussed herein may describe a collected per port state by usage (e.g., state, cause, time (of last change), pendAct(ion) as separate dictionaries. However, a named tuple or record may also be used within the scope of the present disclosure.

Various embodiments of the present disclosure may be used to isolate ports or links for one or more reasons. By way of example, ports may be isolated due to nominal operating conditions, based on predicted properties or likelihoods of failure, for maintenance activities, as part of a routine monitoring operations, and/or combinations thereof. Moreover, systems and methods may also provide a variety of tunable parameters that may be used with port isolation and de-isolation. For example, a user or administrator may tune a level of isolation such that a port may be isolated responsive to a determination or a trigger or may maintain contain, but may provide an alarm or an indicator to a user or administrator regarding that port. Furthermore, isolation or lack of isolation may be based on, or restrict by, various additional factors. As one example, a network topology may be defined and maintained, such as establishing a certain number of switches in parallel or maintaining a number of links between different components. During monitoring operations, if it is determined that a port is to be isolated, but that isolation would change the network topology, one or more embodiments may stop isolation and maintain the desired topology, and instead, may provide an alert or other indicator that may lead to further evaluation, maintenance, or the like. As a result, various embodiments may be deployed to enable targeted, customizable evaluation and monitoring of various network connections.

Figure 2:
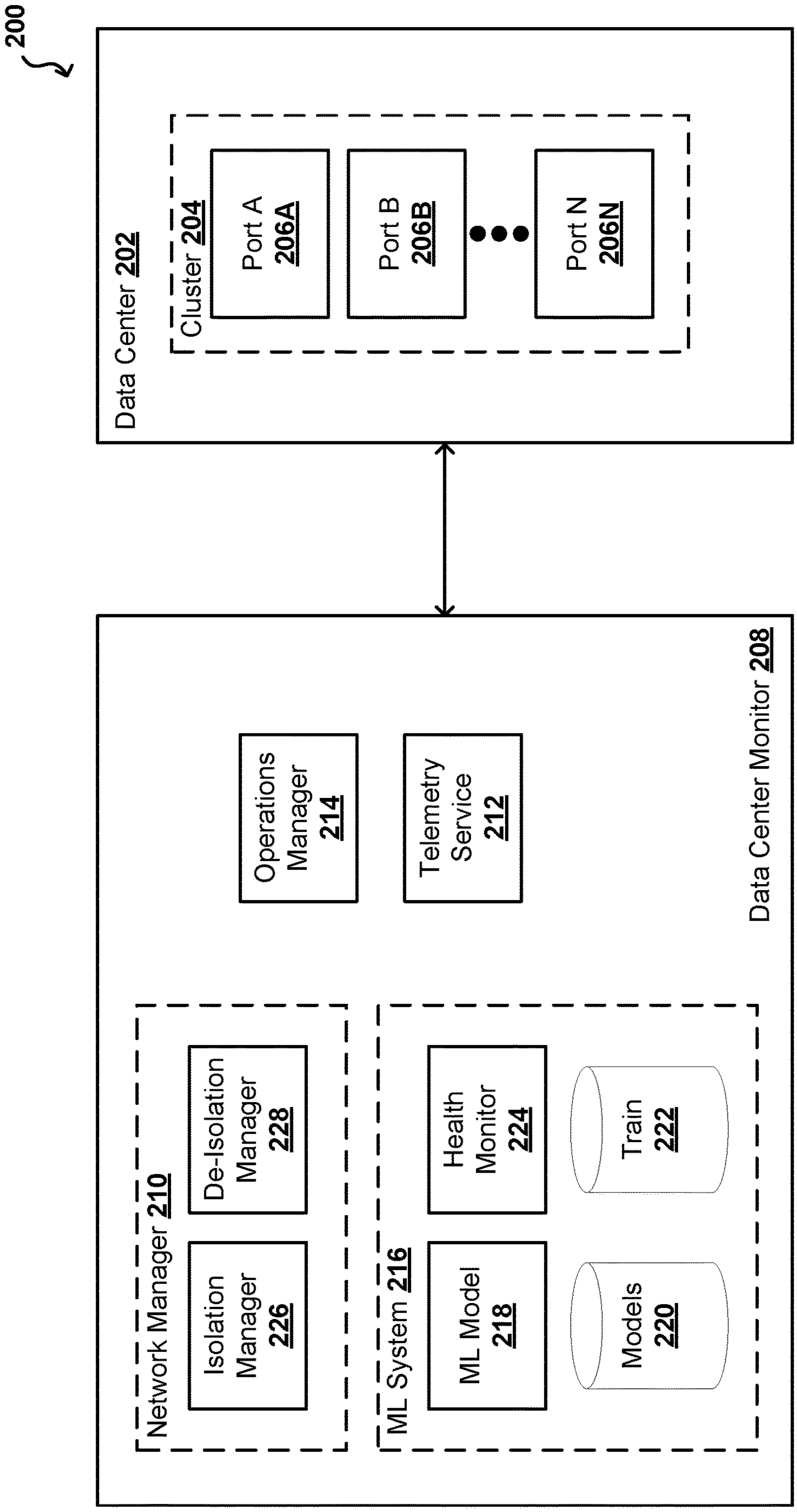
FIG. 2 illustrates an example system for monitoring a network fabric associated with a data center, in accordance with at least one embodiment.

FIG. 2 illustrates an example system 200 that may be used to monitor links and/or ports associated with one or more data centers to predict a probability of failure. As noted herein, the example of links/ports is provided by way of non-limiting example and embodiments may be extended to various other components where tiered failure monitoring may improve operation. In this example, a data center 202 includes one or more clusters 204, which may be a logically grouped set of components, such as a set of servers, switches, and/or the like. The cluster 204, or components thereof, may include a set of ports 206A-206N, which may correspond to link connections between different components. The ports 206A-206N may receive packets of data that are used to execute one or more jobs or functions, among other options. In operation, dropping packets at certain points may cause job fails, reduced performance, and/or the like. Accordingly, systems and methods of the present disclosure may monitor telemetry data for the various ports 206A-206N and use one or more trained machine learning systems to predict a probability of failure based, at least in part, on the telemetry data, and then to determine whether to isolate and repair the ports 206A-206N.

A data center monitor 208 includes a number of systems and/or sub-systems to monitor and control various aspects of the data center 202. Various components have been removed for clarity with the present discussion and different systems and sub-systems may be integrated into singular components and/or share various resources and the like. In this example, a network manager 210 may be used to monitor various parameters of the data center 202, such as evaluating information acquired from a telemetry service 212. For example, the network manager 210 may receive telemetry data for different features of the data center 202, such as at individual clusters 204 and/or ports 206A-206N. In at least one embodiment, the network manager 210 may further forward the information to additional systems and sub-systems as part of various automated workflows, such as an isolation manager 226 to isolate different links and/or ports and/or to a de-isolation manager 228 to de-isolate different links and/or ports. As will be described herein, one or more different factors or metrics may be used, which may be part of a workflow, to begin different isolation and/or de-isolation operations. In at least one embodiment, isolating the ports may refer to blocking or restricting communication to the ports. In at least one embodiment, isolating the ports may refer to removing a connection between the ports and the network fabric.

In at least one embodiment, the telemetry service 212 may include data acquisition sensors that operate at different frequencies. For example, a first set of telemetry data may be considered "slow" or at a "low" frequency, while a second set of telemetry data may be considered "fast" or at a "high" frequency. In this example, the second set of telemetry data may be acquired at shorter intervals than the first set of telemetry data. By way of non-limiting example, the first set of telemetry data may be acquired over minutes (e.g., 1 minute, 2 minutes, 5 minutes, 10 minutes, etc.) while the second set of telemetry data may be acquired over seconds (e.g., 1 second, 2 seconds, 5 seconds, 10 seconds, etc.). Accordingly, the first set of telemetry data may be used in one or more situations, while the second set of telemetry data is used in different situations due to the potential increased cost of acquiring the second set of telemetry data and processing the additional data.

In this example, an operations manager 214 may communicate with the telemetry service 212, among other components and sub-components, in order to monitor different operational conditions for the data center 202. The operations manager 214 may further provide information to the network manager 210 regarding these operational conditions, which may inform or otherwise control how the network manager 210 monitors and adjusts different aspects of the data center 202. For example, the operations manager 214 may monitor one or more threshold conditions regarding the data center 202, where one or more conditions exceeding a threshold or moving outside of range may lead to a shut down or maintenance operations. By way of non-limiting example, the operations manager 214 may evaluate data corresponding to device (e.g., cable/model) temperature, switch or chip temperature, ambient temperatures, humidity, switch voltage, cable voltage, and/or the like. If any of these parameters are outside of their ranges, that may provide an indication of a system-level or hardware-level issues, which would not be attributed to the port itself, but rather to a larger issue to be addressed. Furthermore, the operations manager 214 may be used to determine whether or not one or more ports 206A-206N are operating outside of normal operating conditions, which may be an indication not to perform other tests or evaluations.

Various embodiments of the present disclosure may also regulate different monitoring operations using the operations manager 214 and/or one or mother additional or alternative systems or sub-systems. In at least one embodiment, the operations manager 214 may be used to apply one or more settings or preferences to network management and control. The one or more settings or preferences may include tunable parameters that may be adjusted based on different network parameters. For example, settings may change based on an applied or anticipated load on the network, based on a time or day, based on a time of year, and/or the like. Furthermore, the one or more settings may be used to override and/or control application of various methods discussed herein. Different settings, such as network topology, may be established with a hierarchical structure with respect to various monitoring operations such that remediation operations executed by the monitoring operations may not override higher-ranking settings. As one example, network topology may be maintained such that port isolation may not be permitted to an extent that network topology would not maintain one or more settings. A further example may include delaying isolation until an alert has been viewed and approved by one or more users or administrators. Accordingly, various embodiments of the present disclosure may be used to integrate did systems and methods into a larger monitoring operation.

Embodiments of the present disclosure may also use one or more machine learning (ML) systems 216 to predict failure probabilities for one or more ports, among other options. In this example, the ML system 216 includes an ML model 218 that may be selected from a database of models 220. For example, the ML model 218 may be particularly selected based, at least in part, on operating conditions for different portions of the data center 202. A high performance compute cluster may have different conditions or thresholds of operation than other compute clusters, and as a result different models may be trained that evaluate different parameters or use different thresholds for failure predictions. Such flexibility allows models to be tuned for particular operations and selected for deployment in real or near-real time (e.g., without significant delay) in order to actively monitor different portions of the data center 202 responsive to a current or expected workload. In at least one embodiment, the ML model 218 may be trained on training data 222, which may be telemetry data collected over time, a result of maintenance operations, simulated models, and/or the like. Training data may be updated as new telemetry data is acquired and then models in the database 220 may be periodically updated and/or refined. For example, the models may be updated offline after a threshold amount of data is collected and/or after a given period of time has passed. Additionally, the models may be updated or adjusted in real or near-real time as information is acquired.

A health monitor 224 may be deployed to monitor and evaluate an error rate for the ML model 218, which may trigger retraining when an error rate exceeds a threshold. For example, false positives or false negatives may be evaluated over time and that information may be used to adjust model parameters or conditions. As a result, accuracy may be improved by continuously testing the results of the predictions against one or more tunable baselines.

As noted herein, in operation telemetry data is acquired and evaluated by one or more trained ML models in order to predict a probability of failure, for a given prediction period, of one or more data center components, such as links or ports. Predictions may be executed against each port of the data center, against each port in a cluster, against a randomly selected sample, and/or combinations thereof. When the predictions are generated, a subset of the list of components may be selected as being "suspicious," which may correspond to having a probability of failure within the prediction period that exceeds a threshold. The threshold may be tunable for different operations, data centers, and/or clusters. From this subset of components, additional monitoring may be performed. For example, the initial list may be evaluated using low frequency telemetry data and the subset may be further monitored using high frequency telemetry data. A second prediction may then be generated for the subset, where one or more components with a probability greater than a second threshold may then be isolated. The threshold may be tunable for different operations, data centers, and/or clusters. While isolated, additional monitoring may occur, for example from low or high frequency telemetry data, and one or more remediation actions may be attempted. After remediation, a status of the component may be evaluated, while the component remains isolated, and after a threshold period of time, which may be a tunable period of time, it may be determined the remediation action was successful and that the component can be de-isolated and brought back into the fabric. In this manner, systems and methods may proactively monitor different components of the data center and use a multi-layered approach to select components for further evaluation, isolation, repair, and de-isolation.

Figure 3A:
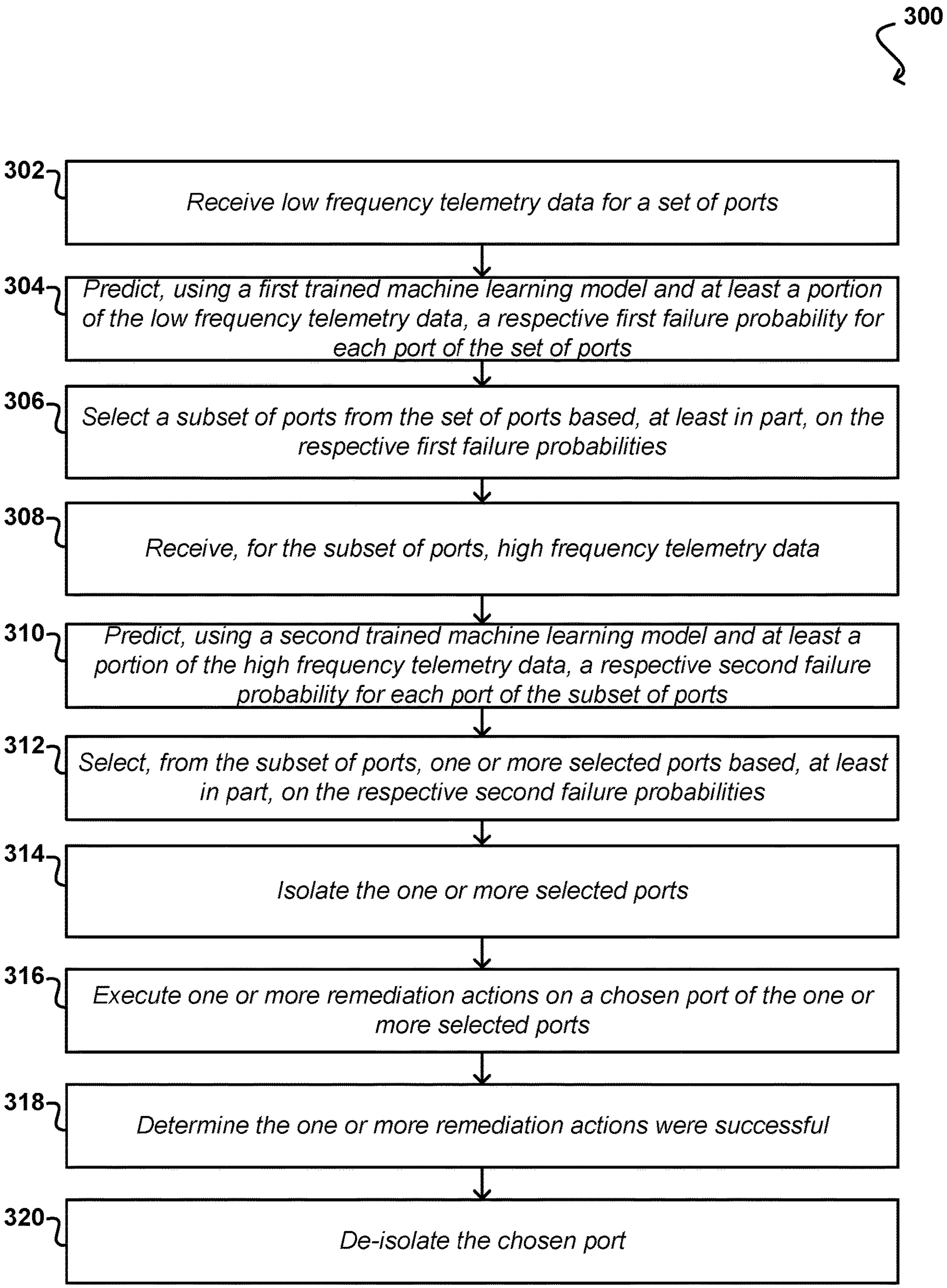
FIG. 3A illustrates an example process for isolating and de-isolating ports with threshold failure probabilities, in accordance with at least one embodiment.

FIG. 3A illustrates an example process 300 that can be used to identify one or more ports with a probability of failure. It should be understood that for this and other processes presented herein that there may be additional, fewer, or alternative operations performed in similar or alternative orders, or at least partially in parallel, within the scope of the various embodiments unless otherwise specifically stated. Further, while this example refers to ports, it should be understood that various other components may also use such a process within the scope of various embodiments. In this example, low frequency telemetry data is received for a set of ports 302. The set of ports 302 may correspond to each port of a data center, to each port of a particular cluster, to a selected set of ports less than a total number, or some combination thereof. The low frequency telemetry data may be information acquired from physical or link layer counters, as noted herein. In at least one embodiment, the low frequency telemetry data may be used by one or more ML models to predict a first failure probability for the set of ports 304. The prediction may be based, at least in part, on one or more factors of the port, the workload associated with the port, or the like. The models may be trained to identify and correlate different telemetry data to a likelihood of failure, where different data may be weighed differently. The predicted failure probabilities may then be used to select a subset of ports from the set of ports 306. The subset of ports may be less than the set of ports. The selection may be based, at least in part, on one or more thresholds. For example, the threshold may be a threshold failure probability. Additionally, the threshold may be a threshold number of ports, where the highest X % of ports are selected for further evaluation, among other options.

High frequency telemetry data may be received for the subset of ports 308. As noted herein, high frequency telemetry data may be acquired more rapidly than the low frequency telemetry data, and as a result, may provide more data over a period of time for evaluation. By only looking at this information for a subset of the ports, systems and methods of the present disclosure may conserve resource expenditure and evaluate potential failures in less time. A second failure probability may be predicted for the subset of ports using the high frequency telemetry data 310. In at least one embodiment, the models used for the predictions may be different. However, the models used for the predictions may also share one or more features or parameters. Additionally, the models may be use the same or different underlying architecture and/or weights. Thereafter, one or more selected ports may be selected from the subset of ports, based on the second failure probabilities 312. As noted herein, selection may be based on whether the second failure probability exceeds threshold, among other options, such as selecting a set number or ports, selecting a percentage of ports, and/or the like.

In at least one embodiment, the one or more selected ports may be isolated 314 and then one or more remediation actions may be executed on a chosen port of the one or more selected portions 316. Remediation actions may include, as non-limiting examples, resetting the port, adjusting parameters of the port, adjusting a physical connection to the port, and/or the like. The chosen port may then be monitored for a threshold period of time and/or additional predictions may be developed for the chosen port after completion of the remediation actions to determine whether or not the remediation actions were successful 318, and if so, the chosen port may be de-isolated 320 and reintroduced into the network fabric.

Various embodiments of the present disclosure may also determine whether to receive or obtain high frequency telemetry data based on one or more settings, which may be independent from the first failure probability. For example, a certain subset of ports may be independently selected for enhanced monitoring, and as a result, the determination of the first failure probability may not be used to obtain secondary telemetry data for the selected subset of ports. As another example, certain ports may be selected for evaluation based on individual port properties, different types of communications associated with the ports, and/or the like. Accordingly, while various embodiments may discuss high frequency telemetry data upon a determination made using low frequency, other embodiments may use one or more additional or alternative factors to select portions that are evaluated using the high frequency telemetry data.

Figure 3B:
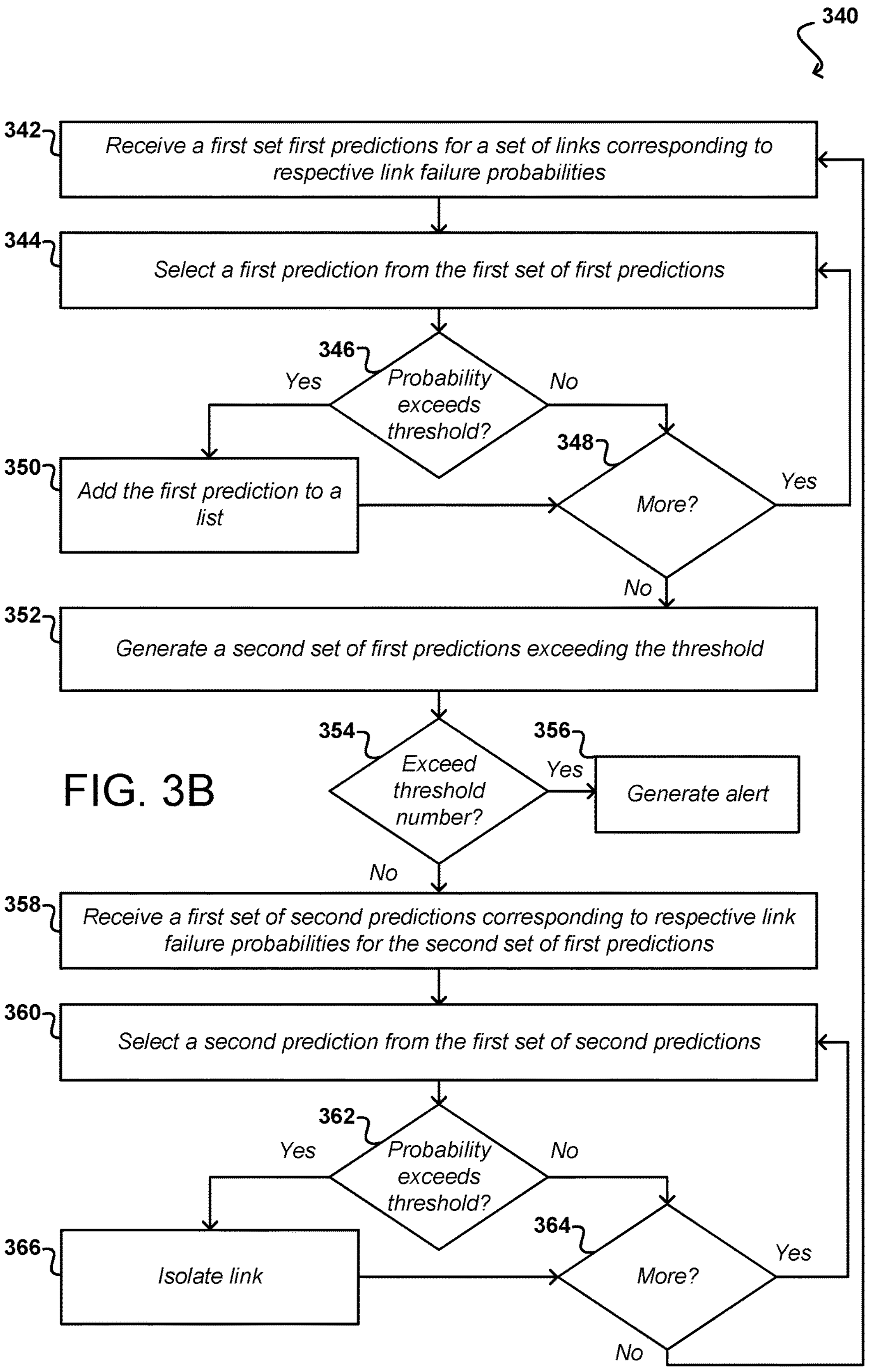
FIG. 3B illustrates an example process for isolating a port with threshold failure probabilities, in accordance with at least one embodiment.

FIG. 3B illustrates an example process 340 for isolating a link based, at least in part, on a predicted failure probability. In this example, a first set of predictions for a set of links corresponding to respective link failure probabilities is received 342. The first set may be based on telemetry data and may be generated by one or more ML systems, as noted herein. A prediction from the set of predictions may be selected 344 and evaluated against a threshold 346. The threshold may be one or more metrics, such as a set value, a range, and/or the like. Furthermore, the threshold may be selected based on different properties of the first set of links, such as their associated cluster, underlying hardware parameters, use preferences, and/or the like. If the failure probability does not exceed the threshold, it may be determined whether there are additional predictions in the set 348, and if so, additional predictions from the set may be selected until each has been evaluated.

In at least one embodiment, it may be determined that the selected prediction does exceed the threshold, and therefore, the selected prediction may be added to a list 350. The list may be used to keep a running total of selected predictions that exceed the threshold. Each of the predictions, in certain embodiments, may be evaluated against the threshold. It should be appreciated that if no predictions exceed the threshold and all predictions have been evaluated, that the process may end.

In at least one embodiment, predictions that are determined to exceed the threshold may be used to generate a second set of predictions 352. In at least one embodiment, if none of the predictions exceed the threshold, then the second set of first predictions may be equal to zero, as noted herein, and the process may end. This second set of predictions may be compared against a threshold number to determine whether a total number of predicted failures exceeds the threshold number 354. If so, an alert may be generated 356. The alert may be used to provide a notification to an operator that too many links have a probability of failure that exceeds a threshold, which may be indicative of a larger problem within the system. Moreover, taking too many links offline could impede overall performance such that a shutdown to repair the system is a preferred option. If the total number is not exceeded, then a first set of second probabilities may be received 358. The second set of probabilities may be based, at least in part, on telemetry information, such as high frequency telemetry information, as noted herein. A second prediction may then be selected 360 and compared against a threshold, as noted herein, where it may be determined whether or not the second prediction exceeds the threshold 362. If not, then it may be determined whether additional second predictions are available from the set 364. If the second prediction does exceed the threshold, then the link associated with the second prediction may be isolated 366. In this manner, links with probabilities of failure that exceed a threshold may be isolated for further evaluation and repair, as described herein.

Figure 3C:
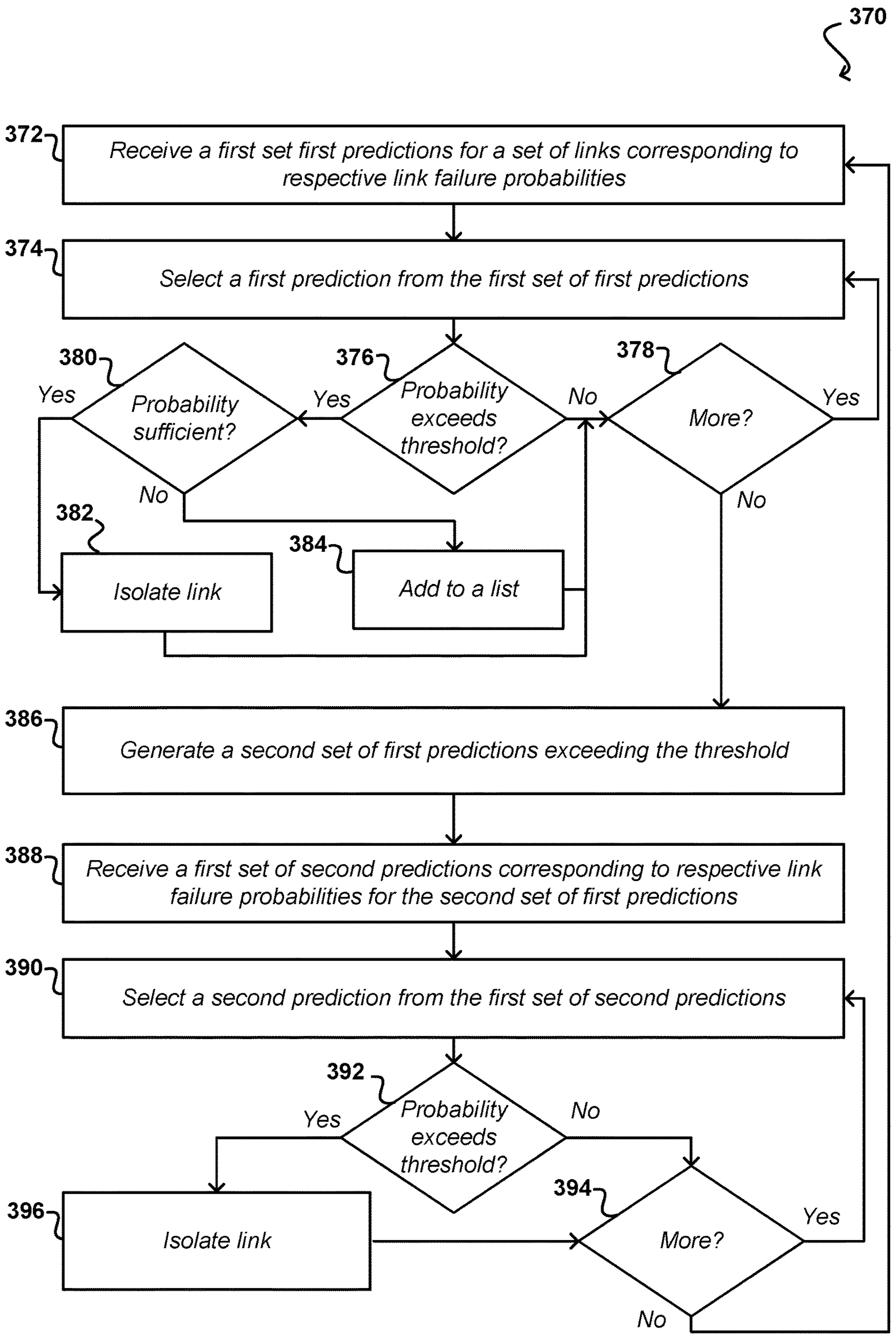
FIG. 3C illustrates an example process for isolating a port with threshold failure probabilities, in accordance at least one embodiment.

FIG. 3C illustrates an example process 370 for isolating a link based, at least in part, on a predicted failure probability. In this example, a first set of predictions for a set of links corresponding to respective link failure probabilities is received 372. The first set may be based on telemetry data and may be generated by one or more ML systems, as noted herein. A prediction from the set of predictions may be selected 374 and evaluated against a threshold 376. As noted, the threshold may be some static number, a dynamically changing number, a set point, a percentage, and/or any other reasonable figure. If the failure probability does not exceed the threshold, it may be determined whether there are additional predictions in the set 378, and if so, additional predictions from the set may be selected until each has been evaluated.

In at least one embodiment, predictions that are determined to exceed the threshold may be further evaluated to determine whether the prediction is sufficient for isolation without further analysis. For example, if the probability of failure is sufficiently high, the link may be isolated without further analysis or prediction. In this example, the probability is evaluated against some high probability level and is it determined whether the probability is sufficient to isolate the link 380. If so, the link is isolated 382. If not, the link associated with the first prediction and/or the first prediction may be added to a list 384.

In at least one embodiment, systems and methods may be used to generate a second set of first predictions 386. In at least one embodiment, as discussed herein, the second set of predictions may be based off of the determinations of the first set of first predictions and/or based on one or more settings. For example, the list may be populated with links associated with predictions that exceed a threshold or with links that are identified as relevant for further evaluation, even if the first probability for the link is less than the threshold. A first set of second probabilities may be received 388. The second set of probabilities may be based, at least in part, on telemetry information, such as high frequency telemetry information, as noted herein. A second prediction may then be selected 390 and compared against a threshold, as noted herein, where it may be determined whether or not the second prediction exceeds the threshold 392. If not, then it may be determined whether additional second predictions are available from the set 394. If the second prediction does exceed the threshold, then the link associated with the second prediction may be isolated 396. In this manner, links with probabilities of failure that exceed a threshold may be isolated for further evaluation and repair, as described herein.

Figure 4A:
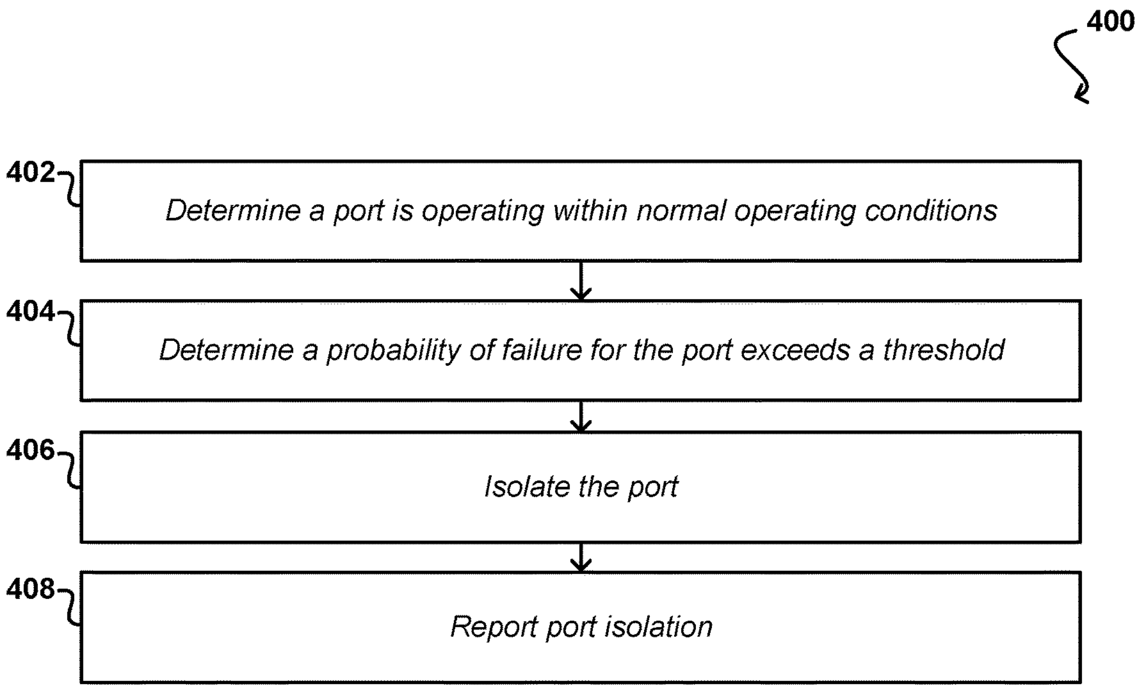
FIG. 4A illustrates an example process for isolating a port with threshold failure probabilities, in accordance with at least one embodiment.

FIG. 4A illustrates an example process 400 for isolating a port, in accordance with at least one embodiment. In this example, operating conditions for a port may be evaluated and it may be determined that the port is operating within normal operating conditions 402. In at least one embodiment, a probability of failure for the port may be determined to exceed a threshold 404 . . . . The port may then be isolated 406 and a report for the port isolation may be generated 408. In this manner, ports may only be isolated when they both exceed a probability of failure and also are operating within normal operating conditions because operation outside of those conditions may be indicative of other errors and not necessarily the errors with the port.

Figure 4B:
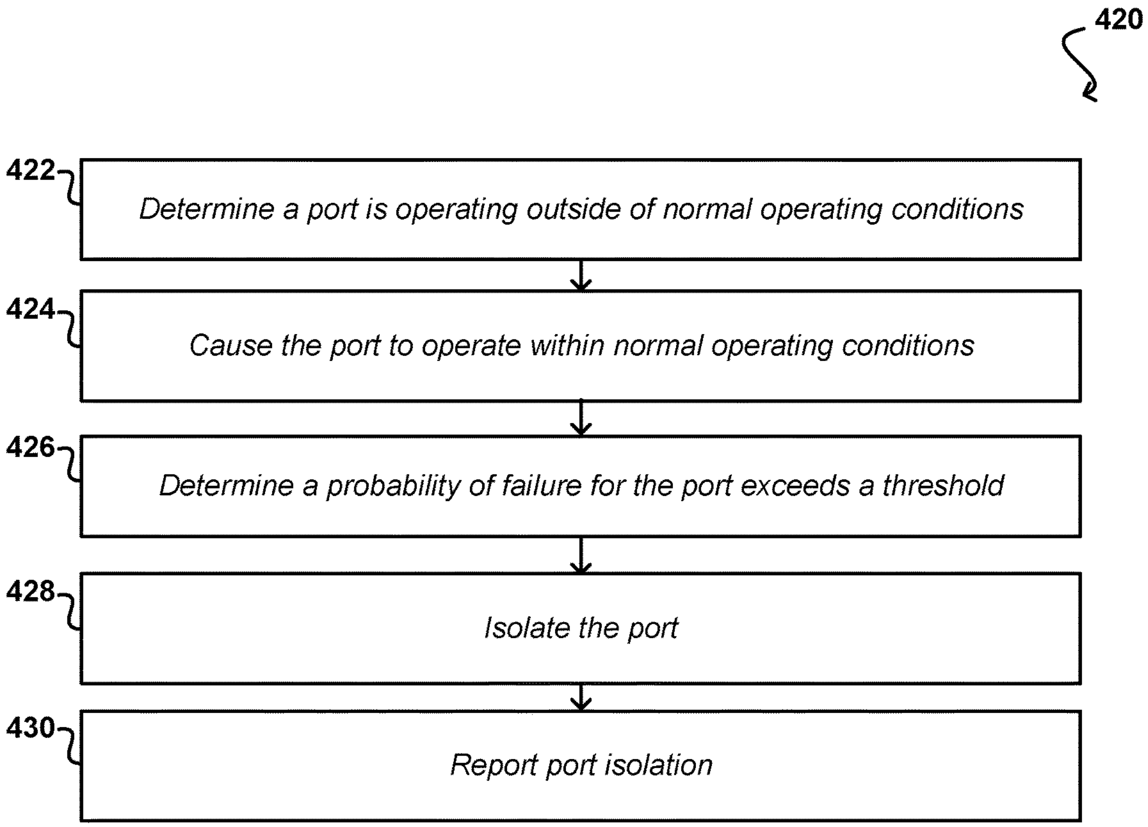
FIG. 4B illustrates an example process for isolating a port with threshold failure probabilities, in accordance with at least one embodiment.

FIG. 4B illustrates an example process 420 for isolating a port, in accordance with at least one embodiment. In this example, operating conditions for a port may be evaluated and it may be determined that the port is operating outside of normal operating conditions 422. One or more operations may then be executed to cause the port to operate within normal operating conditions 424. By way of example, a fan may be turned on. As another example, electronic equipment may be rebooted. A probability of failure for a port may be determined to exceed a threshold 422. The port may then be isolated 428 and a report for the port isolation may be generated 430. Accordingly, systems and methods may be deployed to monitor and evaluate probabilities of failure when ports are operating using normal operating conditions.

Figure 4C:
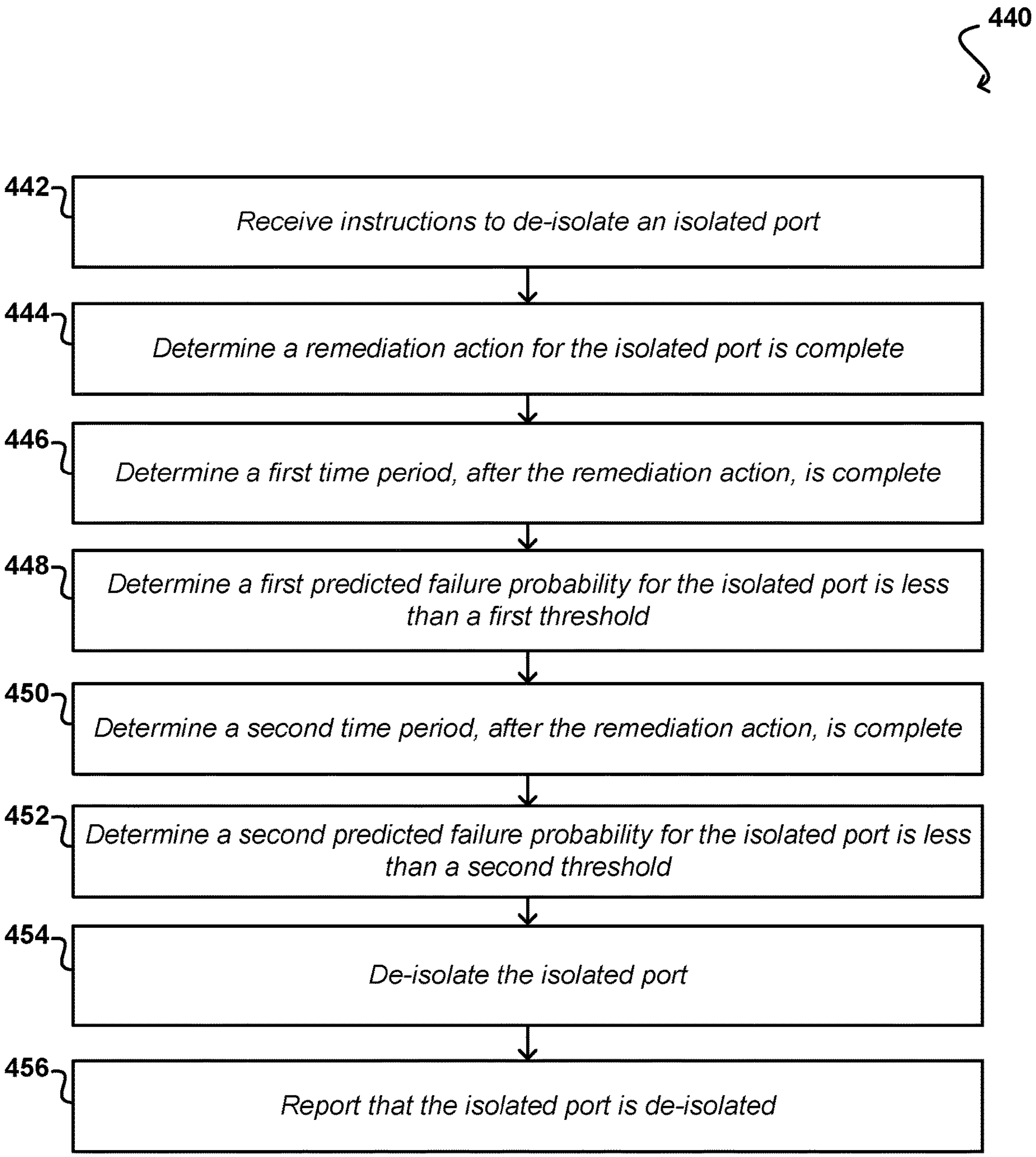
FIG. 4C illustrates an example process for de-isolating a port with threshold failure probabilities, in accordance with at least one embodiment.

FIG. 4C illustrates an example process 440 for de-isolating a port, in accordance with at least one embodiment. In this example, instructions are received to de-isolate an isolated port 442. For example, the instructions may include attempting to de-isolate a port after a given period of time, after one or more maintenance/remediation operations, and/or the like. In at least one embodiment, the instructions may be part of an automated workflow and/or may be human initiated instructions, or combinations thereof. It may be determined that a remediation action is complete 444 and that a first time period, after the remediation action, is complete 446. For example, the time period may correspond to a threshold period of time that may be particularly selected for different remediation actions. A first predicted failure probability may be determined, for example using one or more ML models as noted herein, and that predicted failure probability may be evaluated against a threshold. It may be determined the first predicted failure probability is less than the threshold 448, indicating that the remediation action was potentially successful. However, in certain embodiments, it may be desirable to wait for different periods of time to ensure that an action was successful. For example, telemetry information may only be available at a given interval, and as a result, new information obtained at a later time with more waiting may provide additional information that could provide an improved prediction of failure probability. Systems and methods of the present disclosure recognized such a benefit, and as a result, the illustrated process may include a determination that a second time period, after the remediation action, is complete 450. After completion of the second time period, a second predicted failure probability for the port may be determined and evaluated against a threshold. It may be determined that the second predicted failure probability is less than the threshold 452, which may be a different threshold than that used for the first predicted failure probability or may be the same. Thereafter, the isolated port may be de-isolated 454 and it may be reported that the isolated port is now de-isolated 456. In at least one embodiment, intermediate portions of the process may include further evaluation whether one or more actions were successful prior to continuing. If actions were deemed unsuccessful, the process may be stopped, for example, to provide an alarm or other indicator.

Figure 4D:
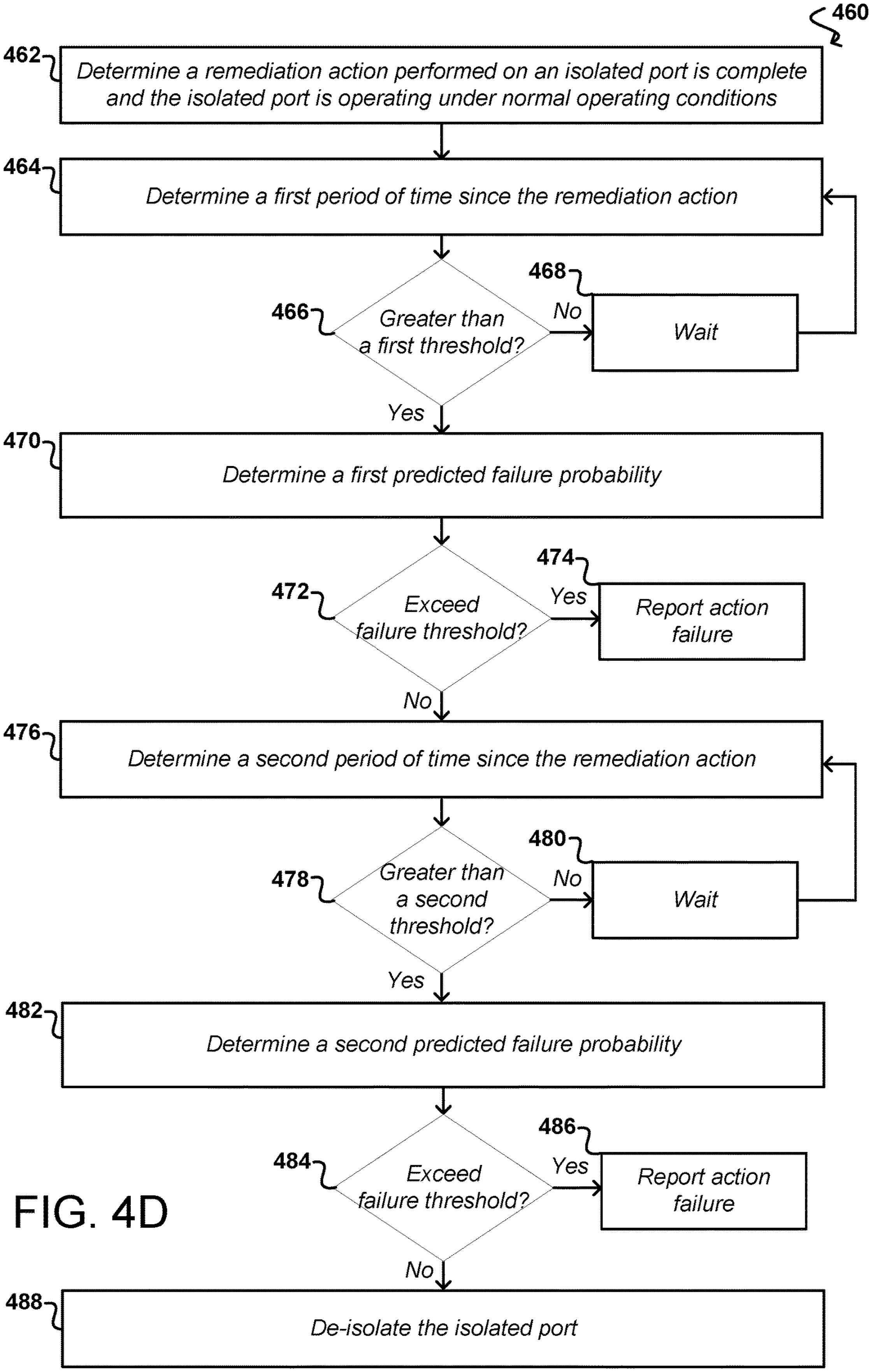
FIG. 4D illustrates an example process for de-isolating a port with threshold failure probabilities, in accordance with at least one embodiment.

FIG. 4D illustrates an example process 460 for de-isolating a port, in accordance with at least one embodiment. In this example, a remediation action may be complete and an isolated port may be determined to return to normal operating conditions 462. As noted herein, attempting to de-isolate the port when not under normal operating conditions could potentially waste resources, because if the operating conditions are not normal, that would provide an indication that additional actions for the port are likely necessary. In at least one embodiment, a first period of time since the remediation action may be determined 464. The first period of time may then be evaluated against a first threshold and a determination may be made whether the first period of time exceeds a first threshold 466. If not, the system may wait to proceed until the first threshold is exceeded 468. If so, then a first predicted failure probability may be determined 470, for example using one or more ML systems based, at least in part, on telemetry information acquired while the port is isolated. The first predicted failure probability may then be evaluated against a failure threshold to determine whether the first predicted failure probability exceeds the failure threshold 472. If so, then it may be reported that the remediation action has failed 474. If not, then a second period of time after the remediation action may be determined 476.

The second period of time may be greater than the first period of time, thereby allowing time for additional data collection and evaluation. By waiting for a second period of time, there may be a reduced risk of prematurely de-isolating a port. The second period of time may then be evaluated against a second threshold and a determination may be made whether the second period of time exceeds a second threshold 478. If not, the system may wait to proceed until the second threshold is exceeded 480. If so, then a second predicted failure probability may be determined 482, for example using one or more ML systems based, at least in part, on telemetry information acquired while the port is isolated. The second predicted failure probability may then be evaluated against a failure threshold, which may be the same or different from the threshold used to evaluate the first predicted failure probability, to determine whether the second predicted failure probability exceeds the failure threshold 484. If so, then it may be reported that the remediation action has failed 486. If not, then the port may be de-isolated 488.

Figure 4E:
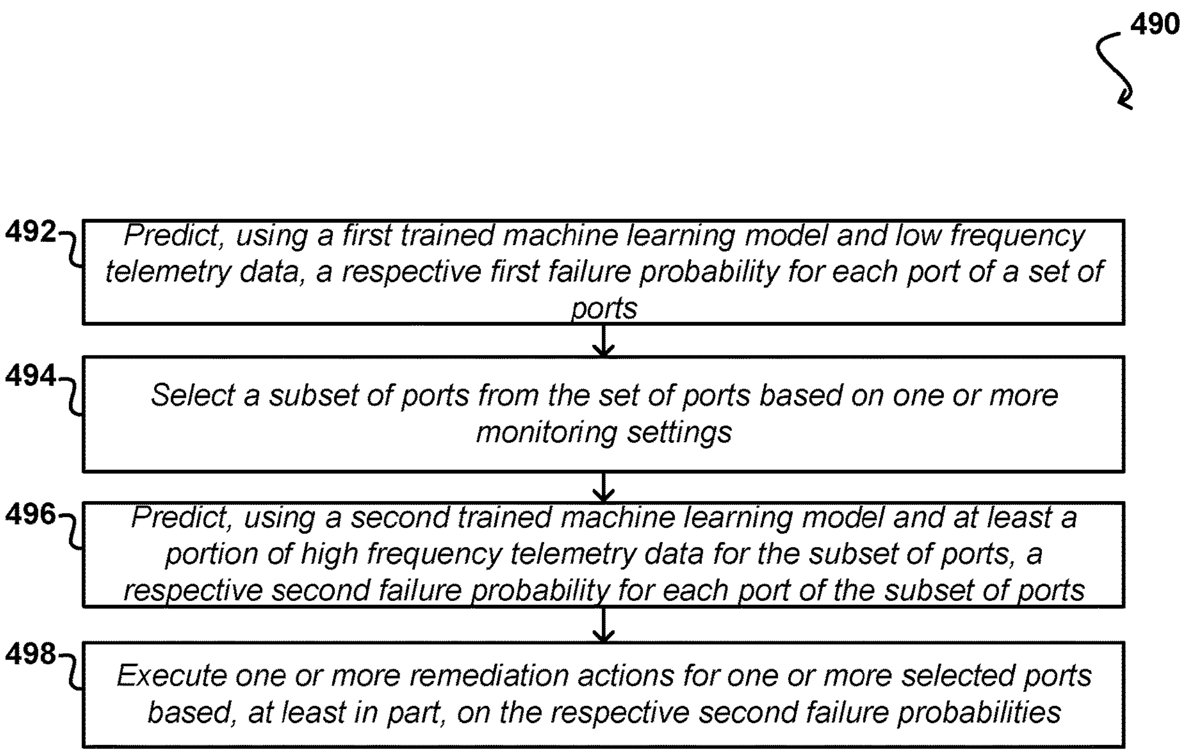
FIG. 4E illustrates an example process for executing one or more remediation actions for one or more ports, in accordance with at least one embodiment.

FIG. 4E illustrates an example process 490 that can be used to identify one or more ports with a probability of failure. In this example, low frequency telemetry data is received for a set of ports and that low frequency telemetry data, or at least a portion of the low frequency telemetry data, may be used by one or more ML models to predict a first failure probability for the set of ports 492. The prediction may be based, at least in part, on one or more factors of the port, the workload associated with the port, or the like. The models may be trained to identify and correlate different telemetry data to a likelihood of failure, where different data may be weighed differently.

In at least one embodiment, a subset of ports from the set of ports may be selected based on one or more monitoring settings 494. The monitoring settings may include user controlled settings that may select certain ports for enhanced monitoring, for example ports that are deemed "important" for one or more reasons, ports in certain locations, and/or the like. Monitoring settings may further include selection based on whether the first failure probabilities exceed one or more thresholds. For example, the threshold may be a threshold failure probability. Additionally, the threshold may be a threshold number of ports, where the highest X % of ports are selected for further evaluation, among other options.

High frequency telemetry data may be received for the subset of ports. As noted herein, high frequency telemetry data may be acquired more rapidly than the low frequency telemetry data, and as a result, may provide more data over a period of time for evaluation. By only looking at this information for a subset of the ports, systems and methods of the present disclosure may conserve resource expenditure and evaluate potential failures in less time. A second failure probability may be predicted for the subset of ports using the high frequency telemetry data 496. In at least one embodiment, the models used for the predictions may be different. However, the models used for the predictions may also share one or more features or parameters. Additionally, the models may be use the same or different underlying architecture and/or weights. As discussed herein, the second failure probabilities may be based on different information than the first failure probabilities, for example, based on different properties of the subset of ports, among other options.

In at least one embodiment, one or more remediation actions may be executed for one or more selected ports based, at least in part, on the respective second failure probabilities 498. Remediation actions may include, as non-limiting examples, resetting the port, adjusting parameters of the port, adjusting a physical connection to the port, and/or the like. One potential remediation action is to isolate one or more ports. Another may include providing an alert or an indication to an administrator or as a report for further monitoring. In at least one embodiment, remediation actions may be constrained by a hierarchical set of operating conditions such that the remediation actions do not override or otherwise change established operating conditions, such as network topology or the like.

Figure 5A:
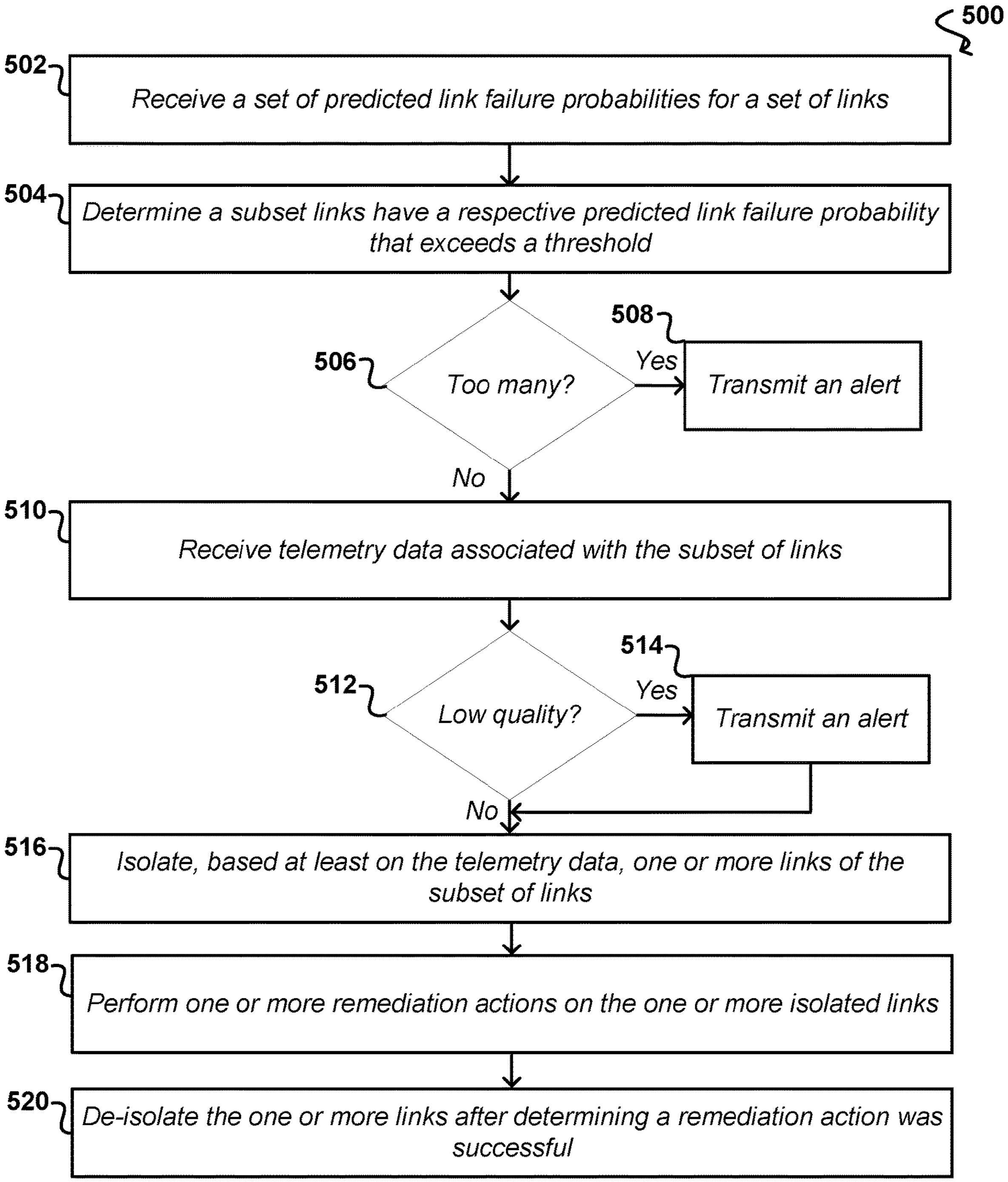
FIG. 5A illustrates an example process for periodic prediction, isolation, and de-isolation of ports, in accordance with at least one embodiment.
Figure 5B:
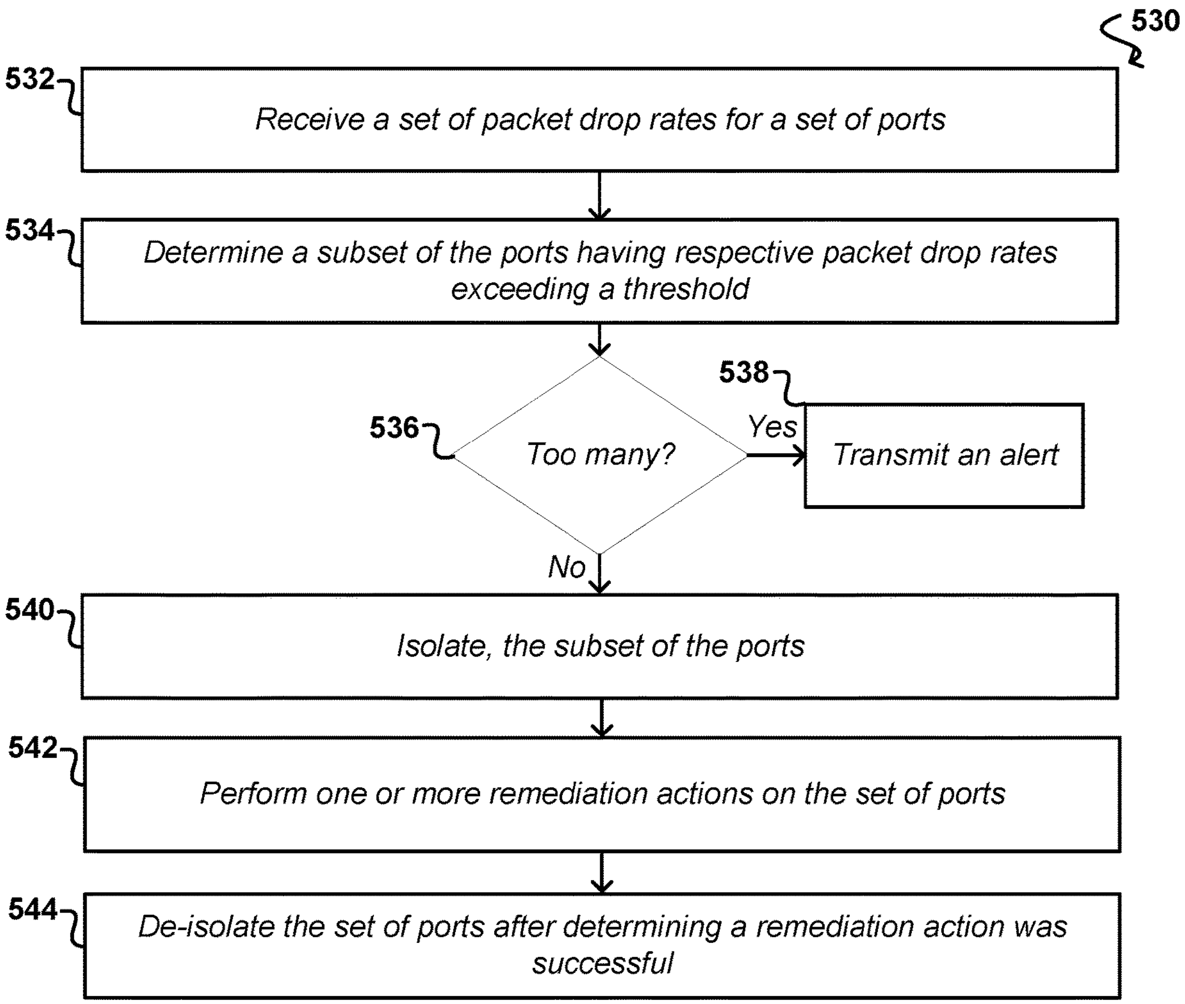
FIG. 5B illustrates an example process for periodic packet drop detection, isolation, and de-isolation of ports, in accordance with at least one embodiment.

FIGS. 5A-5D illustrate example flows that may be used with embodiments of the present disclosure. As shown, FIG. 5A corresponds to a flow for periodic prediction in which predicted link failures may be checked against a total number threshold, additional telemetry data may be acquired, data quality may be evaluated, and then an isolate flow (FIG. 5C) or a de-isolate flow (FIG. 5D) may be called. FIG. 5B corresponds to a flow for periodic packet drop detection in which a number of ports with a probability of failure exceeding a threshold may be evaluated against a total number threshold and then the isolate flow (FIG. 5C) or the de-isolate flow (FIG. 5D) may be called.

FIG. 5A illustrates an example process 500 for periodic monitoring, in accordance with at least one embodiment. In this example, a set of predicted link failure probabilities for a set of links is received 502. For example, telemetry information may be collected to provide input to one or more machine learning systems to infer a probability of link failure based on the telemetry information. A subset of links may be determined to have respective predicted link failure probabilities that exceed a threshold 504. For example, the link failure probabilities may exceed a set threshold quantity, may exceed a percentage, or may be compared to one or more other metrics. It may be determined whether the number of links in the subset exceeds a threshold 506. For example, tool many links with high probabilities may be indicated of greater network failures and/or additional problems that would be better suited by a shutdown or a more aggressive set of remediation techniques. Determining that too many links exceed the threshold may lead to transmission of an alert 508.

Telemetry data may be received for the subset of links 510. The telemetry data may be evaluated for quality 512, for example how often the data is received, a source of the data, and/or the like. Low quality data may lead to transmission of an alert 514, which may set up a job or a task to correct the sensors acquiring the data. It may be determined that, based on the telemetry data, that one or more links of the subset of links is to be isolated 516. One or more remediation actions may be performed on the one or more isolated links 518 and then the links, upon determining the remediation actions were successful, may be de-isolated 520.

FIG. 5A illustrates an example process 500 for periodic monitoring, in accordance with at least one embodiment. In this example, a set of predicted link failure probabilities for a set of links is received 502. For example, telemetry information may be collected to provide input to one or more machine learning systems to infer a probability of link failure based on the telemetry information. A subset of links may be determined to have respective predicted link failure probabilities that exceed a threshold 504. For example, the link failure probabilities may exceed a set threshold quantity, may exceed a percentage, or may be compared to one or more other metrics. It may be determined whether the number of links in the subset exceeds a threshold 506. For example, too many links with high probabilities may be indicated of greater network failures and/or additional problems that would be better suited by a shutdown or a more aggressive set of remediation techniques. Determining that too many links exceed the threshold may lead to transmission of an alert 508.

Telemetry data may be received for the subset of links 510. The telemetry data may be evaluated for quality 512, for example how often the data is received, a source of the data, and/or the like. Low quality data may lead to transmission of an alert 514, which may set up a job or a task to correct the sensors acquiring the data. It may be determined that, based on the telemetry data, that one or more links of the subset of links is to be isolated 516. One or more remediation actions may be performed on the one or more isolated links 518 and then the links, upon determining the remediation actions were successful, may be de-isolated 520.

FIG. 5B illustrates an example process 530 for packet drop rate monitoring, in accordance with at least one embodiment. In this example, a set of packet drop rates for a set of ports is received 532. For example, telemetry information may be collected to determine a current drop rate and/or to predict a future drop rate. A subset of ports may be determined to have respective drop rates that exceed a threshold 534. For example, the drop rates may exceed a set threshold quantity, may exceed a percentage, or may be compared to one or more other metrics. It may be determined whether the number of ports in the subset exceeds a threshold 536. For example, ports with high drop rates may be indicated of greater network failures and/or additional problems. These problems may be better address by a widescale repair, rather than individual isolation. In at least one embodiment, determining that too many ports exceed the threshold may lead to transmission of an alert 538. It may be determined that, based on information such as telemetry data, machine learning inferences, and/or the like that one or more ports of the subset of ports is to be isolated 540. One or more remediation actions may be performed on the one or more isolated ports 542 and then the ports, upon determining the remediation actions were successful, may be de-isolated 544.

Figure 5C:
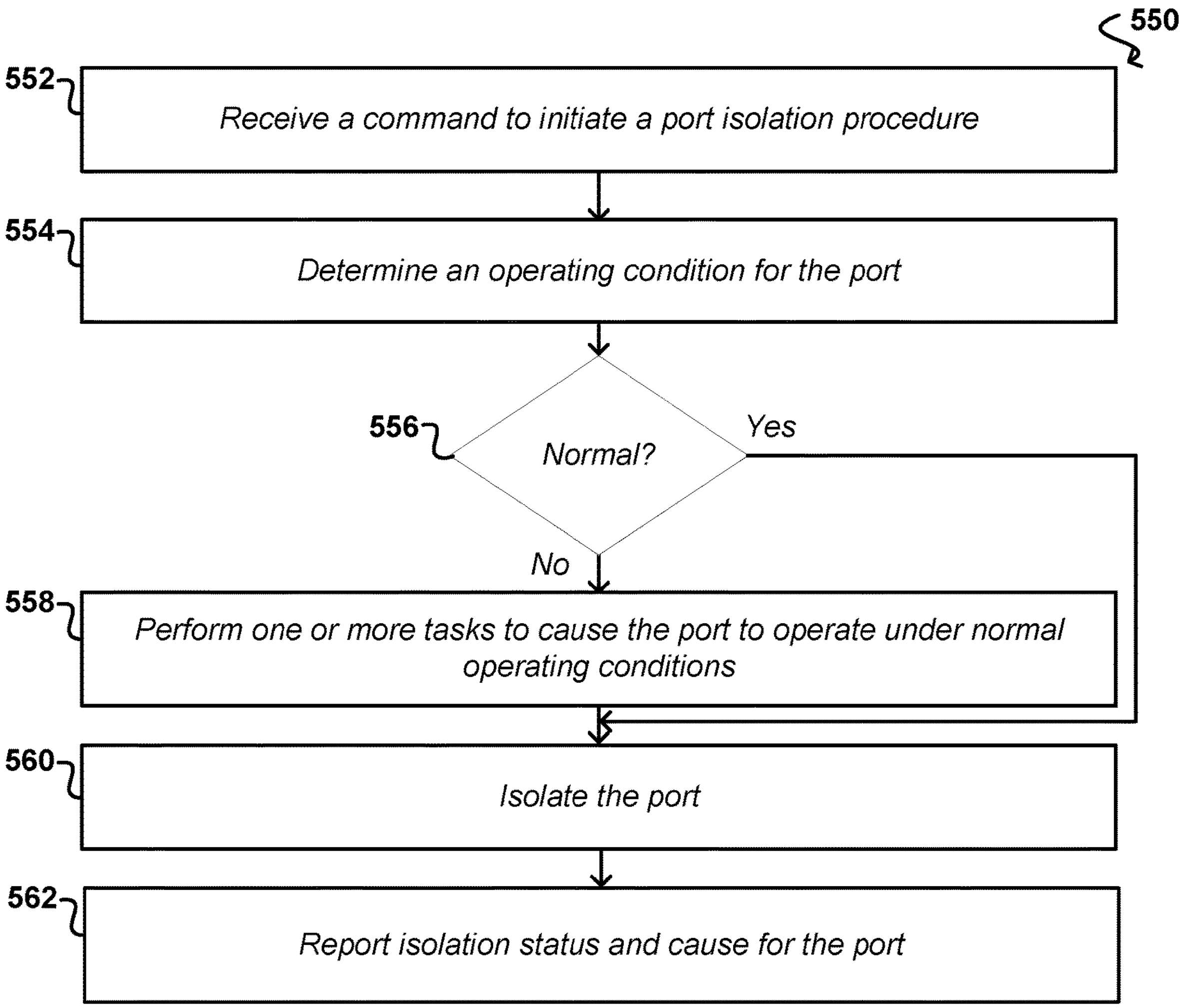
FIG. 5C illustrates an example process for isolation of ports, in accordance with at least one embodiment.

FIG. 5C illustrates an example process 550 for port isolation, in accordance with at least one embodiment. In this example, a command is received to initiate a port isolation procedure 552. The command may be part of a workflow or may be a command from a user, among various other options. In at least one embodiment, the port isolation procedure may be based on an evaluation of port performance and/or on based on predicted future port performance. An operation condition for the port may be determined 554. As discussed, it may be advantageous to evaluate ports under a normal operating condition because information associated with the port operating parameters may be more accurate under normal conditions than in extreme conditions. The port conditions may be evaluated to determine whether the port is operating under normal conditions 556. If not, then one or more tasks may be executed to cause the port to operate under normal operating conditions 558. The port may then be isolated 560 and a report may be generated 562 to describe the isolation status and cause of the isolation.

Figure 5D:
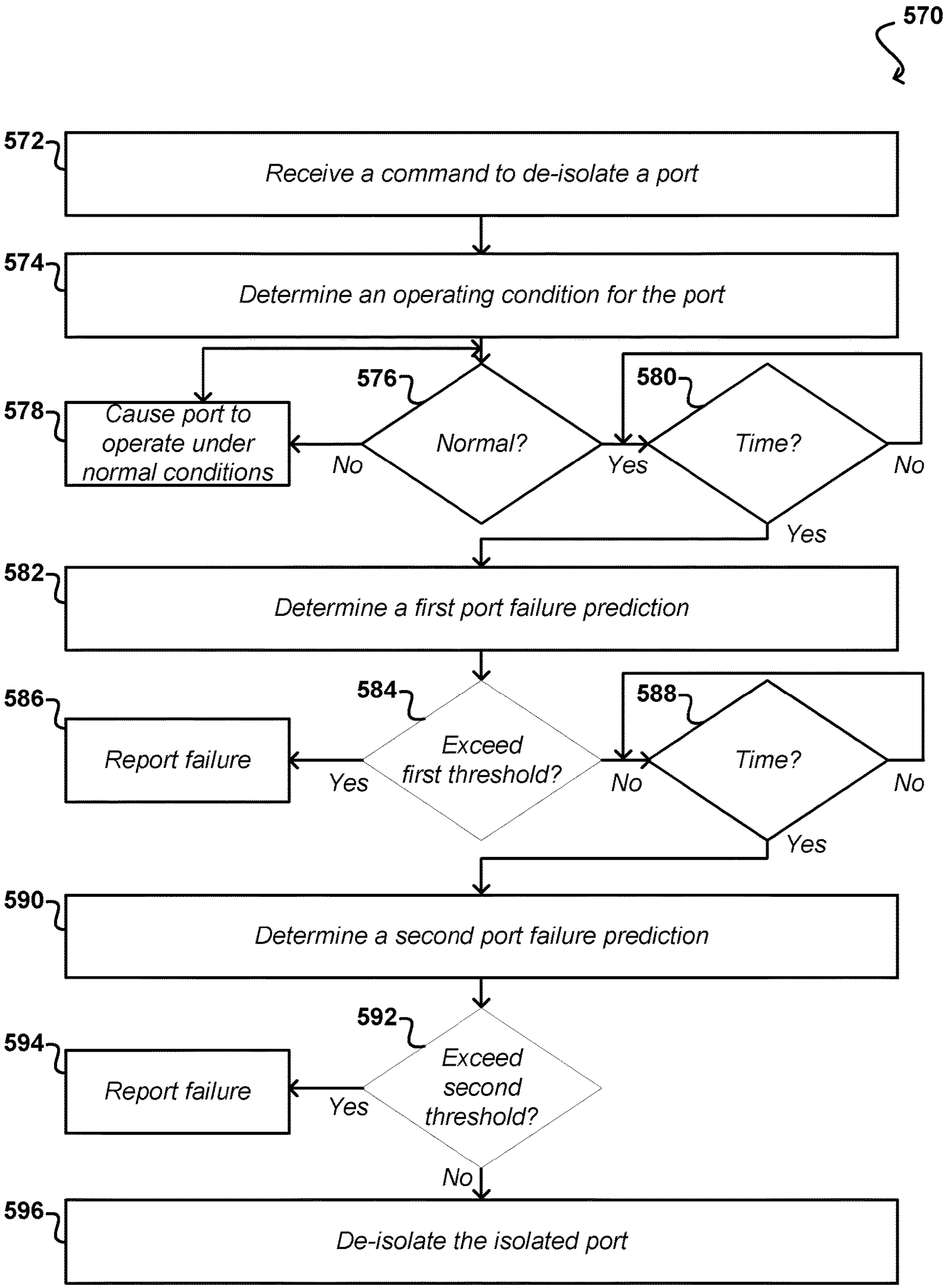
FIG. 5D illustrates an example process for de-isolation of ports, in accordance with at least one embodiment.

FIG. 5D illustrates an example process 570 for port de-isolation, in accordance with at least one embodiment. In this example, a command is received to de-isolate a port 572. The command, as discussed herein, may be part of a workflow or the like and may be received after one or more remediation actions. An operation condition for the port may be determined 574. For example, it may be desirable to evaluate the port in a normal operating condition to predict how the port will interact once de-isolated. It may be determined whether the port is at a normal operating condition 576. If not, one or more actions may be executed to cause the port to operate in a normal operating condition 578. If so, then a time period may be evaluated 580. If a sufficient period of time has passed, then a first port failure prediction may be determined 582. For example, one or more machine learning systems may use information, such as telemetry information collected over the time period, to infer a failure prediction. The prediction may then be evaluated against a first threshold 584 to determine whether the predicted failure for the port exceeds the first threshold. If so, then a failure may be reported 586. For example, it may be reported that a previously applied remediation action was unsuccessful. If not, then a timer period may be evaluated 588. The time period may be less than or greater than the previously evaluated time period. If a sufficient period of time has passed, then a second port failure prediction may be determined 590. The second prediction may use new information collected over the second period of time. The prediction may then be evaluated against a second threshold 592 to determine whether the predicted failure for the port exceeds the second threshold. If so, then a failure may be report 594. If not, then the port may be de-isolated 596.

As discussed, aspects of various approaches presented herein can be lightweight enough to execute on a device such as a client device, such as a personal computer or gaming console, in real time. Such processing can be performed on, or for, content that is generated on, or received by, that client device or received from an external source, such as streaming data or other content received over at least one network. In some instances, the processing and/or determination of this content may be performed by one of these other devices, systems, or entities, then provided to the client device (or another such recipient) for presentation or another such use.

Figure 6:
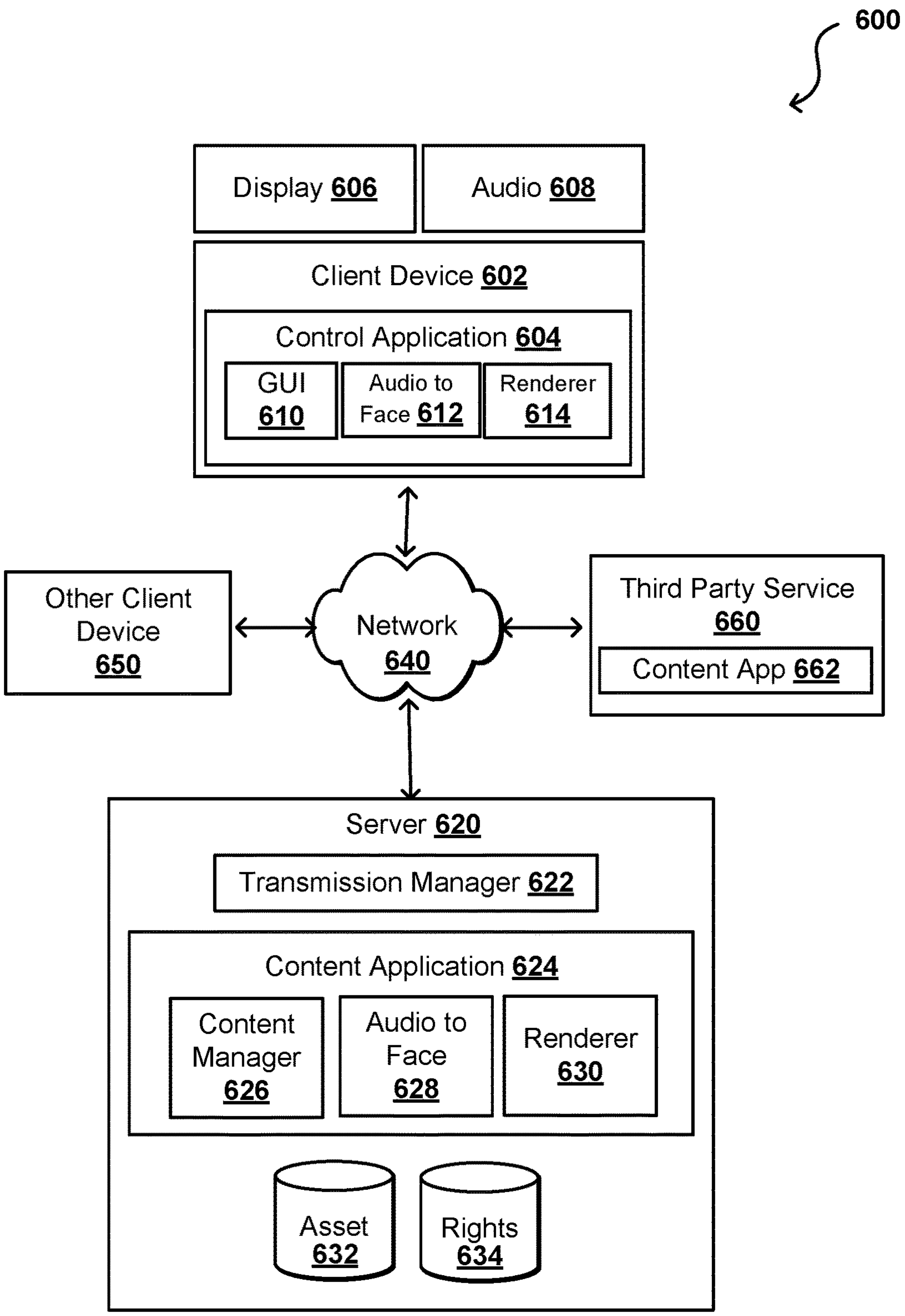
FIG. 6 illustrates components of a distributed system that can be utilized to update or perform inferencing using a machine learning model, according to at least one embodiment.

As an example, FIG. 6 illustrates an example network configuration 600 that can be used to provide, generate, modify, encode, process, and/or transmit image data or other such content. In at least one embodiment, a client device 602 can generate or receive data for a session using components of a control application 604 on client device 602 and data stored locally on that client device. In at least one embodiment, a content application 624 executing on a server 620 (e.g., a cloud server or edge server) may initiate a session associated with at least one client device 602, as may utilize a session manager and user data stored in a user database 636, and can cause content such as one or more digital assets (e.g., object representations) from an asset repository 634 to be determined by a content manager 626. A content manager 626 may work with an image synthesis module 628 to generate or synthesize new objects, digital assets, or other such content to be provided for presentation via the client device 602. In at least one embodiment, this image synthesis module 628 can use one or more neural networks, or machine learning models, which can be trained or updated using a training module 632 or system that is on, or in communication with, the server 620. This can include training and/or using a diffusion model 630 to generate content tiles that can be used by an image synthesis module 628, for example, to apply a non-repeating texture to a region of an environment for which image or video data is to be presented via a client device 602. At least a portion of the generated content may be transmitted to the client device 602 using an appropriate transmission manager 622 to send by download, streaming, or another such transmission channel. An encoder may be used to encode and/or compress at least some of this data before transmitting to the client device 602. In at least one embodiment, the client device 602 receiving such content can provide this content to a corresponding control application 604, which may also or alternatively include a graphical user interface 610, content manager 612, and image synthesis or diffusion module 614 for use in providing, synthesizing, modifying, or using content for presentation (or other purposes) on or by the client device 602. A decoder may also be used to decode data received over the network(s) 640 for presentation via client device 602, such as image or video content through a display 606 and audio, such as sounds and music, through at least one audio playback device 608, such as speakers or headphones. In at least one embodiment, at least some of this content may already be stored on, rendered on, or accessible to client device 602 such that transmission over network 640 is not required for at least that portion of content, such as where that content may have been previously downloaded or stored locally on a hard drive or optical disk. In at least one embodiment, a transmission mechanism such as data streaming can be used to transfer this content from server 620, or user database 636, to client device 602. In at least one embodiment, at least a portion of this content can be obtained, enhanced, and/or streamed from another source, such as a third party service 660 or other client device 650, that may also include a content application 662 for generating, enhancing, or providing content. In at least one embodiment, portions of this functionality can be performed using multiple computing devices, or multiple processors within one or more computing devices, such as may include a combination of CPUs and GPUs.

In this example, these client devices can include any appropriate computing devices, as may include a desktop computer, notebook computer, set-top box, streaming device, gaming console, smartphone, tablet computer, VR headset, AR goggles, wearable computer, or a smart television. Each client device can submit a request across at least one wired or wireless network, as may include the Internet, an Ethernet, a local area network (LAN), or a cellular network, among other such options. In this example, these requests can be submitted to an address associated with a cloud provider, who may operate or control one or more electronic resources in a cloud provider environment, such as may include a data center or server farm. In at least one embodiment, the request may be received or processed by at least one edge server, that sits on a network edge and is outside at least one security layer associated with the cloud provider environment. In this way, latency can be reduced by enabling the client devices to interact with servers that are in closer proximity, while also improving security of resources in the cloud provider environment.

In at least one embodiment, such a system can be used for performing graphical rendering operations. In other embodiments, such a system can be used for other purposes, such as for providing image or video content to test or validate autonomous machine applications, or for performing deep learning operations. In at least one embodiment, such a system can be implemented using an edge device, or may incorporate one or more Virtual Machines (VMs). In at least one embodiment, such a system can be implemented at least partially in a data center or at least partially using cloud computing resources.

Inference and Training Logic

Figure 7A:
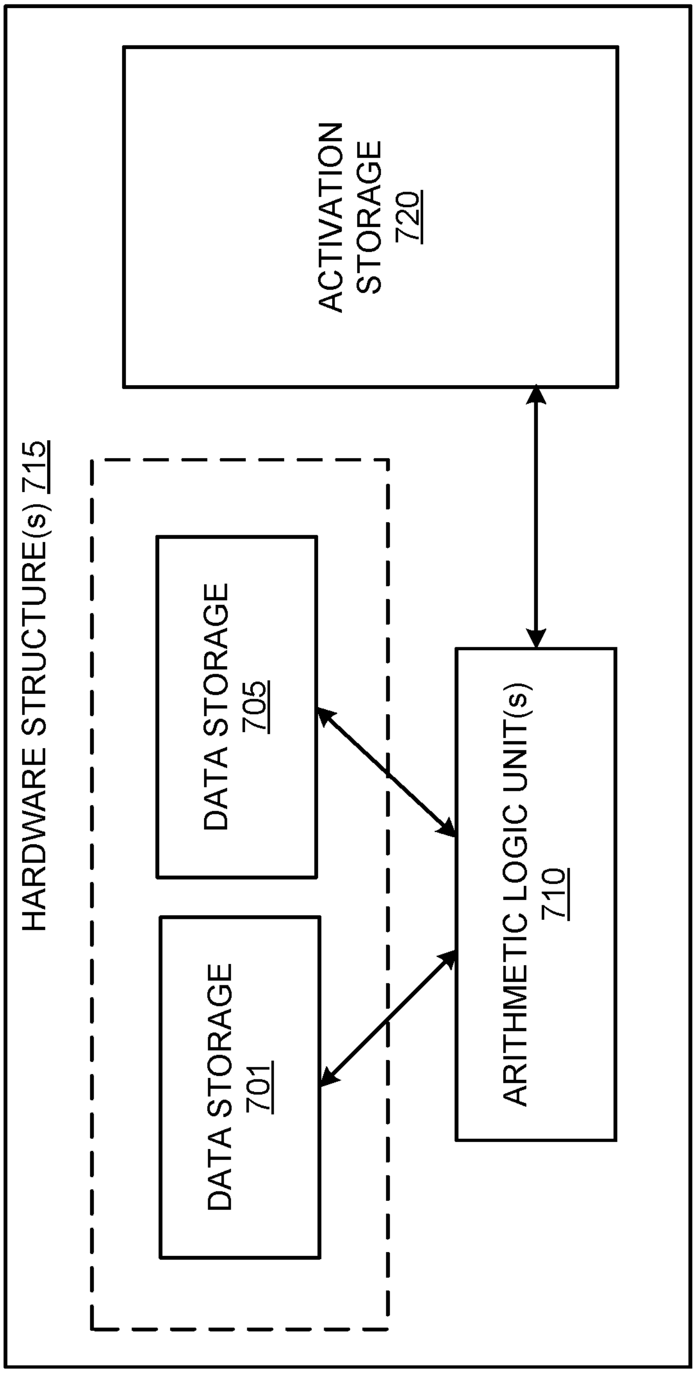
FIG. 7A illustrates inference and/or training logic, according to at least one embodiment.

FIG. 7A illustrates inference and/or training logic 715 used to perform inferencing and/or training operations associated with one or more embodiments. Details regarding inference and/or training logic 715 are provided below in conjunction with FIGS. 7A and/or 7B.

In at least one embodiment, inference and/or training logic 715 may include, without limitation, code and/or data storage 701 to store forward and/or output weight and/or input/output data, and/or other parameters to configure neurons or layers of a neural network trained and/or used for inferencing in aspects of one or more embodiments. In at least one embodiment, training logic 715 may include, or be coupled to code and/or data storage 701 to store graph code or other software to control timing and/or order, in which weight and/or other parameter information is to be loaded to configure, logic, including integer and/or floating point units (collectively, arithmetic logic units (ALUs). In at least one embodiment, code, such as graph code, loads weight or other parameter information into processor ALUs based on an architecture of a neural network to which the code corresponds. In at least one embodiment, code and/or data storage 701 stores weight parameters and/or input/output data of each layer of a neural network trained or used in conjunction with one or more embodiments during forward propagation of input/output data and/or weight parameters during training and/or inferencing using aspects of one or more embodiments. In at least one embodiment, any portion of code and/or data storage 701 may be included with other on-chip or off-chip data storage, including a processor's L1, L2, or L3 cache or system memory.

In at least one embodiment, any portion of code and/or data storage 701 may be internal or external to one or more processors or other hardware logic devices or circuits. In at least one embodiment, code and/or data storage 701 may be cache memory, dynamic randomly addressable memory ("DRAM"), static randomly addressable memory ("SRAM"), non-volatile memory (e.g., Flash memory), or other storage. In at least one embodiment, choice of whether code and/or data storage 701 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors.

In at least one embodiment, inference and/or training logic 715 may include, without limitation, a code and/or data storage 705 to store backward and/or output weight and/or input/output data corresponding to neurons or layers of a neural network trained and/or used for inferencing in aspects of one or more embodiments. In at least one embodiment, code and/or data storage 705 stores weight parameters and/or input/output data of each layer of a neural network trained or used in conjunction with one or more embodiments during backward propagation of input/output data and/or weight parameters during training and/or inferencing using aspects of one or more embodiments. In at least one embodiment, training logic 715 may include, or be coupled to code and/or data storage 705 to store graph code or other software to control timing and/or order, in which weight and/or other parameter information is to be loaded to configure, logic, including integer and/or floating point units (collectively, arithmetic logic units (ALUs). In at least one embodiment, code, such as graph code, loads weight or other parameter information into processor ALUs based on an architecture of a neural network to which the code corresponds. In at least one embodiment, any portion of code and/or data storage 705 may be included with other on-chip or off-chip data storage, including a processor's L1, L2, or L3 cache or system memory. In at least one embodiment, any portion of code and/or data storage 705 may be internal or external to on one or more processors or other hardware logic devices or circuits. In at least one embodiment, code and/or data storage 705 may be cache memory, DRAM, SRAM, non-volatile memory (e.g., Flash memory), or other storage. In at least one embodiment, choice of whether code and/or data storage 705 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors.

In at least one embodiment, code and/or data storage 701 and code and/or data storage 705 may be separate storage structures. In at least one embodiment, code and/or data storage 701 and code and/or data storage 705 may be same storage structure. In at least one embodiment, code and/or data storage 701 and code and/or data storage 705 may be partially same storage structure and partially separate storage structures. In at least one embodiment, any portion of code and/or data storage 701 and code and/or data storage 705 may be included with other on-chip or off-chip data storage, including a processor's L1, L2, or L3 cache or system memory.

In at least one embodiment, inference and/or training logic 715 may include, without limitation, one or more arithmetic logic unit(s) ("ALU(s)") 710, including integer and/or floating point units, to perform logical and/or mathematical operations based, at least in part on, or indicated by, training and/or inference code (e.g., graph code), a result of which may produce activations (e.g., output values from layers or neurons within a neural network) stored in an activation storage 720 that are functions of input/output and/or weight parameter data stored in code and/or data storage 701 and/or code and/or data storage 705. In at least one embodiment, activations stored in activation storage 720 are generated according to linear algebraic and or matrix-based mathematics performed by ALU(s) 710 in response to performing instructions or other code, wherein weight values stored in code and/or data storage 705 and/or code and/or data storage 701 are used as operands along with other values, such as bias values, gradient information, momentum values, or other parameters or hyperparameters, any or all of which may be stored in code and/or data storage 705 or code and/or data storage 701 or another storage on or off-chip.

In at least one embodiment, ALU(s) 710 are included within one or more processors or other hardware logic devices or circuits, whereas in another embodiment, ALU(s) 710 may be external to a processor or other hardware logic device or circuit that uses them (e.g., a co-processor). In at least one embodiment, ALU(s) 710 may be included within a processor's execution units or otherwise within a bank of ALUs accessible by a processor's execution units either within same processor or distributed between different processors of different types (e.g., central processing units, graphics processing units, fixed function units, etc.). In at least one embodiment, code and/or data storage 701, code and/or data storage 705, and activation storage 720 may be on same processor or other hardware logic device or circuit, whereas in another embodiment, they may be in different processors or other hardware logic devices or circuits, or some combination of same and different processors or other hardware logic devices or circuits. In at least one embodiment, any portion of activation storage 720 may be included with other on-chip or off-chip data storage, including a processor's L1, L2, or L3 cache or system memory. Furthermore, inferencing and/or training code may be stored with other code accessible to a processor or other hardware logic or circuit and fetched and/or processed using a processor's fetch, decode, scheduling, execution, retirement and/or other logical circuits.

In at least one embodiment, activation storage 720 may be cache memory, DRAM, SRAM, non-volatile memory (e.g., Flash memory), or other storage. In at least one embodiment, activation storage 720 may be completely or partially within or external to one or more processors or other logical circuits. In at least one embodiment, choice of whether activation storage 720 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors. In at least one embodiment, inference and/or training logic 715 illustrated in FIG. 7A may be used in conjunction with an application-specific integrated circuit ("ASIC"), such as Tensorflow® Processing Unit from Google, an inference processing unit (IPU) from Graphcore™, or a Nervana® (e.g., "Lake Crest") processor from Intel Corp. In at least one embodiment, inference and/or training logic 715 illustrated in FIG. 7A may be used in conjunction with central processing unit ("CPU") hardware, graphics processing unit ("GPU") hardware or other hardware, such as field programmable gate arrays ("FPGAs").

Figure 7B:
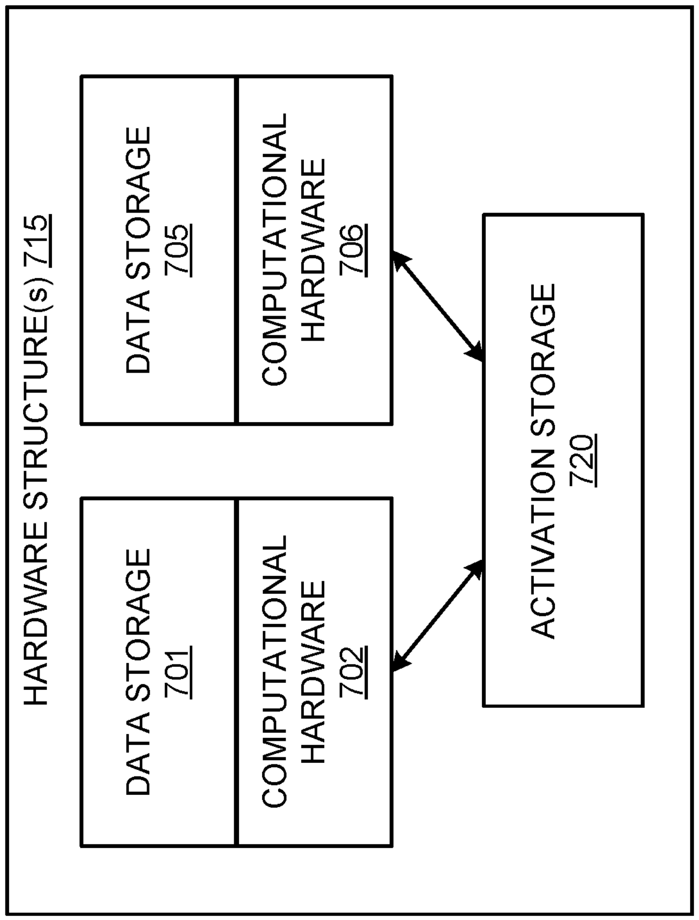
FIG. 7B illustrates inference and/or training logic, according to at least one embodiment.

FIG. 7B illustrates inference and/or training logic 715, according to at least one or more embodiments. In at least one embodiment, inference and/or training logic 715 may include, without limitation, hardware logic in which computational resources are dedicated or otherwise exclusively used in conjunction with weight values or other information corresponding to one or more layers of neurons within a neural network. In at least one embodiment, inference and/or training logic 715 illustrated in FIG. 7B may be used in conjunction with an application-specific integrated circuit (ASIC), such as Tensorflow® Processing Unit from Google, an inference processing unit (IPU) from Graphcore™, or a Nervana® (e.g., "Lake Crest") processor from Intel Corp. In at least one embodiment, inference and/or training logic 715 illustrated in FIG. 7B may be used in conjunction with central processing unit (CPU) hardware, graphics processing unit (GPU) hardware or other hardware, such as field programmable gate arrays (FPGAs). In at least one embodiment, inference and/or training logic 715 includes, without limitation, code and/or data storage 701 and code and/or data storage 705, which may be used to store code (e.g., graph code), weight values and/or other information, including bias values, gradient information, momentum values, and/or other parameter or hyperparameter information. In at least one embodiment illustrated in FIG. 7B, each of code and/or data storage 701 and code and/or data storage 705 is associated with a dedicated computational resource, such as computational hardware 702 and computational hardware 706, respectively. In at least one embodiment, each of computational hardware 702 and computational hardware 706 comprises one or more ALUs that perform mathematical functions, such as linear algebraic functions, only on information stored in code and/or data storage 701 and code and/or data storage 705, respectively, result of which is stored in activation storage 720.

In at least one embodiment, each of code and/or data storage 701 and 705 and corresponding computational hardware 702 and 706, respectively, correspond to different layers of a neural network, such that resulting activation from one "storage/computational pair 701/702" of code and/or data storage 701 and computational hardware 702 is provided as an input to "storage/computational pair 705/706" of code and/or data storage 705 and computational hardware 706, in order to mirror conceptual organization of a neural network. In at least one embodiment, each of storage/computational pairs 701/702 and 705/706 may correspond to more than one neural network layer. In at least one embodiment, additional storage/computation pairs (not shown) subsequent to or in parallel with storage computation pairs 701/702 and 705/706 may be included in inference and/or training logic 715.

Data Center

Figure 8:
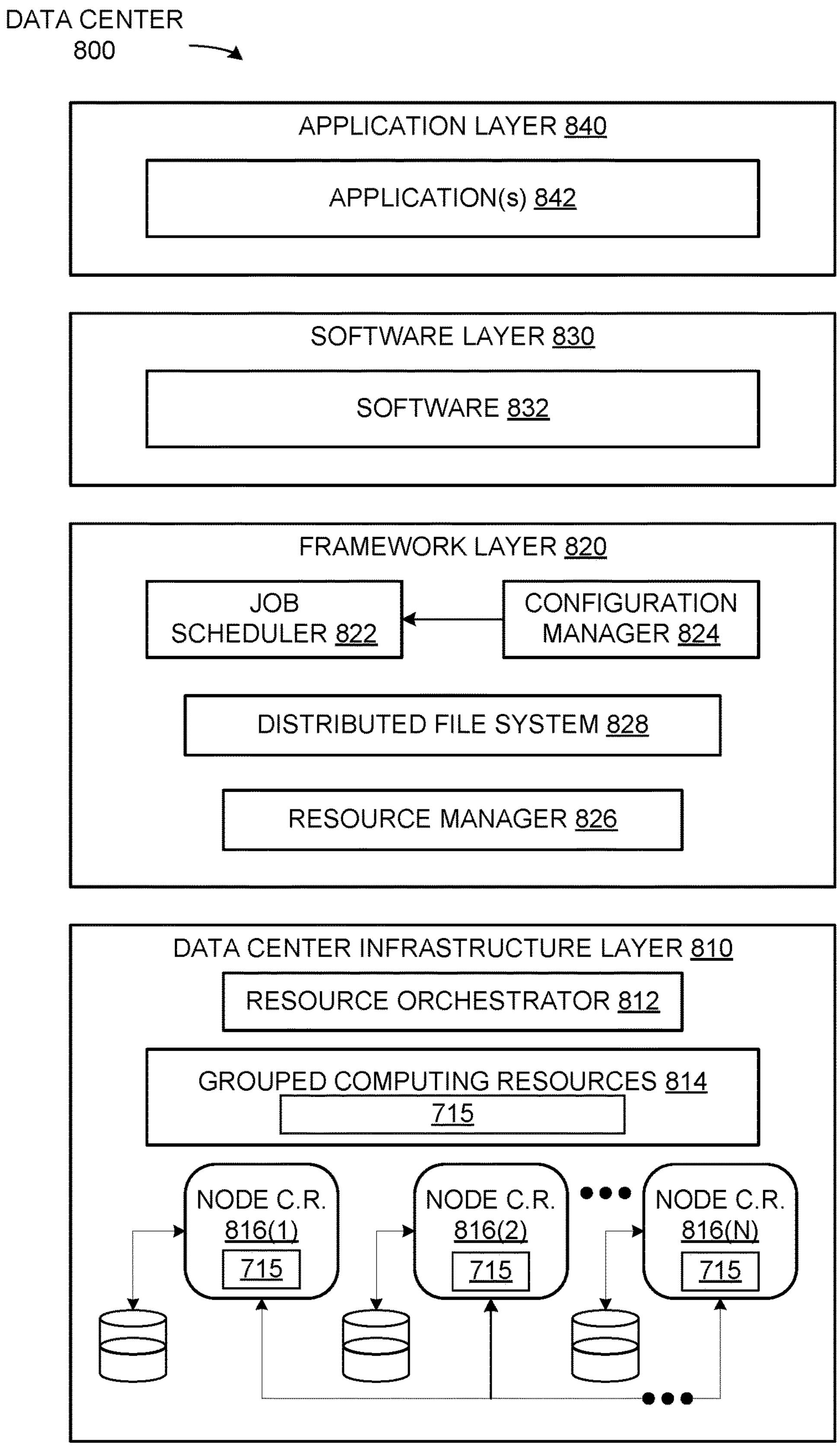
FIG. 8 illustrates an example data center system, according to at least one embodiment.

FIG. 8 illustrates an example data center 800, in which at least one embodiment may be used. In at least one embodiment, data center 800 includes a data center infrastructure layer 810, a framework layer 820, a software layer 830, and an application layer 840.

In at least one embodiment, as shown in FIG. 8, data center infrastructure layer 810 may include a resource orchestrator 812, grouped computing resources 814, and node computing resources ("node C.R.s") 816(1)-816(N), where "N" represents any whole, positive integer. In at least one embodiment, node C.R.s 816(1)-816(N) may include, but are not limited to, any number of central processing units ("CPUs") or other processors (including accelerators, field programmable gate arrays (FPGAs), graphics processors, etc.), memory devices (e.g., dynamic read-only memory), storage devices (e.g., solid state or disk drives), network input/output ("NW I/O") devices, network switches, virtual machines ("VMs"), power modules, and cooling modules, etc. In at least one embodiment, one or more node C.R.s from among node C.R.s 816(1)-816(N) may be a server having one or more of above-mentioned computing resources.

In at least one embodiment, grouped computing resources 814 may include separate groupings of node C.R.s housed within one or more racks (not shown), or many racks housed in data centers at various geographical locations (also not shown). Separate groupings of node C.R.s within grouped computing resources 814 may include grouped compute, network, memory or storage resources that may be configured or allocated to support one or more workloads. In at least one embodiment, several node C.R.s including CPUs or processors may be grouped within one or more racks to provide compute resources to support one or more workloads. In at least one embodiment, one or more racks may also include any number of power modules, cooling modules, and network switches, in any combination.

In at least one embodiment, resource orchestrator 812 may configure or otherwise control one or more node C.R.s 816(1)-816(N) and/or grouped computing resources 814. In at least one embodiment, resource orchestrator 812 may include a software design infrastructure ("SDI") management entity for data center 800. In at least one embodiment, resource orchestrator 812 may include hardware, software or some combination thereof.

In at least one embodiment, as shown in FIG. 8, framework layer 820 includes a job scheduler 822, a configuration manager 824, a resource manager 826 and a distributed file system 828. In at least one embodiment, framework layer 820 may include a framework to support software 832 of software layer 830 and/or one or more application(s) 842 of application layer 840. In at least one embodiment, software 832 or application(s) 842 may respectively include web-based service software or applications, such as those provided by Amazon Web Services, Google Cloud and Microsoft Azure. In at least one embodiment, framework layer 820 may be, but is not limited to, a type of free and open-source software web application framework such as Apache Spark™ (hereinafter "Spark") that may use distributed file system 828 for large-scale data processing (e.g., "big data"). In at least one embodiment, job scheduler 822 may include a Spark driver to facilitate scheduling of workloads supported by various layers of data center 800. In at least one embodiment, configuration manager 824 may be capable of configuring different layers such as software layer 830 and framework layer 820 including Spark and distributed file system 828 for supporting large-scale data processing. In at least one embodiment, resource manager 826 may be capable of managing clustered or grouped computing resources mapped to or allocated for support of distributed file system 828 and job scheduler 822. In at least one embodiment, clustered or grouped computing resources may include grouped computing resource 814 at data center infrastructure layer 810. In at least one embodiment, resource manager 826 may coordinate with resource orchestrator 812 to manage these mapped or allocated computing resources.

In at least one embodiment, software 832 included in software layer 830 may include software used by at least portions of node C.R.s 816(1)-816(N), grouped computing resources 814, and/or distributed file system 828 of framework layer 820. The one or more types of software may include, but are not limited to, Internet web page search software, e-mail virus scan software, database software, and streaming video content software.

In at least one embodiment, application(s) 842 included in application layer 840 may include one or more types of applications used by at least portions of node C.R.s 816(1)-816(N), grouped computing resources 814, and/or distributed file system 828 of framework layer 820. One or more types of applications may include, but are not limited to, any number of a genomics application, a cognitive compute, and a machine learning application, including training or inferencing software, machine learning framework software (e.g., PyTorch, TensorFlow, Caffe, etc.) or other machine learning applications used in conjunction with one or more embodiments.

In at least one embodiment, any of configuration manager 824, resource manager 826, and resource orchestrator 812 may implement any number and type of self-modifying actions based on any amount and type of data acquired in any technically feasible fashion. In at least one embodiment, self-modifying actions may relieve a data center operator of data center 800 from making possibly bad configuration decisions and possibly avoiding underused and/or poor performing portions of a data center.

In at least one embodiment, data center 800 may include tools, services, software or other resources to train one or more machine learning models or predict or infer information using one or more machine learning models according to one or more embodiments described herein. For example, in at least one embodiment, a machine learning model may be trained by calculating weight parameters according to a neural network architecture using software and computing resources described above with respect to data center 800. In at least one embodiment, trained machine learning models corresponding to one or more neural networks may be used to infer or predict information using resources described above with respect to data center 800 by using weight parameters calculated through one or more training techniques described herein.

In at least one embodiment, data center may use CPUs, application-specific integrated circuits (ASICs), GPUs, FPGAs, or other hardware to perform training and/or inferencing using above-described resources. Moreover, one or more software and/or hardware resources described above may be configured as a service to allow users to train or performing inferencing of information, such as image recognition, speech recognition, or other artificial intelligence services.

Inference and/or training logic 715 are used to perform inferencing and/or training operations associated with one or more embodiments. Details regarding inference and/or training logic 715 are provided below in conjunction with FIGS. 7A and/or 7B. In at least one embodiment, inference and/or training logic 715 may be used in system FIG. 8 for inferencing or predicting operations based, at least in part, on weight parameters calculated using neural network training operations, neural network functions and/or architectures, or neural network use cases described herein.

Such components can be used for network fabric link maintenance.

Computer Systems

Figure 9:
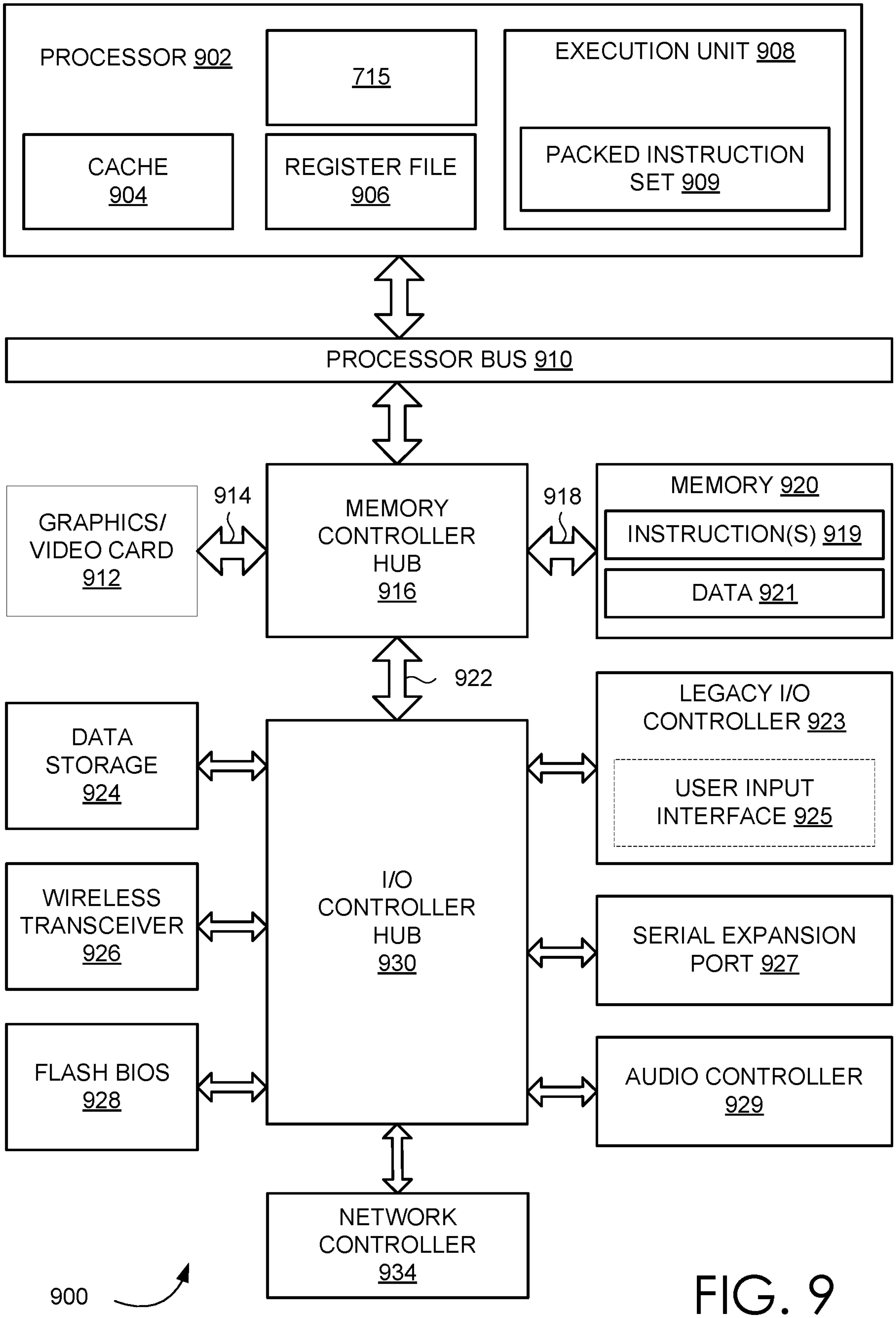
FIG. 9 illustrates a computer system, according to at least one embodiment.

FIG. 9 is a block diagram illustrating an exemplary computer system, which may be a system with interconnected devices and components, a system-on-a-chip (SOC) or some combination thereof 900 formed with a processor that may include execution units to execute an instruction, according to at least one embodiment. In at least one embodiment, computer system 900 may include, without limitation, a component, such as a processor 902 to employ execution units including logic to perform algorithms for process data, in accordance with present disclosure, such as in embodiment described herein. In at least one embodiment, computer system 900 may include processors, such as PENTIUM® Processor family, Xcon™, Itanium®, XScale™ and/or StrongARM™, Intel® Core™, or Intel® Nervana™ microprocessors available from Intel Corporation of Santa Clara, California, although other systems (including PCs having other microprocessors, engineering workstations, set-top boxes and like) may also be used. In at least one embodiment, computer system 900 may execute a version of WINDOWS' operating system available from Microsoft Corporation of Redmond, Wash., although other operating systems (UNIX and Linux for example), embedded software, and/or graphical user interfaces, may also be used.

Embodiments may be used in other devices such as handheld devices and embedded applications. Some examples of handheld devices include cellular phones, Internet Protocol devices, digital cameras, personal digital assistants ("PDAs"), and handheld PCs. In at least one embodiment, embedded applications may include a microcontroller, a digital signal processor ("DSP"), system on a chip, network computers ("NetPCs"), set-top boxes, network hubs, wide area network ("WAN") switches, or any other system that may perform one or more instructions in accordance with at least one embodiment.

In at least one embodiment, computer system 900 may include, without limitation, processor 902 that may include, without limitation, one or more execution units 908 to perform machine learning model training and/or inferencing according to techniques described herein. In at least one embodiment, computer system 900 is a single processor desktop or server system, but in another embodiment computer system 900 may be a multiprocessor system. In at least one embodiment, processor 902 may include, without limitation, a complex instruction set computing ("CISC") microprocessor, a reduced instruction set computing ("RISC") microprocessor, a very long instruction word ("VLIW") computing microprocessor, a processor implementing a combination of instruction sets, or any other processor device, such as a digital signal processor, for example. In at least one embodiment, processor 902 may be coupled to a processor bus 910 that may transmit data signals between processor 902 and other components in computer system 900.

In at least one embodiment, processor 902 may include, without limitation, a Level 1 ("L1") internal cache memory ("cache") 904. In at least one embodiment, processor 902 may have a single internal cache or multiple levels of internal cache. In at least one embodiment, cache memory may reside external to processor 902. Other embodiments may also include a combination of both internal and external caches depending on particular implementation and needs. In at least one embodiment, register file 906 may store different types of data in various registers including, without limitation, integer registers, floating point registers, status registers, and instruction pointer register.

In at least one embodiment, execution unit 908, including, without limitation, logic to perform integer and floating point operations, also resides in processor 902. In at least one embodiment, processor 902 may also include a microcode ("ucode") read only memory ("ROM") that stores microcode for certain macro instructions. In at least one embodiment, execution unit 908 may include logic to handle a packed instruction set 909. In at least one embodiment, by including packed instruction set 909 in an instruction set of a general-purpose processor 902, along with associated circuitry to execute instructions, operations used by many multimedia applications may be performed using packed data in a general-purpose processor 902. In one or more embodiments, many multimedia applications may be accelerated and executed more efficiently by using full width of a processor's data bus for performing operations on packed data, which may eliminate need to transfer smaller units of data across processor's data bus to perform one or more operations one data element at a time.

In at least one embodiment, execution unit 908 may also be used in microcontrollers, embedded processors, graphics devices, DSPs, and other types of logic circuits. In at least one embodiment, computer system 900 may include, without limitation, a memory 920. In at least one embodiment, memory 920 may be implemented as a Dynamic Random Access Memory ("DRAM") device, a Static Random Access Memory ("SRAM") device, flash memory device, or other memory device. In at least one embodiment, memory 920 may store instruction(s) 919 and/or data 921 represented by data signals that may be executed by processor 902.

In at least one embodiment, system logic chip may be coupled to processor bus 910 and memory 920. In at least one embodiment, system logic chip may include, without limitation, a memory controller hub ("MCH") 916, and processor 902 may communicate with MCH 916 via processor bus 910. In at least one embodiment, MCH 916 may provide a high bandwidth memory path 918 to memory 920 for instruction and data storage and for storage of graphics commands, data and textures. In at least one embodiment, MCH 916 may direct data signals between processor 902, memory 920, and other components in computer system 900 and to bridge data signals between processor bus 910, memory 920, and a system I/O 922. In at least one embodiment, system logic chip may provide a graphics port for coupling to a graphics controller. In at least one embodiment, MCH 916 may be coupled to memory 920 through a high bandwidth memory path 918 and graphics/video card 912 may be coupled to MCH 916 through an Accelerated Graphics Port ("AGP") interconnect 914.

In at least one embodiment, computer system 900 may use system I/O 922 that is a proprietary hub interface bus to couple MCH 916 to I/O controller hub ("ICH") 930. In at least one embodiment, ICH 930 may provide direct connections to some I/O devices via a local I/O bus. In at least one embodiment, local I/O bus may include, without limitation, a high-speed I/O bus for connecting peripherals to memory 920, chipset, and processor 902. Examples may include, without limitation, an audio controller 929, a firmware hub ("flash BIOS") 928, a wireless transceiver 926, a data storage 924, a legacy I/O controller 923 containing user input and keyboard interfaces 925, a serial expansion port 927, such as Universal Serial Bus ("USB"), and a network controller 934. Data storage 924 may comprise a hard disk drive, a floppy disk drive, a CD-ROM device, a flash memory device, or other mass storage device.

In at least one embodiment, FIG. 9 illustrates a system, which includes interconnected hardware devices or "chips", whereas in other embodiments, FIG. 9 may illustrate an exemplary System on a Chip ("SoC"). In at least one embodiment, devices may be interconnected with proprietary interconnects, standardized interconnects (e.g., PCIe) or some combination thereof. In at least one embodiment, one or more components of computer system 900 are interconnected using compute express link (CXL) interconnects.

Inference and/or training logic 715 are used to perform inferencing and/or training operations associated with one or more embodiments. Details regarding inference and/or training logic 715 are provided below in conjunction with FIGS. 7A and/or 7B. In at least one embodiment, inference and/or training logic 715 may be used in system FIG. 9 for inferencing or predicting operations based, at least in part, on weight parameters calculated using neural network training operations, neural network functions and/or architectures, or neural network use cases described herein.

Such components can be used for network fabric link maintenance.

Figure 10:
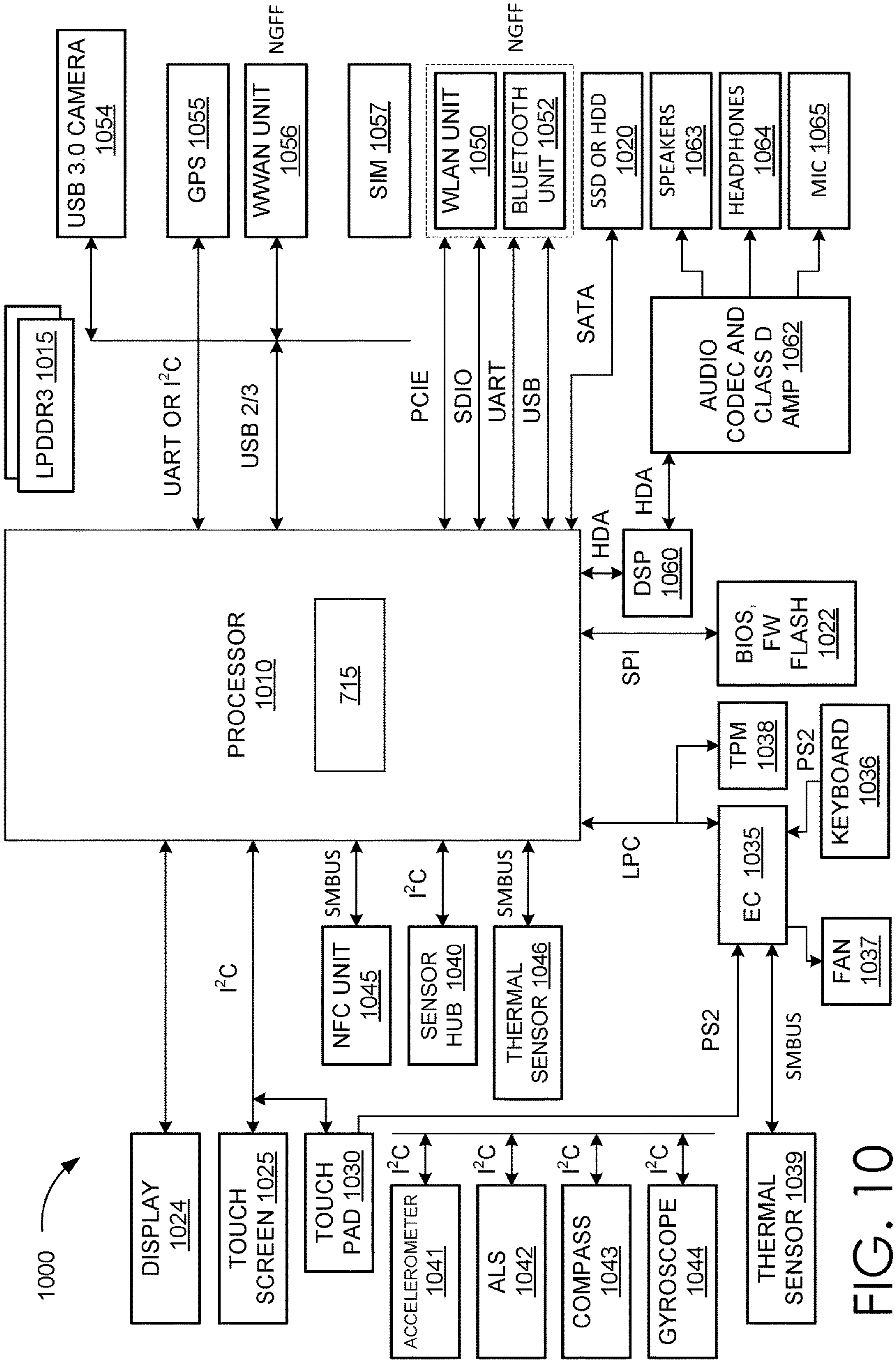
FIG. 10 illustrates a computer system, according to at least one embodiment.

FIG. 10 is a block diagram illustrating an electronic device 1000 for utilizing a processor 1010, according to at least one embodiment. In at least one embodiment, electronic device 1000 may be, for example and without limitation, a notebook, a tower server, a rack server, a blade server, a laptop, a desktop, a tablet, a mobile device, a phone, an embedded computer, or any other suitable electronic device.

In at least one embodiment, system 1000 may include, without limitation, processor 1010 communicatively coupled to any suitable number or kind of components, peripherals, modules, or devices. In at least one embodiment, processor 1010 coupled using a bus or interface, such as a 1° C. bus, a System Management Bus ("SMBus"), a Low Pin Count (LPC) bus, a Serial Peripheral Interface ("SPI"), a High Definition Audio ("HDA") bus, a Serial Advance Technology Attachment ("SATA") bus, a Universal Serial Bus ("USB") (versions 1, 2, 3), or a Universal Asynchronous Receiver/Transmitter ("UART") bus. In at least one embodiment, FIG. 10 illustrates a system, which includes interconnected hardware devices or "chips", whereas in other embodiments, FIG. 10 may illustrate an exemplary System on a Chip ("SoC"). In at least one embodiment, devices illustrated in FIG. 10 may be interconnected with proprietary interconnects, standardized interconnects (e.g., PCIe) or some combination thereof. In at least one embodiment, one or more components of FIG. 10 are interconnected using compute express link (CXL) interconnects.

In at least one embodiment, FIG. 10 may include a display 1024, a touch screen 1025, a touch pad 1030, a Near Field Communications unit ("NFC") 1045, a sensor hub 1040, a thermal sensor 1046, an Express Chipset ("EC") 1035, a Trusted Platform Module ("TPM") 1038, BIOS/firmware/flash memory ("BIOS, FW Flash") 1022, a DSP 1060, a drive 1020 such as a Solid State Disk ("SSD") or a Hard Disk Drive ("HDD"), a wireless local area network unit ("WLAN") 1050, a Bluetooth unit 1052, a Wireless Wide Area Network unit ("WWAN") 1056, a Global Positioning System (GPS) 1055, a camera ("USB 3.0 camera") 1054 such as a USB 3.0 camera, and/or a Low Power Double Data Rate ("LPDDR") memory unit ("LPDDR3") 1015 implemented in, for example, LPDDR3 standard. These components may each be implemented in any suitable manner.

In at least one embodiment, other components may be communicatively coupled to processor 1010 through components discussed above. In at least one embodiment, an accelerometer 1041, Ambient Light Sensor ("ALS") 1042, compass 1043, and a gyroscope 1044 may be communicatively coupled to sensor hub 1040. In at least one embodiment, thermal sensor 1039, a fan 1037, a keyboard 1036, and a touch pad 1030 may be communicatively coupled to EC 1035. In at least one embodiment, speakers 1063, headphones 1064, and microphone ("mic") 1065 may be communicatively coupled to an audio unit ("audio codec and class d amp") 1062, which may in turn be communicatively coupled to DSP 1060. In at least one embodiment, audio unit 1062 may include, for example and without limitation, an audio coder/decoder ("codec") and a class D amplifier. In at least one embodiment, SIM card ("SIM") 1057 may be communicatively coupled to WWAN unit 1056. In at least one embodiment, components such as WLAN unit 1050 and Bluetooth unit 1052, as well as WWAN unit 1056 may be implemented in a Next Generation Form Factor ("NGFF").

Inference and/or training logic 715 are used to perform inferencing and/or training operations associated with one or more embodiments. Details regarding inference and/or training logic 715 are provided below in conjunction with FIGS. 7A and/or 7B. In at least one embodiment, inference and/or training logic 715 may be used in system FIG. 10 for inferencing or predicting operations based, at least in part, on weight parameters calculated using neural network training operations, neural network functions and/or architectures, or neural network use cases described herein.

Such components can be used for network fabric link maintenance.

Figure 11:
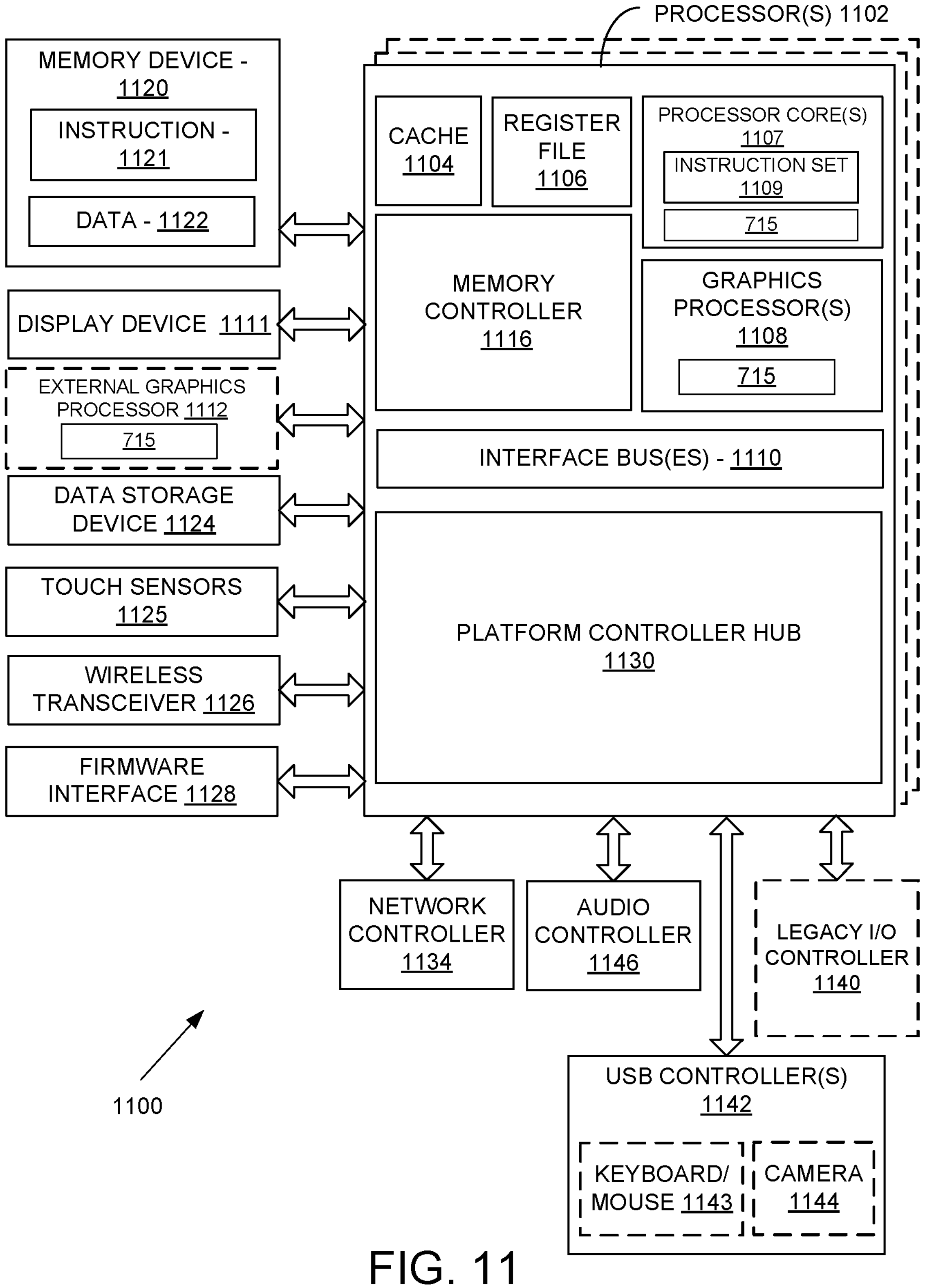
FIG. 11 illustrates at least portions of a graphics processor, according to one or more embodiments.

FIG. 11 is a block diagram of a processing system, according to at least one embodiment. In at least one embodiment, system 1100 includes one or more processor(s) 1102 and one or more graphics processor(s) 1108, and may be a single processor desktop system, a multiprocessor workstation system, or a server system having a large number of processor(s) 1102 or processor core(s) 1107. In at least one embodiment, system 1100 is a processing platform incorporated within a system-on-a-chip (SoC) integrated circuit for use in mobile, handheld, or embedded devices.

In at least one embodiment, system 1100 can include, or be incorporated within a server-based gaming platform, a game console, including a game and media console, a mobile gaming console, a handheld game console, or an online game console. In at least one embodiment, system 1100 is a mobile phone, smart phone, tablet computing device or mobile Internet device. In at least one embodiment, processing system 1100 can also include, coupled with, or be integrated within a wearable device, such as a smart watch wearable device, smart eyewear device, augmented reality device, or virtual reality device. In at least one embodiment, processing system 1100 is a television or set top box device having one or more processor(s) 1102 and a graphical interface generated by one or more graphics processor(s) 1108.

In at least one embodiment, one or more processor(s) 1102 each include one or more processor core(s) 1107 to process instructions which, when executed, perform operations for system and user software. In at least one embodiment, each of one or more processor core(s) 1107 is configured to process a specific instruction set 1109. In at least one embodiment, instruction set 1109 may facilitate Complex Instruction Set Computing (CISC), Reduced Instruction Set Computing (RISC), or computing via a Very Long Instruction Word (VLIW). In at least one embodiment, processor core(s) 1107 may each process a different instruction set 1109, which may include instructions to facilitate emulation of other instruction sets. In at least one embodiment, processor core(s) 1107 may also include other processing devices, such a Digital Signal Processor (DSP).

In at least one embodiment, processor(s) 1102 includes cache memory 1104. In at least one embodiment, processor(s) 1102 can have a single internal cache or multiple levels of internal cache. In at least one embodiment, cache memory is shared among various components of processor(s) 1102. In at least one embodiment, processor(s) 1102 also uses an external cache (e.g., a Level-3 (L3) cache or Last Level Cache (LLC)) (not shown), which may be shared among processor core(s) 1107 using known cache coherency techniques. In at least one embodiment, register file 1106 is additionally included in processor(s) 1102 which may include different types of registers for storing different types of data (e.g., integer registers, floating point registers, status registers, and an instruction pointer register). In at least one embodiment, register file 1106 may include general-purpose registers or other registers.

In at least one embodiment, one or more processor(s) 1102 are coupled with one or more interface bus(es) 1110 to transmit communication signals such as address, data, or control signals between processor(s) 1102 and other components in system 1100. In at least one embodiment, interface bus(es) 1110, in one embodiment, can be a processor bus, such as a version of a Direct Media Interface (DMI) bus. In at least one embodiment, interface bus(es) 1110 is not limited to a DMI bus, and may include one or more Peripheral Component Interconnect buses (e.g., PCI, PCI Express), memory busses, or other types of interface busses. In at least one embodiment processor(s) 1102 include an integrated memory controller 1116 and a platform controller hub 1130. In at least one embodiment, memory controller 1116 facilitates communication between a memory device and other components of system 1100, while platform controller hub (PCH) 1130 provides connections to I/O devices via a local I/O bus.

In at least one embodiment, memory device 1120 can be a dynamic random access memory (DRAM) device, a static random access memory (SRAM) device, flash memory device, phase-change memory device, or some other memory device having suitable performance to serve as process memory. In at least one embodiment memory device 1120 can operate as system memory for system 1100, to store data 1122 and instruction 1121 for use when one or more processor(s) 1102 executes an application or process. In at least one embodiment, memory controller 1116 also couples with an optional external graphics processor 1112, which may communicate with one or more graphics processor(s) 1108 in processor(s) 1102 to perform graphics and media operations. In at least one embodiment, a display device 1111 can connect to processor(s) 1102. In at least one embodiment display device 1111 can include one or more of an internal display device, as in a mobile electronic device or a laptop device or an external display device attached via a display interface (e.g., DisplayPort, etc.). In at least one embodiment, display device 1111 can include a head mounted display (HMD) such as a stereoscopic display device for use in virtual reality (VR) applications or augmented reality (AR) applications.

In at least one embodiment, platform controller hub 1130 enables peripherals to connect to memory device 1120 and processor(s) 1102 via a high-speed I/O bus. In at least one embodiment, I/O peripherals include, but are not limited to, an audio controller 1146, a network controller 1134, a firmware interface 1128, a wireless transceiver 1126, touch sensors 1125, a data storage device 1124 (e.g., hard disk drive, flash memory, etc.). In at least one embodiment, data storage device 1124 can connect via a storage interface (e.g., SATA) or via a peripheral bus, such as a Peripheral Component Interconnect bus (e.g., PCI, PCI Express). In at least one embodiment, touch sensors 1125 can include touch screen sensors, pressure sensors, or fingerprint sensors. In at least one embodiment, wireless transceiver 1126 can be a Wi-Fi transceiver, a Bluetooth transceiver, or a mobile network transceiver such as a 3G, 4G, or Long Term Evolution (LTE) transceiver. In at least one embodiment, firmware interface 1128 enables communication with system firmware, and can be, for example, a unified extensible firmware interface (UEFI). In at least one embodiment, network controller 1134 can enable a network connection to a wired network. In at least one embodiment, a high-performance network controller (not shown) couples with interface bus(es) 1110. In at least one embodiment, audio controller 1146 is a multi-channel high definition audio controller. In at least one embodiment, system 1100 includes an optional legacy I/O controller 1140 for coupling legacy (e.g., Personal System 2 (PS/2)) devices to system. In at least one embodiment, platform controller hub 1130 can also connect to one or more Universal Serial Bus (USB) controller(s) 1142 connect input devices, such as keyboard and mouse 1143 combinations, a camera 1144, or other USB input devices.

In at least one embodiment, an instance of memory controller 1116 and platform controller hub 1130 may be integrated into a discreet external graphics processor, such as external graphics processor 1112. In at least one embodiment, platform controller hub 1130 and/or memory controller 1116 may be external to one or more processor(s) 1102. For example, in at least one embodiment, system 1100 can include an external memory controller 1116 and platform controller hub 1130, which may be configured as a memory controller hub and peripheral controller hub within a system chipset that is in communication with processor(s) 1102.

Inference and/or training logic 715 are used to perform inferencing and/or training operations associated with one or more embodiments. Details regarding inference and/or training logic 715 are provided below in conjunction with FIGS. 7A and/or 7B. In at least one embodiment portions or all of inference and/or training logic 715 may be incorporated into graphics processor 1500. For example, in at least one embodiment, training and/or inferencing techniques described herein may use one or more of ALUs embodied in a graphics processor. Moreover, in at least one embodiment, inferencing and/or training operations described herein may be done using logic other than logic illustrated in FIGS. 7A and/or 7B. In at least one embodiment, weight parameters may be stored in on-chip or off-chip memory and/or registers (shown or not shown) that configure ALUs of a graphics processor to perform one or more machine learning algorithms, neural network architectures, use cases, or training techniques described herein.

Such components can be used for network fabric link maintenance.

Figure 12:
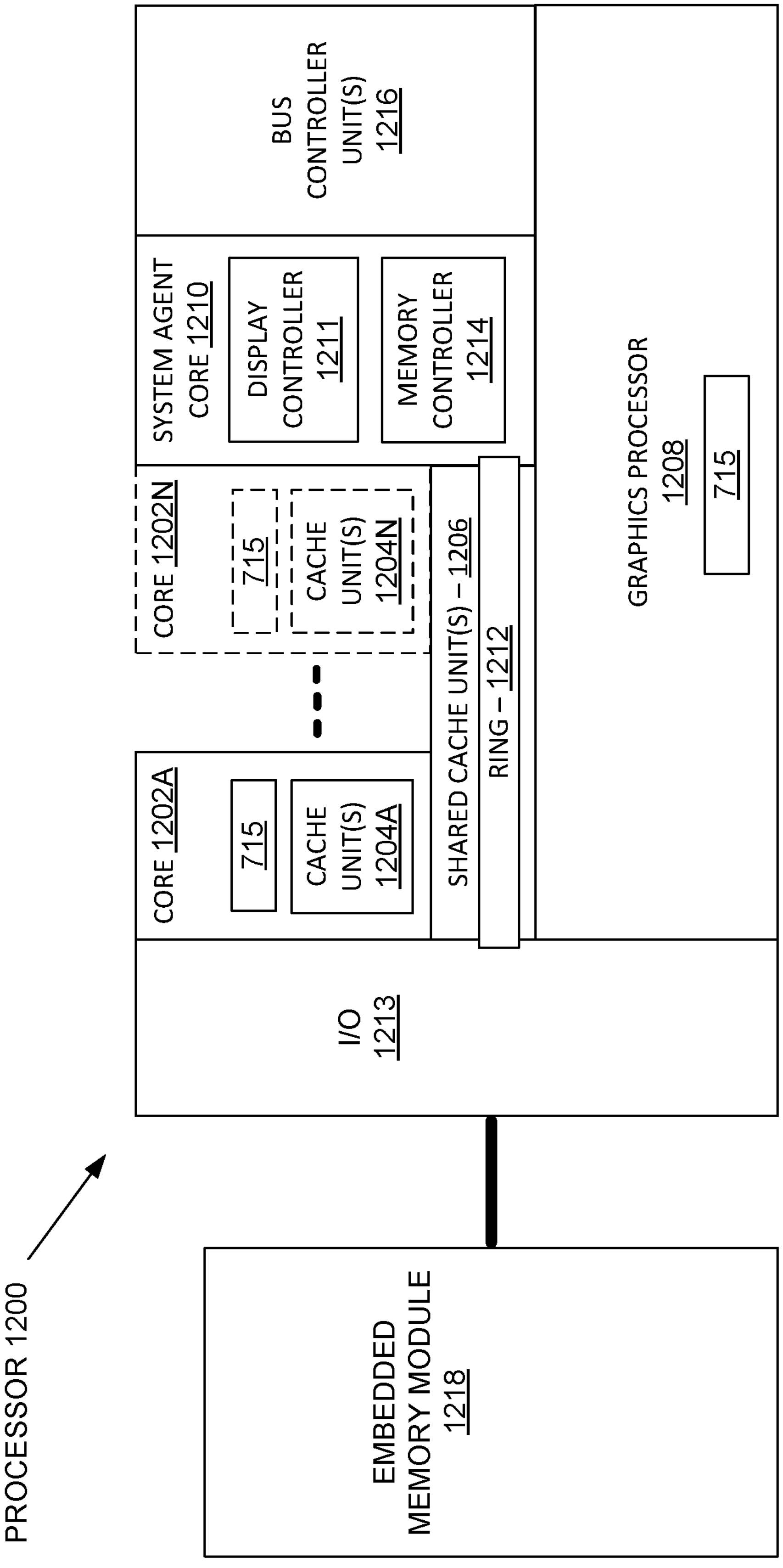
FIG. 12 illustrates at least portions of a graphics processor, according to one or more embodiments.

FIG. 12 is a block diagram of a processor 1200 having one or more processor core(s) 1202A-1202N, an integrated memory controller 1214, and an integrated graphics processor 1208, according to at least one embodiment. In at least one embodiment, processor 1200 can include additional cores up to and including additional core 1202N represented by dashed lined boxes. In at least one embodiment, each of processor core(s) 1202A-1202N includes one or more internal cache unit(s) 1204A-1204N. In at least one embodiment, each processor core also has access to one or more shared cached units 1206.

In at least one embodiment, internal cache unit(s) 1204A-1204N and shared cache units 1206 represent a cache memory hierarchy within processor 1200. In at least one embodiment, cache unit(s) 1204A-1204N may include at least one level of instruction and data cache within each processor core and one or more levels of shared mid-level cache, such as a Level 2 (L2), Level 3 (L3), Level 4 (L4), or other levels of cache, where a highest level of cache before external memory is classified as an LLC. In at least one embodiment, cache coherency logic maintains coherency between various cache unit(s) 1206 and 1204A-1204N.

In at least one embodiment, processor 1200 may also include a set of one or more bus controller units 1216 and a system agent core 1210. In at least one embodiment, one or more bus controller units 1216 manage a set of peripheral buses, such as one or more PCI or PCI express busses. In at least one embodiment, system agent core 1210 provides management functionality for various processor components. In at least one embodiment, system agent core 1210 includes one or more integrated memory controllers 1214 to manage access to various external memory devices (not shown).

In at least one embodiment, one or more of processor core(s) 1202A-1202N include support for simultaneous multi-threading. In at least one embodiment, system agent core 1210 includes components for coordinating and processor core(s) 1202A-1202N during multi-threaded processing. In at least one embodiment, system agent core 1210 may additionally include a power control unit (PCU), which includes logic and components to regulate one or more power states of processor core(s) 1202A-1202N and graphics processor 1208.

In at least one embodiment, processor 1200 additionally includes graphics processor 1208 to execute graphics processing operations. In at least one embodiment, graphics processor 1208 couples with shared cache units 1206, and system agent core 1210, including one or more integrated memory controllers 1214. In at least one embodiment, system agent core 1210 also includes a display controller 1211 to drive graphics processor output to one or more coupled displays. In at least one embodiment, display controller 1211 may also be a separate module coupled with graphics processor 1208 via at least one interconnect, or may be integrated within graphics processor 1208.

In at least one embodiment, a ring based interconnect unit 1212 is used to couple internal components of processor 1200. In at least one embodiment, an alternative interconnect unit may be used, such as a point-to-point interconnect, a switched interconnect, or other techniques. In at least one embodiment, graphics processor 1208 couples with a ring based interconnect unit 1212 via an I/O link 1213.

In at least one embodiment, I/O link 1213 represents at least one of multiple varieties of I/O interconnects, including an on package I/O interconnect which facilitates communication between various processor components and a high-performance embedded memory module 1218, such as an eDRAM module. In at least one embodiment, each of processor core(s) 1202A-1202N and graphics processor 1208 use embedded memory modules 1218 as a shared Last Level Cache.

In at least one embodiment, processor core(s) 1202A-1202N are homogenous cores executing a common instruction set architecture. In at least one embodiment, processor core(s) 1202A-1202N are heterogeneous in terms of instruction set architecture (ISA), where one or more of processor core(s) 1202A-1202N execute a common instruction set, while one or more other cores of processor core(s) 1202A-1202N executes a subset of a common instruction set or a different instruction set. In at least one embodiment, processor core(s) 1202A-1202N are heterogeneous in terms of microarchitecture, where one or more cores having a relatively higher power consumption couple with one or more power cores having a lower power consumption. In at least one embodiment, processor 1200 can be implemented on one or more chips or as an SoC integrated circuit.

Inference and/or training logic 715 are used to perform inferencing and/or training operations associated with one or more embodiments. Details regarding inference and/or training logic 715 are provided below in conjunction with FIGS. 7A and/or 7B. In at least one embodiment portions or all of inference and/or training logic 715 may be incorporated into processor 1200. For example, in at least one embodiment, training and/or inferencing techniques described herein may use one or more of ALUs embodied in graphics processor 1208, graphics core(s) 1202A-1202N, or other components in FIG. 12. Moreover, in at least one embodiment, inferencing and/or training operations described herein may be done using logic other than logic illustrated in FIGS. 7A and/or 7B. In at least one embodiment, weight parameters may be stored in on-chip or off-chip memory and/or registers (shown or not shown) that configure ALUs of graphics processor 1200 to perform one or more machine learning algorithms, neural network architectures, use cases, or training techniques described herein.

Such components can be used for network fabric link maintenance.

Virtualized Computing Platform

Figure 13:
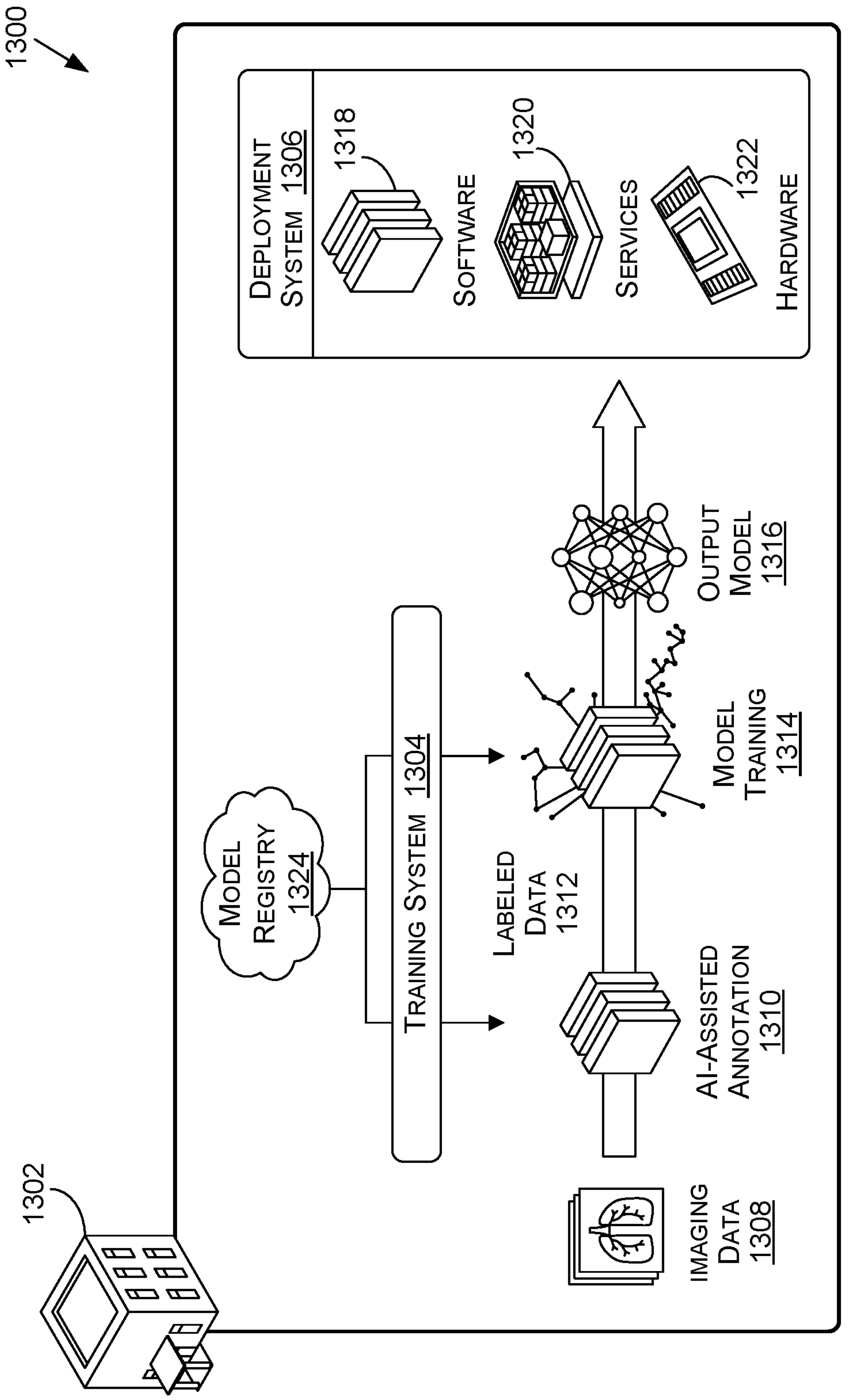
FIG. 13 is an example data flow diagram for an advanced computing pipeline, in accordance with at least one embodiment.

FIG. 13 is an example data flow diagram for a process 1300 of generating and deploying an image processing and inferencing pipeline, in accordance with at least one embodiment. In at least one embodiment, process 1300 may be deployed for use with imaging devices, processing devices, and/or other device types at one or more facilities 1302. Process 1300 may be executed within a training system 1304 and/or a deployment system 1306. In at least one embodiment, training system 1304 may be used to perform training, deployment, and implementation of machine learning models (e.g., neural networks, object detection algorithms, computer vision algorithms, etc.) for use in deployment system 1306. In at least one embodiment, deployment system 1306 may be configured to offload processing and compute resources among a distributed computing environment to reduce infrastructure requirements at facility 1302. In at least one embodiment, one or more applications in a pipeline may use or call upon services (e.g., inference, visualization, compute, AI, etc.) of deployment system 1306 during execution of applications.

In at least one embodiment, some of applications used in advanced processing and inferencing pipelines may use machine learning models or other AI to perform one or more processing steps. In at least one embodiment, machine learning models may be trained at facility 1302 using data 1308 (such as imaging data) generated at facility 1302 (and stored on one or more picture archiving and communication system (PACS) servers at facility 1302), may be trained using imaging or sequencing data 1308 from another facility (ies), or a combination thereof. In at least one embodiment, training system 1304 may be used to provide applications, services, and/or other resources for generating working, deployable machine learning models for deployment system 1306.

In at least one embodiment, model registry 1324 may be backed by object storage that may support versioning and object metadata. In at least one embodiment, object storage may be accessible through, for example, a cloud storage compatible application programming interface (API) from within a cloud platform. In at least one embodiment, machine learning models within model registry 1324 may uploaded, listed, modified, or deleted by developers or partners of a system interacting with an API. In at least one embodiment, an API may provide access to methods that allow users with appropriate credentials to associate models with applications, such that models may be executed as part of execution of containerized instantiations of applications.

In at least one embodiment, training system 1304 (FIG. 13) may include a scenario where facility 1302 is training their own machine learning model, or has an existing machine learning model that needs to be optimized or updated. In at least one embodiment, imaging data 1308 generated by imaging device(s), sequencing devices, and/or other device types may be received. In at least one embodiment, once imaging data 1308 is received, AI-assisted annotation 1310 may be used to aid in generating annotations corresponding to imaging data 1308 to be used as ground truth data for a machine learning model. In at least one embodiment, AI-assisted annotation 1310 may include one or more machine learning models (e.g., convolutional neural networks (CNNs)) that may be trained to generate annotations corresponding to certain types of imaging data 1308 (e.g., from certain devices). In at least one embodiment, AI-assisted annotation 1310 may then be used directly, or may be adjusted or fine-tuned using an annotation tool to generate ground truth data. In at least one embodiment, AI-assisted annotation 1310, labeled data 1312, or a combination thereof may be used as ground truth data for training a machine learning model. In at least one embodiment, a trained machine learning model may be referred to as output model(s) 1316, and may be used by deployment system 1306, as described herein.

In at least one embodiment, a training pipeline may include a scenario where facility 1302 needs a machine learning model for use in performing one or more processing tasks for one or more applications in deployment system 1306, but facility 1302 may not currently have such a machine learning model (or may not have a model that is optimized, efficient, or effective for such purposes). In at least one embodiment, an existing machine learning model may be selected from a model registry 1324. In at least one embodiment, model registry 1324 may include machine learning models trained to perform a variety of different inference tasks on imaging data. In at least one embodiment, machine learning models in model registry 1324 may have been trained on imaging data from different facilities than facility 1302 (e.g., facilities remotely located). In at least one embodiment, machine learning models may have been trained on imaging data from one location, two locations, or any number of locations. In at least one embodiment, when being trained on imaging data from a specific location, training may take place at that location, or at least in a manner that protects confidentiality of imaging data or restricts imaging data from being transferred off-premises. In at least one embodiment, once a model is trained—or partially trained—at one location, a machine learning model may be added to model registry 1324. In at least one embodiment, a machine learning model may then be retrained, or updated, at any number of other facilities, and a retrained or updated model may be made available in model registry 1324. In at least one embodiment, a machine learning model may then be selected from model registry 1324—and referred to as output model(s) 1316—and may be used in deployment system 1306 to perform one or more processing tasks for one or more applications of a deployment system.

In at least one embodiment, a scenario may include facility 1302 requiring a machine learning model for use in performing one or more processing tasks for one or more applications in deployment system 1306, but facility 1302 may not currently have such a machine learning model (or may not have a model that is optimized, efficient, or effective for such purposes). In at least one embodiment, a machine learning model selected from model registry 1324 may not be fine-tuned or optimized for imaging data 1308 generated at facility 1302 because of differences in populations, robustness of training data used to train a machine learning model, diversity in anomalies of training data, and/or other issues with training data. In at least one embodiment, AI-assisted annotation 1310 may be used to aid in generating annotations corresponding to imaging data 1308 to be used as ground truth data for retraining or updating a machine learning model. In at least one embodiment, labeled data 1312 may be used as ground truth data for training a machine learning model. In at least one embodiment, retraining or updating a machine learning model may be referred to as model training 1314. In at least one embodiment, model training 1314—e.g., AI-assisted annotation 1310, labeled data 1312, or a combination thereof—may be used as ground truth data for retraining or updating a machine learning model. In at least one embodiment, a trained machine learning model may be referred to as output model(s) 1316, and may be used by deployment system 1306, as described herein.

In at least one embodiment, deployment system 1306 may include software 1318, services 1320, hardware 1322, and/or other components, features, and functionality. In at least one embodiment, deployment system 1306 may include a software "stack," such that software 1318 may be built on top of services 1320 and may use services 1320 to perform some or all of processing tasks, and services 1320 and software 1318 may be built on top of hardware 1322 and use hardware 1322 to execute processing, storage, and/or other compute tasks of deployment system 1306. In at least one embodiment, software 1318 may include any number of different containers, where each container may execute an instantiation of an application. In at least one embodiment, each application may perform one or more processing tasks in an advanced processing and inferencing pipeline (e.g., inferencing, object detection, feature detection, segmentation, image enhancement, calibration, etc.). In at least one embodiment, an advanced processing and inferencing pipeline may be defined based on selections of different containers that are desired or required for processing imaging data 1308, in addition to containers that receive and configure imaging data for use by each container and/or for use by facility 1302 after processing through a pipeline (e.g., to convert outputs back to a usable data type). In at least one embodiment, a combination of containers within software 1318 (e.g., that make up a pipeline) may be referred to as a virtual instrument (as described in more detail herein), and a virtual instrument may leverage services 1320 and hardware 1322 to execute some or all processing tasks of applications instantiated in containers.

In at least one embodiment, a data processing pipeline may receive input data (e.g., imaging data 1308) in a specific format in response to an inference request (e.g., a request from a user of deployment system 1306). In at least one embodiment, input data may be representative of one or more images, video, and/or other data representations generated by one or more imaging devices. In at least one embodiment, data may undergo pre-processing as part of data processing pipeline to prepare data for processing by one or more applications. In at least one embodiment, post-processing may be performed on an output of one or more inferencing tasks or other processing tasks of a pipeline to prepare an output data for a next application and/or to prepare output data for transmission and/or use by a user (e.g., as a response to an inference request). In at least one embodiment, inferencing tasks may be performed by one or more machine learning models, such as trained or deployed neural networks, which may include output model(s) 1316 of training system 1304.

In at least one embodiment, tasks of data processing pipeline may be encapsulated in a container(s) that each represents a discrete, fully functional instantiation of an application and virtualized computing environment that is able to reference machine learning models. In at least one embodiment, containers or applications may be published into a private (e.g., limited access) area of a container registry (described in more detail herein), and trained or deployed models may be stored in model registry 1324 and associated with one or more applications. In at least one embodiment, images of applications (e.g., container images) may be available in a container registry, and once selected by a user from a container registry for deployment in a pipeline, an image may be used to generate a container for an instantiation of an application for use by a user's system.

In at least one embodiment, developers (e.g., software developers, clinicians, doctors, etc.) may develop, publish, and store applications (e.g., as containers) for performing image processing and/or inferencing on supplied data. In at least one embodiment, development, publishing, and/or storing may be performed using a software development kit (SDK) associated with a system (e.g., to ensure that an application and/or container developed is compliant with or compatible with a system). In at least one embodiment, an application that is developed may be tested locally (e.g., at a first facility, on data from a first facility) with an SDK which may support at least some of services 1320 as a system (e.g., system 1200 of FIG. 12). In at least one embodiment, because DICOM objects may contain anywhere from one to hundreds of images or other data types, and due to a variation in data, a developer may be responsible for managing (e.g., setting constructs for, building pre-processing into an application, etc.) extraction and preparation of incoming data. In at least one embodiment, once validated by system 1300 (e.g., for accuracy), an application may be available in a container registry for selection and/or implementation by a user to perform one or more processing tasks with respect to data at a facility (e.g., a second facility) of a user.

In at least one embodiment, developers may then share applications or containers through a network for access and use by users of a system (e.g., system 1300 of FIG. 13). In at least one embodiment, completed and validated applications or containers may be stored in a container registry and associated machine learning models may be stored in model registry 1324. In at least one embodiment, a requesting entity—who provides an inference or image processing request—may browse a container registry and/or model registry 1324 for an application, container, dataset, machine learning model, etc., select a desired combination of elements for inclusion in data processing pipeline, and submit an imaging processing request. In at least one embodiment, a request may include input data (and associated patient data, in some examples) that is necessary to perform a request, and/or may include a selection of application(s) and/or machine learning models to be executed in processing a request. In at least one embodiment, a request may then be passed to one or more components of deployment system 1306 (e.g., a cloud) to perform processing of data processing pipeline. In at least one embodiment, processing by deployment system 1306 may include referencing selected elements (e.g., applications, containers, models, etc.) from a container registry and/or model registry 1324. In at least one embodiment, once results are generated by a pipeline, results may be returned to a user for reference (e.g., for viewing in a viewing application suite executing on a local, on-premises workstation or terminal).

In at least one embodiment, to aid in processing or execution of applications or containers in pipelines, services 1320 may be leveraged. In at least one embodiment, services 1320 may include compute services, artificial intelligence (AI) services, visualization services, and/or other service types. In at least one embodiment, services 1320 may provide functionality that is common to one or more applications in software 1318, so functionality may be abstracted to a service that may be called upon or leveraged by applications. In at least one embodiment, functionality provided by services 1320 may run dynamically and more efficiently, while also scaling well by allowing applications to process data in parallel (e.g., using a parallel computing platform 1230 (FIG. 12)). In at least one embodiment, rather than each application that shares a same functionality offered by services 1320 being required to have a respective instance of services 1320, services 1320 may be shared between and among various applications. In at least one embodiment, services may include an inference server or engine that may be used for executing detection or segmentation tasks, as non-limiting examples. In at least one embodiment, a model training service may be included that may provide machine learning model training and/or retraining capabilities. In at least one embodiment, a data augmentation service may further be included that may provide GPU accelerated data (e.g., DICOM, RIS, CIS, REST compliant, RPC, raw, etc.) extraction, resizing, scaling, and/or other augmentation. In at least one embodiment, a visualization service may be used that may add image rendering effects—such as ray-tracing, rasterization, denoising, sharpening, etc.—to add realism to two-dimensional (2D) and/or three-dimensional (3D) models. In at least one embodiment, virtual instrument services may be included that provide for beam-forming, segmentation, inferencing, imaging, and/or support for other applications within pipelines of virtual instruments.

In at least one embodiment, where services 1320 includes an AI service (e.g., an inference service), one or more machine learning models may be executed by calling upon (e.g., as an API call) an inference service (e.g., an inference server) to execute machine learning model(s), or processing thereof, as part of application execution. In at least one embodiment, where another application includes one or more machine learning models for segmentation tasks, an application may call upon an inference service to execute machine learning models for performing one or more of processing operations associated with segmentation tasks. In at least one embodiment, software 1318 implementing advanced processing and inferencing pipeline that includes segmentation application and anomaly detection application may be streamlined because each application may call upon a same inference service to perform one or more inferencing tasks.

In at least one embodiment, hardware 1322 may include GPUs, CPUs, graphics cards, an AI/deep learning system (e.g., an AI supercomputer, such as NVIDIA's DGX), a cloud platform, or a combination thereof. In at least one embodiment, different types of hardware 1322 may be used to provide efficient, purpose-built support for software 1318 and services 1320 in deployment system 1306. In at least one embodiment, use of GPU processing may be implemented for processing locally (e.g., at facility 1302), within an AI/deep learning system, in a cloud system, and/or in other processing components of deployment system 1306 to improve efficiency, accuracy, and efficacy of image processing and generation. In at least one embodiment, software 1318 and/or services 1320 may be optimized for GPU processing with respect to deep learning, machine learning, and/or high-performance computing, as non-limiting examples. In at least one embodiment, at least some of computing environment of deployment system 1306 and/or training system 1304 may be executed in a datacenter one or more supercomputers or high performance computing systems, with GPU optimized software (e.g., hardware and software combination of NVIDIA's DGX System). In at least one embodiment, hardware 1322 may include any number of GPUs that may be called upon to perform processing of data in parallel, as described herein. In at least one embodiment, cloud platform may further include GPU processing for GPU-optimized execution of deep learning tasks, machine learning tasks, or other computing tasks. In at least one embodiment, cloud platform (e.g., NVIDIA's NGC) may be executed using an AI/deep learning supercomputer(s) and/or GPU-optimized software (e.g., as provided on NVIDIA's DGX Systems) as a hardware abstraction and scaling platform. In at least one embodiment, cloud platform may integrate an application container clustering system or orchestration system (e.g., KUBERNETES) on multiple GPUs to enable seamless scaling and load balancing.

Figure 14:
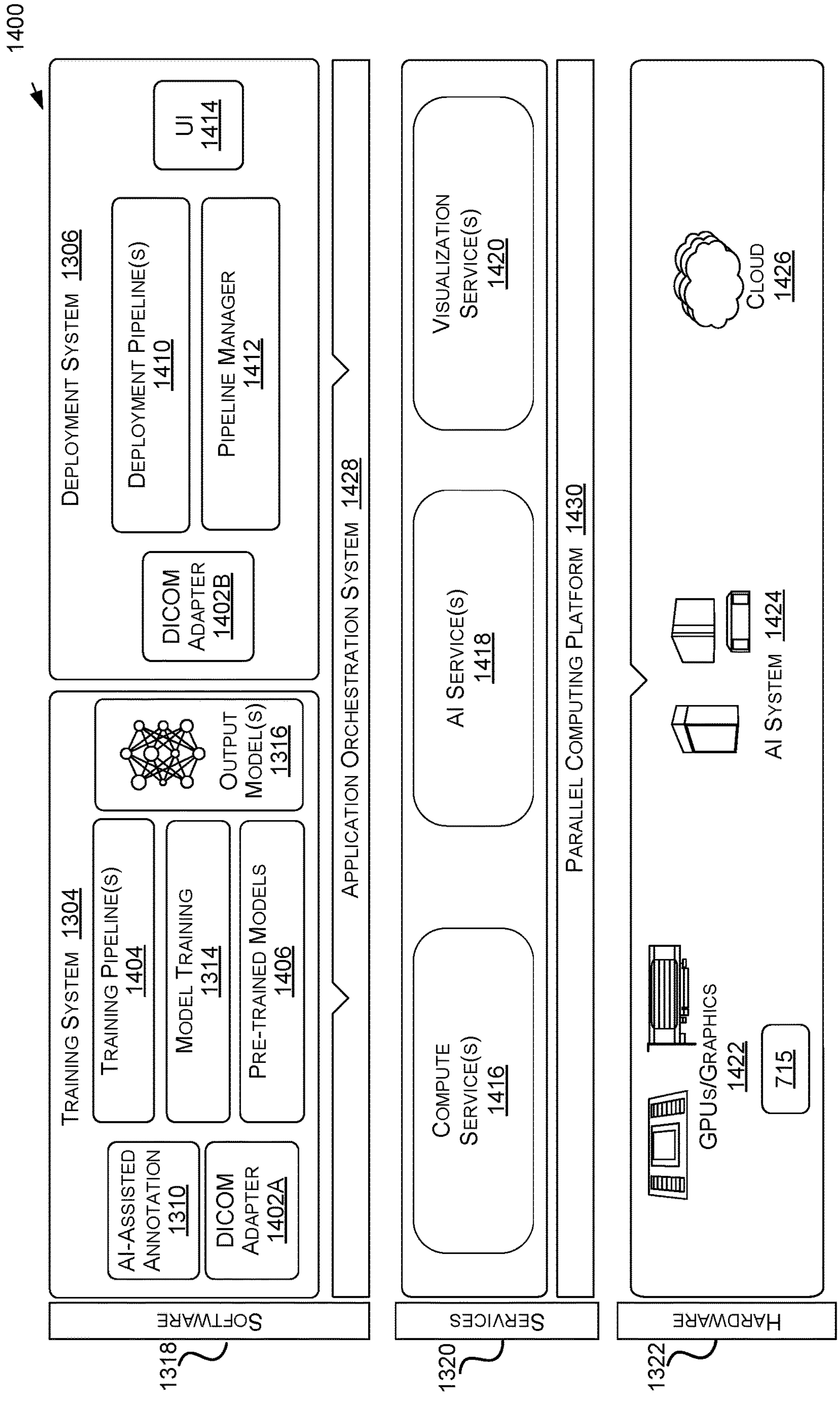
FIG. 14 is a system diagram for an example system for training, adapting, instantiating and deploying machine learning models in an advanced computing pipeline, in accordance with at least one embodiment.

FIG. 14 is a system diagram for an example system 1400 for generating and deploying an imaging deployment pipeline, in accordance with at least one embodiment. In at least one embodiment, system 1400 may be used to implement process 1300 of FIG. 13 and/or other processes including advanced processing and inferencing pipelines. In at least one embodiment, system 1400 may include training system 1304 and deployment system 1306. In at least one embodiment, training system 1304 and deployment system 1306 may be implemented using software 1318, services 1320, and/or hardware 1322, as described herein.

In at least one embodiment, system 1400 (e.g., training system 1304 and/or deployment system 1306) may be implemented in a cloud computing environment (e.g., using cloud 1426). In at least one embodiment, system 1400 may be implemented locally with respect to a healthcare services facility, or as a combination of both cloud and local computing resources. In at least one embodiment, access to APIs in cloud 1426 may be restricted to authorized users through enacted security measures or protocols. In at least one embodiment, a security protocol may include web tokens that may be signed by an authentication (e.g., AuthN, AuthZ, Gluccon, etc.) service and may carry appropriate authorization. In at least one embodiment, APIs of virtual instruments (described herein), or other instantiations of system 1400, may be restricted to a set of public IPs that have been vetted or authorized for interaction.

In at least one embodiment, various components of system 1400 may communicate between and among one another using any of a variety of different network types, including but not limited to local area networks (LANs) and/or wide area networks (WANs) via wired and/or wireless communication protocols. In at least one embodiment, communication between facilities and components of system 1400 (e.g., for transmitting inference requests, for receiving results of inference requests, etc.) may be communicated over data bus(ses), wireless data protocols (Wi-Fi), wired data protocols (e.g., Ethernet), etc.

In at least one embodiment, training system 1304 may execute training pipelines 1404, similar to those described herein with respect to FIG. 13. In at least one embodiment, where one or more machine learning models are to be used in deployment pipeline(s) 1410 by deployment system 1306, training pipelines 1404 may be used to train or retrain one or more (e.g. pre-trained) models, and/or implement one or more of pre-trained models 1406 (e.g., without a need for retraining or updating). In at least one embodiment, as a result of training pipelines 1404, output model(s) 1316 may be generated. In at least one embodiment, training pipelines 1404 may include any number of processing steps, such as but not limited to imaging data (or other input data) conversion or adaption In at least one embodiment, for different machine learning models used by deployment system 1306, different training pipelines 1404 may be used. In at least one embodiment, training pipeline 1404 similar to a first example described with respect to FIG. 13 may be used for a first machine learning model, training pipeline 1404 similar to a second example described with respect to FIG. 13 may be used for a second machine learning model, and training pipeline 1404 similar to a third example described with respect to FIG. 13 may be used for a third machine learning model. In at least one embodiment, any combination of tasks within training system 1304 may be used depending on what is required for each respective machine learning model. In at least one embodiment, one or more of machine learning models may already be trained and ready for deployment so machine learning models may not undergo any processing by training system 1304, and may be implemented by deployment system 1306.

In at least one embodiment, output model(s) 1316 and/or pre-trained models 1406 may include any types of machine learning models depending on implementation or embodiment. In at least one embodiment, and without limitation, machine learning models used by system 1400 may include machine learning model(s) using linear regression, logistic regression, decision trees, support vector machines (SVM), Naïve Bayes, k-nearest neighbor (Knn), K means clustering, random forest, dimensionality reduction algorithms, gradient boosting algorithms, neural networks (e.g., auto-encoders, convolutional, recurrent, perceptrons, Long/Short Term Memory (LSTM), Hopfield, Boltzmann, deep belief, deconvolutional, generative adversarial, liquid state machine, etc.), and/or other types of machine learning models.

In at least one embodiment, training pipelines 1404 may include AI-assisted annotation, as described in more detail herein with respect to at least FIG. 14B. In at least one embodiment, labeled data 1312 (e.g., traditional annotation)

may be generated by any number of techniques. In at least one embodiment, labels or other annotations may be generated within a drawing program (e.g., an annotation program), a computer aided design (CAD) program, a labeling program, another type of program suitable for generating annotations or labels for ground truth, and/or may be hand drawn, in some examples. In at least one embodiment, ground truth data may be synthetically produced (e.g., generated from computer models or renderings), real produced (e.g., designed and produced from real-world data), machine-automated (e.g., using feature analysis and learning to extract features from data and then generate labels), human annotated (e.g., labeler, or annotation expert, defines location of labels), and/or a combination thereof. In at least one embodiment, for each instance of imaging data 1308 (or other data type used by machine learning models), there may be corresponding ground truth data generated by training system 1304. In at least one embodiment, AI-assisted annotation may be performed as part of deployment pipeline(s) 1410; either in addition to, or in lieu of AI-assisted annotation included in training pipelines 1404. In at least one embodiment, system 1400 may include a multi-layer platform that may include a software layer (e.g., software 1318) of diagnostic applications (or other application types) that may perform one or more medical imaging and diagnostic functions. In at least one embodiment, system 1400 may be communicatively coupled to (e.g., via encrypted links) PACS server networks of one or more facilities. In at least one embodiment, system 1400 may be configured to access and referenced data from PACS servers to perform operations, such as training machine learning models, deploying machine learning models, image processing, inferencing, and/or other operations.

In at least one embodiment, a software layer may be implemented as a secure, encrypted, and/or authenticated API through which applications or containers may be invoked (e.g., called) from an external environment(s) (e.g., facility 1302). In at least one embodiment, applications may then call or execute one or more services 1320 for performing compute, AI, or visualization tasks associated with respective applications, and software 1318 and/or services 1320 may leverage hardware 1322 to perform processing tasks in an effective and efficient manner. In at least one embodiment, communications sent to, or received by, a training system 1304 and a deployment system 1306 may occur using a pair of DICOM adapters 1402A, 1402B.

In at least one embodiment, deployment system 1306 may execute deployment pipeline(s) 1410. In at least one embodiment, deployment pipeline(s) 1410 may include any number of applications that may be sequentially, non-sequentially, or otherwise applied to imaging data (and/or other data types) generated by imaging devices, sequencing devices, genomics devices, etc.—including AI-assisted annotation, as described above. In at least one embodiment, as described herein, a deployment pipeline(s) 1410 for an individual device may be referred to as a virtual instrument for a device (e.g., a virtual ultrasound instrument, a virtual CT scan instrument, a virtual sequencing instrument, etc.). In at least one embodiment, for a single device, there may be more than one deployment pipeline(s) 1410 depending on information desired from data generated by a device. In at least one embodiment, where detections of anomalies are desired from an MRI machine, there may be a first deployment pipeline(s) 1410, and where image enhancement is desired from output of an MRI machine, there may be a second deployment pipeline(s) 1410.

In at least one embodiment, an image generation application may include a processing task that includes use of a machine learning model. In at least one embodiment, a user may desire to use their own machine learning model, or to select a machine learning model from model registry 1324. In at least one embodiment, a user may implement their own machine learning model or select a machine learning model for inclusion in an application for performing a processing task. In at least one embodiment, applications may be selectable and customizable, and by defining constructs of applications, deployment and implementation of applications for a particular user are presented as a more seamless user experience. In at least one embodiment, by leveraging other features of system 1400—such as services 1320 and hardware 1322—deployment pipeline(s) 1410 may be even more user friendly, provide for easier integration, and produce more accurate, efficient, and timely results.

In at least one embodiment, deployment system 1306 may include a user interface ("UI") 1414 (e.g., a graphical user interface, a web interface, etc.) that may be used to select applications for inclusion in deployment pipeline(s) 1410, arrange applications, modify or change applications or parameters or constructs thereof, use and interact with deployment pipeline(s) 1410 during set-up and/or deployment, and/or to otherwise interact with deployment system 1306. In at least one embodiment, although not illustrated with respect to training system 1304, UI 1414 (or a different user interface) may be used for selecting models for use in deployment system 1306, for selecting models for training, or retraining, in training system 1304, and/or for otherwise interacting with training system 1304.

In at least one embodiment, pipeline manager 1412 may be used, in addition to an application orchestration system 1428, to manage interaction between applications or containers of deployment pipeline(s) 1410 and services 1320 and/or hardware 1322. In at least one embodiment, pipeline manager 1412 may be configured to facilitate interactions from application to application, from application to services 1320, and/or from application or service to hardware 1322. In at least one embodiment, although illustrated as included in software 1318, this is not intended to be limiting, and in some examples pipeline manager 1412 may be included in services 1320. In at least one embodiment, application orchestration system 1428 (e.g., Kubernetes, DOCKER, etc.) may include a container orchestration system that may group applications into containers as logical units for coordination, management, scaling, and deployment. In at least one embodiment, by associating applications from deployment pipeline(s) 1410 (e.g., a reconstruction application, a segmentation application, etc.) with individual containers, each application may execute in a self-contained environment (e.g., at a kernel level) to increase speed and efficiency.

In at least one embodiment, each application and/or container (or image thereof) may be individually developed, modified, and deployed (e.g., a first user or developer may develop, modify, and deploy a first application and a second user or developer may develop, modify, and deploy a second application separate from a first user or developer), which may allow for focus on, and attention to, a task of a single application and/or container(s) without being hindered by tasks of another application(s) or container(s). In at least one embodiment, communication, and cooperation between different containers or applications may be aided by pipeline manager 1412 and application orchestration system 1428. In at least one embodiment, so long as an expected input and/or output of each container or application is known by a system (e.g., based on constructs of applications or containers), application orchestration system 1428 and/or pipeline manager 1412 may facilitate communication among and between, and sharing of resources among and between, each of applications or containers. In at least one embodiment, because one or more of applications or containers in deployment pipeline(s) 1410 may share same services and resources, application orchestration system 1428 may orchestrate, load balance, and determine sharing of services or resources between and among various applications or containers. In at least one embodiment, a scheduler may be used to track resource requirements of applications or containers, current usage or planned usage of these resources, and resource availability. In at least one embodiment, a scheduler may thus allocate resources to different applications and distribute resources between and among applications in view of requirements and availability of a system. In some examples, a scheduler (and/or other component of application orchestration system 1428) may determine resource availability and distribution based on constraints imposed on a system (e.g., user constraints), such as quality of service (QoS), urgency of need for data outputs (e.g., to determine whether to execute real-time processing or delayed processing), etc.

In at least one embodiment, services 1320 leveraged by and shared by applications or containers in deployment system 1306 may include compute service(s) 1416, AI service(s) 1418, visualization service(s) 1420, and/or other service types. In at least one embodiment, applications may call (e.g., execute) one or more of services 1320 to perform processing operations for an application. In at least one embodiment, compute service(s) 1416 may be leveraged by applications to perform super-computing or other high-performance computing (HPC) tasks. In at least one embodiment, compute service(s) 1416 may be leveraged to perform parallel processing (e.g., using a parallel computing platform 1430) for processing data through one or more of applications and/or one or more tasks of a single application, substantially simultaneously. In at least one embodiment, parallel computing platform 1430 (e.g., NVIDIA's CUDA) may enable general purpose computing on GPUs (GPGPU) (e.g., GPUs/Graphics 1422). In at least one embodiment, a software layer of parallel computing platform 1430 may provide access to virtual instruction sets and parallel computational elements of GPUs, for execution of compute kernels. In at least one embodiment, parallel computing platform 1430 may include memory and, in some embodiments, a memory may be shared between and among multiple containers, and/or between and among different processing tasks within a single container. In at least one embodiment, inter-process communication (IPC) calls may be generated for multiple containers and/or for multiple processes within a container to use same data from a shared segment of memory of parallel computing platform 1430 (e.g., where multiple different stages of an application or multiple applications are processing same information). In at least one embodiment, rather than making a copy of data and moving data to different locations in memory (e.g., a read/write operation), same data in same location of a memory may be used for any number of processing tasks (e.g., at a same time, at different times, etc.). In at least one embodiment, as data is used to generate new data as a result of processing, this information of a new location of data may be stored and shared between various applications. In at least one embodiment, location of data and a location of updated or modified data may be part of a definition of how a payload is understood within containers.

In at least one embodiment, AI service(s) 1418 may be leveraged to perform inferencing services for executing machine learning model(s) associated with applications (e.g., tasked with performing one or more processing tasks of an application). In at least one embodiment, AI service(s) 1418 may leverage AI system 1424 to execute machine learning model(s) (e.g., neural networks, such as CNNs) for segmentation, reconstruction, object detection, feature detection, classification, and/or other inferencing tasks. In at least one embodiment, applications of deployment pipeline(s) 1410 may use one or more of output model(s) 1316 from training system 1304 and/or other models of applications to perform inference on imaging data. In at least one embodiment, two or more examples of inferencing using application orchestration system 1428 (e.g., a scheduler) may be available. In at least one embodiment, a first category may include a high priority/low latency path that may achieve higher service level agreements, such as for performing inference on urgent requests during an emergency, or for a radiologist during diagnosis. In at least one embodiment, a second category may include a standard priority path that may be used for requests that may be non-urgent or where analysis may be performed at a later time. In at least one embodiment, application orchestration system 1428 may distribute resources (e.g., services 1320 and/or hardware 1322) based on priority paths for different inferencing tasks of AI service(s) 1418.

In at least one embodiment, shared storage may be mounted to AI service(s) 1418 within system 1400. In at least one embodiment, shared storage may operate as a cache (or other storage device type) and may be used to process inference requests from applications. In at least one embodiment, when an inference request is submitted, a request may be received by a set of API instances of deployment system 1306, and one or more instances may be selected (e.g., for best fit, for load balancing, etc.) to process a request. In at least one embodiment, to process a request, a request may be entered into a database, a machine learning model may be located from model registry 1324 if not already in a cache, a validation step may ensure appropriate machine learning model is loaded into a cache (e.g., shared storage), and/or a copy of a model may be saved to a cache. In at least one embodiment, a scheduler (e.g., of pipeline manager 1412) may be used to launch an application that is referenced in a request if an application is not already running or if there are not enough instances of an application. In at least one embodiment, if an inference server is not already launched to execute a model, an inference server may be launched. Any number of inference servers may be launched per model. In at least one embodiment, in a pull model, in which inference servers are clustered, models may be cached whenever load balancing is advantageous. In at least one embodiment, inference servers may be statically loaded in corresponding, distributed servers.

In at least one embodiment, inferencing may be performed using an inference server that runs in a container. In at least one embodiment, an instance of an inference server may be associated with a model (and optionally a plurality of versions of a model). In at least one embodiment, if an instance of an inference server does not exist when a request to perform inference on a model is received, a new instance may be loaded. In at least one embodiment, when starting an inference server, a model may be passed to an inference server such that a same container may be used to serve different models so long as inference server is running as a different instance.

In at least one embodiment, during application execution, an inference request for a given application may be received, and a container (e.g., hosting an instance of an inference server) may be loaded (if not already), and a start procedure may be called. In at least one embodiment, pre-processing logic in a container may load, decode, and/or perform any additional pre-processing on incoming data (e.g., using a CPU(s) and/or GPU(s)). In at least one embodiment, once data is prepared for inference, a container may perform inference as necessary on data. In at least one embodiment, this may include a single inference call on one image (e.g., a hand X-ray), or may require inference on hundreds of images (e.g., a chest CT). In at least one embodiment, an application may summarize results before completing, which may include, without limitation, a single confidence score, pixel level-segmentation, voxel-level segmentation, generating a visualization, or generating text to summarize findings. In at least one embodiment, different models or applications may be assigned different priorities. For example, some models may have a real-time (TAT<1 min) priority while others may have lower priority (e.g., TAT<10 min). In at least one embodiment, model execution times may be measured from requesting institution or entity and may include partner network traversal time, as well as execution on an inference service.

In at least one embodiment, transfer of requests between services 1320 and inference applications may be hidden behind a software development kit (SDK), and robust transport may be provide through a queue. In at least one embodiment, a request will be placed in a queue via an API for an individual application/tenant ID combination and an SDK will pull a request from a queue and give a request to an application. In at least one embodiment, a name of a queue may be provided in an environment from where an SDK will pick it up. In at least one embodiment, asynchronous communication through a queue may be useful as it may allow any instance of an application to pick up work as it becomes available. Results may be transferred back through a queue, to ensure no data is lost. In at least one embodiment, queues may also provide an ability to segment work, as highest priority work may go to a queue with most instances of an application connected to it, while lowest priority work may go to a queue with a single instance connected to it that processes tasks in an order received. In at least one embodiment, an application may run on a GPU-accelerated instance generated in cloud 1426, and an inference service may perform inferencing on a GPU.

In at least one embodiment, visualization service(s) 1420 may be leveraged to generate visualizations for viewing outputs of applications and/or deployment pipeline(s) 1410. In at least one embodiment, GPUs/Graphics 1422 may be leveraged by visualization service(s) 1420 to generate visualizations. In at least one embodiment, rendering effects, such as ray-tracing, may be implemented by visualization service(s) 1420 to generate higher quality visualizations. In at least one embodiment, visualizations may include, without limitation, 2D image renderings, 3D volume renderings, 3D volume reconstruction, 2D tomographic slices, virtual reality displays, augmented reality displays, etc. In at least one embodiment, virtualized environments may be used to generate a virtual interactive display or environment (e.g., a virtual environment) for interaction by users of a system (e.g., doctors, nurses, radiologists, etc.). In at least one embodiment, visualization service(s) 1420 may include an internal visualizer, cinematics, and/or other rendering or image processing capabilities or functionality (e.g., ray tracing, rasterization, internal optics, etc.).

In at least one embodiment, hardware 1322 may include GPUs/Graphics 1422, AI system 1424, cloud 1426, and/or any other hardware used for executing training system 1304 and/or deployment system 1306. In at least one embodiment, GPUs/Graphics 1422 (e.g., NVIDIA's TESLA and/or QUADRO GPUs) may include any number of GPUs that may be used for executing processing tasks of compute service(s) 1416, AI service(s) 1418, visualization service(s) 1420, other services, and/or any of features or functionality of software 1318. For example, with respect to AI service(s) 1418, GPUs/Graphics 1422 may be used to perform pre-processing on imaging data (or other data types used by machine learning models), post-processing on outputs of machine learning models, and/or to perform inferencing (e.g., to execute machine learning models). In at least one embodiment, cloud 1426, AI system 1424, and/or other components of system 1400 may use GPUs/Graphics 1422. In at least one embodiment, cloud 1426 may include a GPU-optimized platform for deep learning tasks. In at least one embodiment, AI system 1424 may use GPUs, and cloud 1426—or at least a portion tasked with deep learning or inferencing—may be executed using one or more AI systems 1424. As such, although hardware 1322 is illustrated as discrete components, this is not intended to be limiting, and any components of hardware 1322 may be combined with, or leveraged by, any other components of hardware 1322.

In at least one embodiment, AI system 1424 may include a purpose-built computing system (e.g., a super-computer or an HPC) configured for inferencing, deep learning, machine learning, and/or other artificial intelligence tasks. In at least one embodiment, AI system 1424 (e.g., NVIDIA's DGX) may include GPU-optimized software (e.g., a software stack) that may be executed using a plurality of GPUs/Graphics 1422, in addition to CPUs, RAM, storage, and/or other components, features, or functionality. In at least one embodiment, one or more AI systems 1424 may be implemented in cloud 1426 (e.g., in a data center) for performing some or all of AI-based processing tasks of system 1400.

In at least one embodiment, cloud 1426 may include a GPU-accelerated infrastructure (e.g., NVIDIA's NGC) that may provide a GPU-optimized platform for executing processing tasks of system 1400. In at least one embodiment, cloud 1426 may include an AI system 1424 for performing one or more of AI-based tasks of system 1400 (e.g., as a hardware abstraction and scaling platform). In at least one embodiment, cloud 1426 may integrate with application orchestration system 1428 leveraging multiple GPUs to enable seamless scaling and load balancing between and among applications and services 1320. In at least one embodiment, cloud 1426 may tasked with executing at least some of services 1320 of system 1400, including compute service(s) 1416, AI service(s) 1418, and/or visualization service(s) 1420, as described herein. In at least one embodiment, cloud 1426 may perform small and large batch inference (e.g., executing NVIDIA's TENSOR RT), provide an accelerated parallel computing API and platform 1430 (e.g., NVIDIA's CUDA), execute application orchestration system 1428 (e.g., KUBERNETES), provide a graphics rendering API and platform (e.g., for ray-tracing, 2D graphics, 3D graphics, and/or other rendering techniques to produce higher quality cinematics), and/or may provide other functionality for system 1400.

Figure 15A:
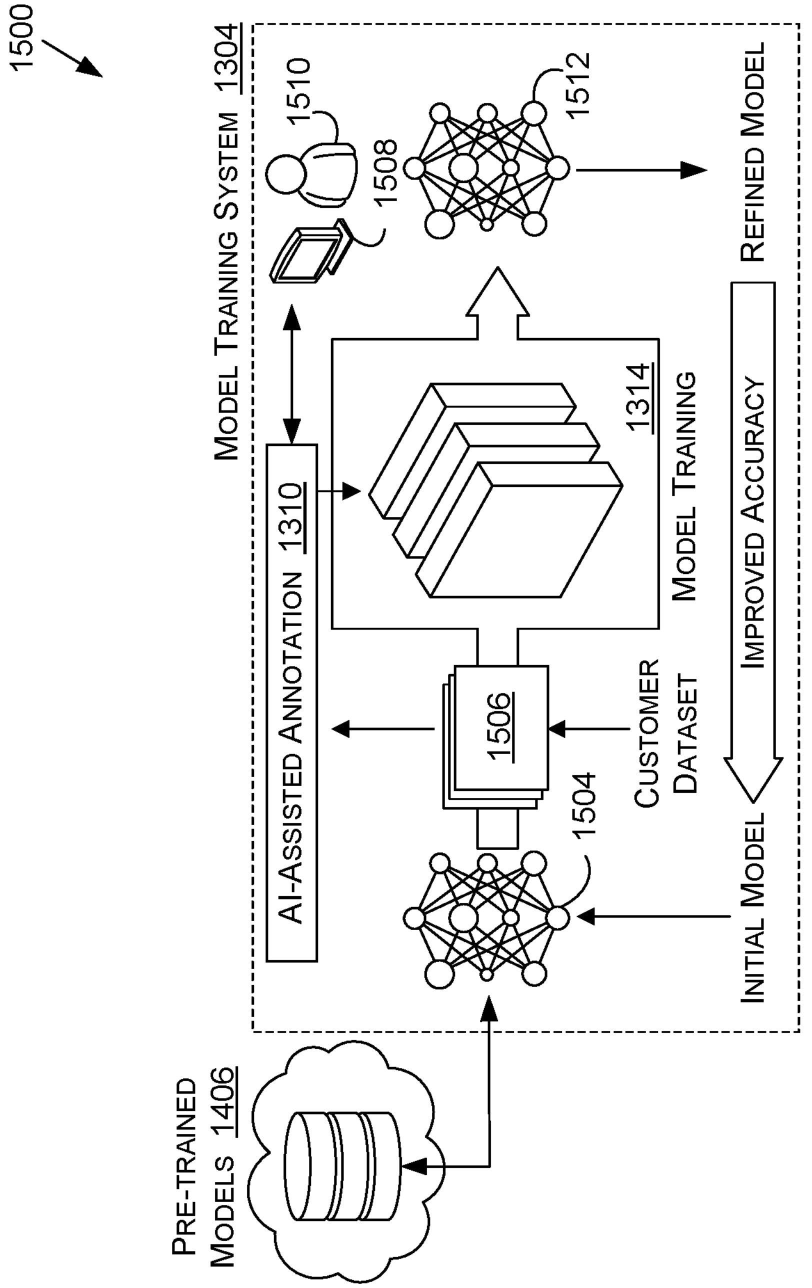
FIGS. 15A and 15B illustrate a data flow diagram for a process to train a machine learning model, as well as client-server architecture to enhance annotation tools with pre-trained annotation models, in accordance with at least one embodiment.

FIG. 15A illustrates a data flow diagram for a process 1500 to train, retrain, or update a machine learning model, in accordance with at least one embodiment. In at least one embodiment, process 1500 may be executed using, as a non-limiting example, system 1400 of FIG. 14. In at least one embodiment, process 1500 may leverage services and/or hardware as described herein. In at least one embodiment, refined models 1512 generated by process 1500 may be executed by a deployment system for one or more containerized applications in deployment pipelines.

In at least one embodiment, model training 1514 may include retraining or updating an initial model 1504 (e.g., a pre-trained model) using new training data (e.g., new input data, such as customer dataset 1506, and/or new ground truth data associated with input data). In at least one embodiment, to retrain, or update, initial model 1504, output or loss layer(s) of initial model 1504 may be reset, deleted, and/or replaced with an updated or new output or loss layer(s). In at least one embodiment, initial model 1504 may have previously fine-tuned parameters (e.g., weights and/or biases) that remain from prior training, so training or retraining 1514 may not take as long or require as much processing as training a model from scratch. In at least one embodiment, during model training 1514, by having reset or replaced output or loss layer(s) of initial model 1504, parameters may be updated and re-tuned for a new data set based on loss calculations associated with accuracy of output or loss layer(s) at generating predictions on new, customer dataset 1506.

In at least one embodiment, pre-trained models 1506 may be stored in a data store, or registry. In at least one embodiment, pre-trained models 1506 may have been trained, at least in part, at one or more facilities other than a facility executing process 1500. In at least one embodiment, to protect privacy and rights of patients, subjects, or clients of different facilities, pre-trained models 1506 may have been trained, on-premise, using customer or patient data generated on-premise. In at least one embodiment, pre-trained models 1306 may be trained using a cloud and/or other hardware, but confidential, privacy protected patient data may not be transferred to, used by, or accessible to any components of a cloud (or other off premise hardware). In at least one embodiment, where pre-trained models 1506 is trained at using patient data from more than one facility, pre-trained models 1506 may have been individually trained for each facility prior to being trained on patient or customer data from another facility. In at least one embodiment, such as where a customer or patient data has been released of privacy concerns (e.g., by waiver, for experimental use, etc.), or where a customer or patient data is included in a public data set, a customer or patient data from any number of facilities may be used to train pre-trained models 1506 on-premise and/or off premise, such as in a datacenter or other cloud computing infrastructure.

In at least one embodiment, when selecting applications for use in deployment pipelines, a user may also select machine learning models to be used for specific applications. In at least one embodiment, a user may not have a model for use, so a user may select a pre-trained model to use with an application. In at least one embodiment, pre-trained model may not be optimized for generating accurate results on customer dataset 1506 of a facility of a user (e.g., based on patient diversity, demographics, types of medical imaging devices used, etc.). In at least one embodiment, prior to deploying a pre-trained model into a deployment pipeline for use with an application(s), pre-trained model may be updated, retrained, and/or fine-tuned for use at a respective facility.

In at least one embodiment, a user may select pre-trained model that is to be updated, retrained, and/or fine-tuned, and this pre-trained model may be referred to as initial model 1504 for a training system within process 1500. In at least one embodiment, a customer dataset 1506 (e.g., imaging data, genomics data, sequencing data, or other data types generated by devices at a facility) may be used to perform model training (which may include, without limitation, transfer learning) on initial model 1504 to generate refined model 1512. In at least one embodiment, ground truth data corresponding to customer dataset 1506 may be generated by training system 1304. In at least one embodiment, ground truth data may be generated, at least in part, by clinicians, scientists, doctors, practitioners, at a facility.

In at least one embodiment, AI-assisted annotation may be used in some examples to generate ground truth data. In at least one embodiment, AI-assisted annotation (e.g., implemented using an AI-assisted annotation SDK) may leverage machine learning models (e.g., neural networks) to generate suggested or predicted ground truth data for a customer dataset. In at least one embodiment, a user may use annotation tools within a user interface (a graphical user interface (GUI)) on a computing device.

In at least one embodiment, user 1510 may interact with a GUI via computing device 1508 to edit or fine-tune (auto) annotations. In at least one embodiment, a polygon editing feature may be used to move vertices of a polygon to more accurate or fine-tuned locations.

In at least one embodiment, once customer dataset 1506 has associated ground truth data, ground truth data (e.g., from AI-assisted annotation, manual labeling, etc.) may be used by during model training to generate refined model 1512. In at least one embodiment, customer dataset 1506 may be applied to initial model 1504 any number of times, and ground truth data may be used to update parameters of initial model 1504 until an acceptable level of accuracy is attained for refined model 1512. In at least one embodiment, once refined model 1512 is generated, refined model 1512 may be deployed within one or more deployment pipelines at a facility for performing one or more processing tasks with respect to medical imaging data.

In at least one embodiment, refined model 1512 may be uploaded to pre-trained models in a model registry to be selected by another facility. In at least one embodiment, this process may be completed at any number of facilities such that refined model 1512 may be further refined on new datasets any number of times to generate a more universal model.

Figure 15B:
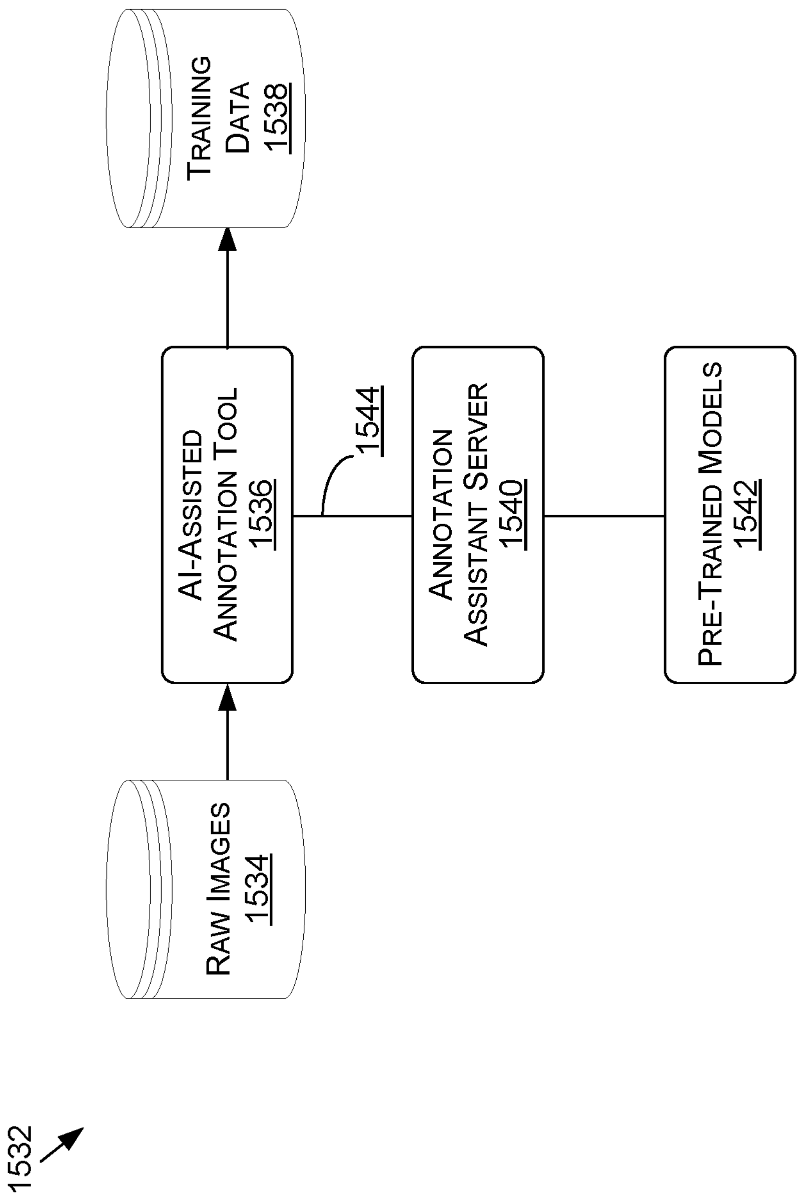

FIG. 15B is an example illustration of a client-server architecture 1532 to enhance annotation tools with pre-trained annotation models, in accordance with at least one embodiment. In at least one embodiment, AI-assisted annotation tool 1536 may be instantiated based on a client-server architecture 1532. In at least one embodiment, AI-assisted annotation tool 1536 in imaging applications may aid radiologists, for example, identify organs and abnormalities. In at least one embodiment, imaging applications may include software tools that help user 1510 to identify, as a non-limiting example, a few extreme points on a particular organ of interest in raw images 1534 (e.g., in a 3D MRI or CT scan) and receive auto-annotated results for all 2D slices of a particular organ. In at least one embodiment, results may be stored in a data store as training data 1538 and used as (for example and without limitation) ground truth data for training. In at least one embodiment, when computing device 1508 sends extreme points for AI-assisted annotation, a deep learning model, for example, may receive this data as input and return inference results of a segmented organ or abnormality. In at least one embodiment, pre-instantiated annotation tools, such as AI-assisted annotation tool 1536 in FIG. 15B, may be enhanced by making API calls (e.g., API Call 1544) to a server, such as an Annotation Assistant Server 1540 that may include a set of pre-trained models 1542 stored in an annotation model registry, for example. In at least one embodiment, an annotation model registry may store pre-trained models 1542 (e.g., machine learning models, such as deep learning models) that are pre-trained to perform AI-assisted annotation on a particular organ or abnormality. These models may be further updated by using training pipelines. In at least one embodiment, pre-installed annotation tools may be improved over time as new labeled data is added.

Various embodiments can be described by the following clauses:

1. A processor comprising:
   one or more processing units to:
      determine a first prediction for a link corresponding to a first link failure probability;
      determine the first prediction exceeds a first failure threshold;
      determine a second prediction for the link corresponding to a second link failure probability;
      determine the second prediction exceeds a second failure threshold;
      cause the link to be isolated from an associated network fabric; and
      generate a report for the link.

2. The processor of clause 1, wherein the first telemetry data associated with the first prediction is low frequency telemetry data and second telemetry data associated with the second prediction is high frequency telemetry data.

3. The processor of clause 1, wherein the one or more processing units are further to:
   cause one or more remediation actions to be performed on the link.

4. The processor of clause 3, wherein the one or more processing units are further to:
   determine the link is operating according to normal operating conditions after the one or more remediation actions;
   determine an updated first prediction after a first time period;
   determine the updated first prediction is less than an updated first threshold;
   determine an updated second prediction after a second time period;
   determine the updated second prediction is less than an updated second threshold; and
   cause the link to be de-isolated from the network fabric.

5. The processor of clause 4, wherein the first time period if less than the second time period.

6. The processor of clause 1, wherein the one or more processing units are further to determine at least one of a first failure threshold or the second failure threshold based on one or more parameters of the network fabric.

7. The processor of clause 1, wherein the one or more processing units are further to:
   determine the first prediction exceeds a first failure threshold prior to determining the second prediction.

8. The processor of clause 1, wherein the second prediction is based on at least one of a determination the first prediction exceeds a first failure threshold, a rule, a property of the link, or a combination thereof.

9. The processor of clause 1, wherein the processor is comprised in at least one of:
   a system for performing simulation operations;
   a system for performing simulation operations to test or validate autonomous machine applications;
   a system for performing digital twin operations;
   a system for performing light transport simulation;
   a system for rendering graphical output;
   a system for performing deep learning operations;
   a system implemented using an edge device;
   a system for generating or presenting virtual reality (VR) content;
   a system for generating or presenting augmented reality (AR) content;
   a system for generating or presenting mixed reality (MR) content;
   a system incorporating one or more Virtual Machines (VMs);
   a system for performing operations for a conversational AI application;
   a system for performing operations for a generative AI application;
   a system for performing operations using a language model;
   a system implemented at least partially in a data center;
   a system for performing hardware testing using simulation;
   a system for synthetic data generation;
   a collaborative content creation platform for 3D assets; or
   a system implemented at least partially using cloud computing resources.

10. A computer-implemented method, comprising:
   predicting, using a first trained model and based, at least in part, on first telemetry data for a set of ports, a respective first failure probability for each port of the set of ports;
   selecting, from the set of ports, a subset of ports having respective first failure probabilities exceeding a first threshold;
   predicting, using a second trained model and based, at least in part, on second telemetry data for the subset of ports, a respective second failure probability for each port of the subset of ports;
   selecting, from the subset of ports, one or more selected ports having respective second failure probabilities exceeding a second threshold; and
   isolating, from a network fabric including the set of ports, the one or more selected ports.

11. The computer-implemented method of clause 10, further comprising:
   causing one or more remediation actions to be performed on a chosen port of the one or more selected ports;
   determining the one or more remediation actions are successful; and
   de-isolating the chosen port.

12. The computer-implemented method of clause 11, further comprising:
   causing one or more second remediation actions to be performed on a second chosen port of the one or more selected ports;
   determining the one or more second remediation actions failed; and
   reporting the failure of the one or more second remediation actions.

13. The computer-implemented method of clause 10, wherein the first telemetry data is low frequency data and the second telemetry data is high frequency data.

14. The computer-implemented method of clause 10, further comprising:
   determining the chosen port is operating according to normal operating conditions.

15. The computer-implemented method of clause 10, further comprising:

collecting the first telemetry data over a first period of time; and collecting the second telemetry data over a second period of time, the first period of time being longer than the second period of time.

16. The computer-implemented method of clause 10, further comprising:

determining a number of the subset of ports exceeds a failure threshold; and providing an alert.

17. The computer-implemented method of clause 16, wherein the alert is indicative of a system-wide failure.

18. The computer-implemented method of clause 10, further comprising:

determining a quality of one or both of the first telemetry data and the second telemetry data.

19. A system, comprising:

one or more processing units to determine a set of first probabilities of failure for a plurality of ports associated with a network fabric based, at least in part, on a first set of telemetry data, to determine a set of second probabilities of failure for a subset of the plurality of ports, and to isolate a portion of the subset of the plurality of ports having respective second probabilities of failure exceeding a second threshold.

20. The system of clause 19, wherein the one or more processing units are further to determine a total number of the plurality of ports having respective probabilities of failure exceeding the first threshold is greater than a third threshold and to transmit an alert responsive to the determination.

21. The system of clause 19, wherein the first set of telemetry data is low frequency telemetry data and the second set of telemetry data is high frequency telemetry data.

22 The system of clause 19, wherein the one or more processing units are further to de-isolate the portion of the subset of the plurality of ports after a determination that one or more remediation actions are successful.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. Term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. Use of term "set" (e.g., "a set of items") or "subset," unless otherwise noted or contradicted by context, is to be construed as a nonempty collection comprising one or more members. Further, unless otherwise noted or contradicted by context, term "subset" of a corresponding set does not necessarily denote a proper subset of corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain embodiments require at least one of A, at least one of B, and at least one of C each to be present. In addition, unless otherwise noted or contradicted by context, term "plurality" indicates a state of being plural (e.g., "a plurality of items" indicates multiple items). A plurality is at least two items, but can be more when so indicated either explicitly or by context. Further, unless stated otherwise or otherwise clear from context, phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause computer system to perform operations described herein. A set of non-transitory computer-readable storage media, in at least one embodiment, comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors—for example, a non-transitory computer-readable storage medium store instructions and a main central processing unit ("CPU") executes some of instructions while a graphics processing unit ("GPU") executes other instructions. In at least one embodiment, different components of a computer system have separate processors and different processors execute different subsets of instructions.

Accordingly, in at least one embodiment, computer systems are configured to implement one or more services that singly or collectively perform operations of processes described herein and such computer systems are configured with applicable hardware and/or software that enable performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. Terms "system" and "method" are used herein interchangeably insofar as system may embody one or more methods and methods may be considered a system.

In present document, references may be made to obtaining, acquiring, receiving, or inputting analog or digital data into a subsystem, computer system, or computer-implemented machine. Obtaining, acquiring, receiving, or inputting analog and digital data can be accomplished in a variety of ways such as by receiving data as a parameter of a function call or a call to an application programming interface. In some implementations, process of obtaining, acquiring, receiving, or inputting analog or digital data can be accomplished by transferring data via a serial or parallel interface. In another implementation, process of obtaining, acquiring, receiving, or inputting analog or digital data can be accomplished by transferring data via a computer network from providing entity to acquiring entity. References may also be made to providing, outputting, transmitting, sending, or presenting analog or digital data. In various examples, process of providing, outputting, transmitting, sending, or presenting analog or digital data can be accomplished by transferring data as an input or output parameter of a function call, a parameter of an application programming interface or interprocess communication mechanism.

Although discussion above sets forth example implementations of described techniques, other architectures may be used to implement described functionality, and are intended to be within scope of this disclosure. Furthermore, although specific distributions of responsibilities are defined above for purposes of discussion, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A computer-implemented method, comprising:

predicting, using a first trained model and based, at least in part, on first telemetry data for a set of ports, a respective first failure probability for each port of the set of ports;

selecting, from the set of ports, a subset of ports having respective first failure probabilities exceeding a first threshold;

predicting, using a second trained model and based, at least in part, on second telemetry data for the subset of ports, a respective second failure probability for each port of the subset of ports;

selecting, from the subset of ports, one or more selected ports having respective second failure probabilities exceeding a second threshold; and isolating, from a network fabric including the set of ports, the one or more selected ports.

2. The computer-implemented method of claim 1, further comprising:

causing one or more remediation actions to be performed on a chosen port of the one or more selected ports;

determining the one or more remediation actions are successful; and de-isolating the chosen port.

3. The computer-implemented method of claim 2, further comprising:

causing one or more second remediation actions to be performed on a second chosen port of the one or more selected ports;

determining the one or more second remediation actions failed; and reporting the failure of the one or more second remediation actions.

4. The computer-implemented method of claim 1, wherein the first telemetry data is low frequency data and the second telemetry data is high frequency data.

5. The computer-implemented method of claim 1, further comprising:

determining a chosen port of the one or more selected ports is operating according to normal operating conditions.

6. The computer-implemented method of claim 1, further comprising:

collecting the first telemetry data over a first period of time; and collecting the second telemetry data over a second period of time, the first period of time being longer than the second period of time.

7. The computer-implemented method of claim 1, further comprising:

determining a number of the subset of ports exceeds a failure threshold; and providing an alert.

8. The computer-implemented method of claim 7, wherein the alert is indicative of a system-wide failure.

9. The computer-implemented method of claim 1, further comprising:

determining a quality of one or both of the first telemetry data and the second telemetry data.

10. A processing system, comprising:

one or more processing units to:

predict, using a first trained model and based, at least in part, on first telemetry data for a set of ports, a respective first failure probability for each port of the set of ports;

select, from the set of ports, a subset of ports having respective first failure probabilities exceeding a first threshold;

predict, using a second trained model and based, at least in part, on second telemetry data for the subset of ports, a respective second failure probability for each port of the subset of ports;

select, from the subset of ports, one or more selected ports having respective second failure probabilities exceeding a second threshold; and isolate, from a network fabric including the set of ports, the one or more selected ports.

11. The processing system of claim 10, wherein the one or more processing units are further to:

cause one or more remediation actions to be performed on a chosen port of the one or more selected ports;

determine the one or more remediation actions are successful; and de-isolate the chosen port.

12. The processing system of claim 11, wherein the one or more processing units are further to:

cause one or more second remediation actions to be performed on a second chosen port of the one or more selected ports;

determine the one or more second remediation actions failed; and report the failure of the one or more second remediation actions.

13. The processing system of claim 10, wherein the first telemetry data is low frequency data and the second telemetry data is high frequency data.

14. The processing system of claim 10, wherein the one or more processing units are further to:

determine a chosen port of the one or more selected ports is operating according to normal operating conditions.

15. The processing system of claim 10, wherein the one or more processing units are further to:

collect the first telemetry data over a first period of time; and collect the second telemetry data over a second period of time, the first period of time being longer than the second period of time.

16. The processing system of claim 10, wherein the one or more processing units are further to:

determine a number of the subset of ports exceeds a failure threshold; and provide an alert.

17. The processing system of claim 16, wherein the alert is indicative of a system-wide failure.

18. The processing system of claim 10, wherein the one or more processing units are further to:

determine a quality of one or both of the first telemetry data and the second telemetry data.

* * * * *